United States Patent [19]
Watanabe et al.

[11] Patent Number: 5,046,133
[45] Date of Patent: Sep. 3, 1991

[54] INTERFERENCE CANCELLATION CIRCUIT

[75] Inventors: Kazuzi Watanabe; Masahiko Ito; Hideaki Matue, all of Kanagawa, Japan

[73] Assignee: Nippon Telegraph and Telephone Corporation, Tokyo, Japan

[21] Appl. No.: 317,246

[22] Filed: Feb. 28, 1989

[30] Foreign Application Priority Data

| Feb. 29, 1988 | [JP] | Japan | 63-47221 |
| Feb. 29, 1988 | [JP] | Japan | 63-47222 |
| Feb. 29, 1988 | [JP] | Japan | 63-47223 |
| Oct. 6, 1988 | [JP] | Japan | 63-253038 |

[51] Int. Cl.$^5$ .................................... H04B 7/08
[52] U.S. Cl. .................................... 455/138; 455/139; 455/249; 455/278
[58] Field of Search .................. 455/133–137, 455/272, 275, 277, 278, 295, 296, 249, 138, 139; 375/100, 101, 102

[56] References Cited

U.S. PATENT DOCUMENTS

| 4,715,048 | 12/1987 | Masamura | 455/137 |
| 4,736,455 | 4/1988 | Matsue et al. | 455/278 |
| 4,752,969 | 6/1988 | Rilling | 455/278 |
| 4,850,037 | 7/1989 | Bochmann et al. | 455/137 |
| 4,926,498 | 5/1990 | Suzuki et al. | 455/135 |
| 4,939,791 | 7/1990 | Bochmann et al. | 455/278 |
| 4,977,615 | 12/1990 | Suzuki et al. | 455/278 |

Primary Examiner—Curtis Kuntz
Attorney, Agent, or Firm—Cushman, Darby & Cushman

[57] ABSTRACT

An interference cancellation circuit which can remove the interference signal caused by other systems and contained in received signals. The interference signal can be cancelled even if the interference signal is not directly obtained or plural interference signals exist, or the interference signal is a wide band signal or raster interference simply by receiving two signals which have passed through different transmission paths, combining the main signals contained in each of the received signals in a manner to offset each other to the extract interference signal, and removing the interference signal component from the received signal based on the expected interference signal.

16 Claims, 59 Drawing Sheets

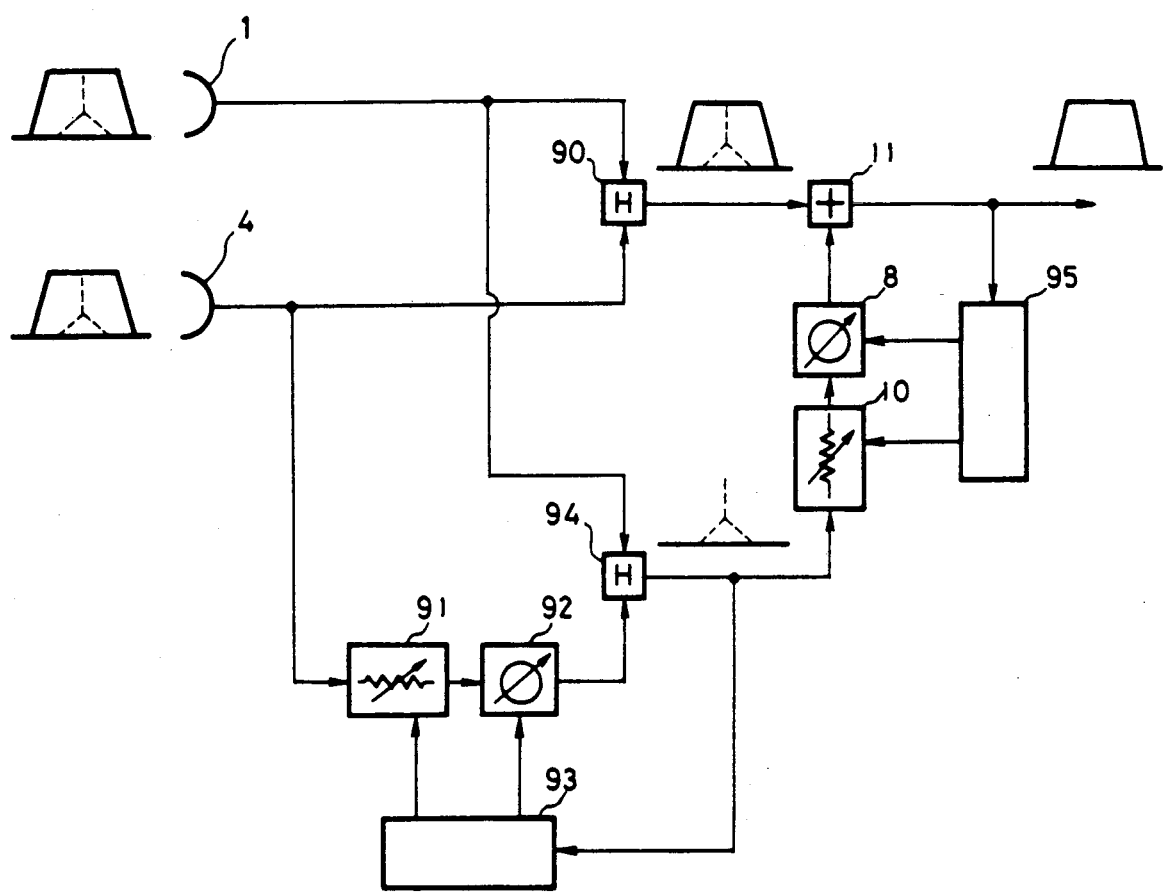
F I G. 26

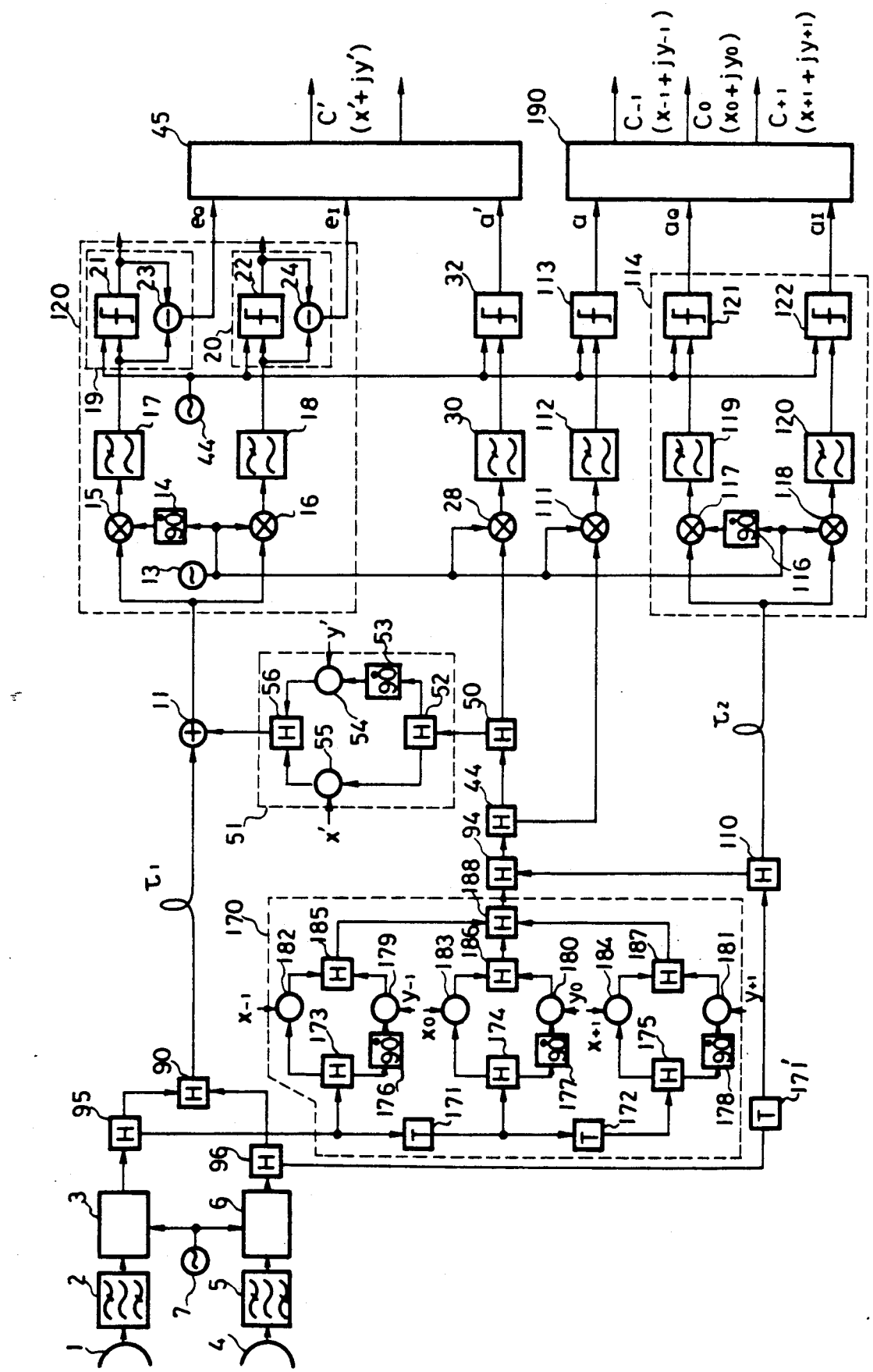
F I G. 35

Control Circuit 93, 95 ON

Control Circuit 95 ON
Control Circuit 93 OFF

Control Circuit 93, 95 OFF

INTERFERENCE CANCELLATION CIRCUIT

FIELD OF THE INVENTION

This invention relates to a cancellation circuit which eliminates interference signals caused by other transmission systems. This invention is applicable to transmission of digital or analogue signals.

BACKGROUND OF THE INVENTION

Many attempts have been made in the prior art to control and cancel interference caused by an external transmission system.

FIG. 1 is a block diagram to show a first prior art interference cancellation circuit. This is equivalent to the circuit disclosed in Japanese Patent Application Laid-open Sho 62-147881 (JPA Sho 60-287881).

A signal is (described herein as a digital signal) received by a main antenna 1 of a main signal receiver system and includes an interference signal from the other transmission system. The received signal is supplied to a frequency converter 3 via a band-pass filter 2 to be converted to an intermediate frequency (IF) band.

The signal which may cause the interference is received by an auxiliary antenna 4 directed at the interference source. The signal received by the auxiliary antenna 4 is passed to a band pass filter 5 for signal-to-noise ratio improvement and converted to the intermediate frequency band by a frequency converter 6 with the local oscillation frequency band by a converter 6 with the main signal side and is fed from a local oscillator 7.

The obtained interference signal from frequency converter 6 is adjusted in phase and amplitude by a variable phase shifter 8 and a variable attenuator 10 to produce a cancellation signal which is opposite in phase to but the same in amplitude as the interference signal component that is mixed in the main signal. By adding the cancellation signal by an combiner 11, the interference signal component mixed in the main signal can be cancelled.

In order to control the variable phase shifter 8 and the variable attenuator 10, error signals and interference signals are obtained for the in-phase and the quadrature phase components.

In order to detect the in-phase and the quadrature phase components of the interference signal component after it is added with remaining in the main signal even after it is added with cancellation signal by the combiner 11, the output from the combiner 11 is fed into a demodulator 12. A coherent quadrature phase detector comprising a 90 degree phase shifter 14 and two phase detectors 15, 16 is provided within the demodulator 12. The coherent quadrature phase detector detects the output from the combiner 11 by means of the local frequency 13 reproduced from the signal received on the main signal side and divides them into the in-phase component and the quadrature phase component, which in turn are supplied to error signal detectors 19, 20 via low-pass filters 17, 18. The error signal detectors 19, 20 detect the remaining interference signal component and generate error signals respectively indicative of the in-phase and the quadrature phase components.

Meanwhile, the interference signals which have passed through the variable phase shifter 8 are divided into two by a signal divider 9, one output of which is output into the variable attenuator 10 and the other to the coherent quadrature phase detector comprising a 90 degree phase shifter 26 and phase detectors 27, 28. The coherent phase detector divides the interference signal into the in-phase component and the quadrature phase component by means of the local frequency 13 reproduced by the demodulator 12 on the main signal side. Thus divided interference signals are supplied into decision circuits 31, 32 via low-pass filters 29, 30. The decision circuits 31, 32 digitize respectively the interference signals by using a timing signal obtained at the demodulator 12 for the main signal.

Since the description herein is being made using an example of digital processing, it becomes necessary to use decision circuits 31, 32 for digitizing. No such digitizing is necessary in the case of analog processing.

When the outputs from the error signal detectors 19, 20 are in the form of digital signals, an analog/digital converter may be used. In such a case, if the main signal is one of the 16QAM type, the demodulated signal becomes quaternary, and it is sampled by an analog/digital converter having three or more bits of output. The table below shows the digital output therefrom. The digital output shows the result of decision in the most and next significant bits and the direction of error in the third bit. Therefore, the output in the third bit is used as an error signal. The most significant bit is used as a polarity signal.

TABLE

| analog input (quaternary signal) | digital output | | |
|---|---|---|---|
| | MSB | 2nd bit | 3rd bit |
| high level ---- . ---- | 1 | 1 | 1 |
| | | | 0 |
| ---- . ---- | | | 1 |
| | | 0 | 0 |
| | | 1 | 1 |
| ---- . ---- | 0 | | 0 |
| ---- . ---- | | | 1 |
| low level | | 0 | 0 |

Correlation between thus obtained error signals and the interference signals in their in-phase and quadrature phase components are then obtained.

An exclusive OR operation is performed between their quadrature phase components and in phase components by exclusive OR circuits 34, 35, and their outputs are supplied to an integrator 43 via resistors 38, 39. The output from integrator 43 is used as a control signal for the variable attenuator 10. The exclusive OR operation between the in-phase components and the quadrature phase components are obtained by the exclusive OR circuits 36, 37 and their outputs are supplied to an integrator 42 via resistors 40, 41 and the output from the integrator 42 is used as a control signal for the variable phase shifter 8.

FIG. 2 is a block diagram to show the second prior art device, the circuit of which is equivalent to the circuit disclosed in Japanese Patent Application Laid-open Sho 62- (JPA Sho 61-75555) wherein the variable phase shifter 8 and the variable attenuator 10 in the first prior art circuit are replaced with a quadrature amplitude modulator 51.

The quadrature amplitude modulator 51 comprises a signal divider 52 which divides a signal into two paths, a phase shifter 53 which shifts the phase of one of the divided signals by 90 degrees, a bipolar attenuator 54 which receives as input the signal passing through the phase shifter 53, a bipolar attenuator 55 which receives as input the other output signals from the divider 52, and a combiner 56 which adds the outputs from the two bipolar attenuators 54, 55. The quadrature amplitude modulator 51 is fed with the interference signals which are received on the side of the auxiliary antenna 4 and divided by a signal divider 50.

The method of controlling the two bipolar attenuators 54, 55 will be explained below.

The signal combined by the combiner 11 is input at the demodulator 12. The input signal is detected in quadrature phase by phase detectors 15, 16 in the demodulator 12 by means of the local frequency 13 reproduced from the signals received by the main signal side. The detector outputs are passed through low-pass filters 17, 18 to be taken out as a baseband signal of the in-phase and the quadrature phase components. These baseband signals are supplied into the error signal detectors 19, 20 to detect remaining interference signal interference signal components.

Meanwhile, the interference signal converted into the IF band is detected in quadrature phase by phase detectors 27, 28, and each signal is passed to decision circuits 31, 32 via low-pass filters 29, 30. The decision circuits 31, 32 digitize respective input signals by using clock signal 44 obtained by a demodulator 12 to obtain binary interference signals for the quadrature component and the in-phase component.

Correlations are then obtained between error signals of the main signals in the in-phase and the quadrature phase components obtained by the error signal detectors 19, 20 and the binary interference signals of the in-phase and the quadrature phase components.

More specifically, the error signals of the quadrature components of the main signal and the interference signal on the quadrature component are multiplied an exclusive OR gate 34 while the error signal of the in-phase component of the main signals and the interference signals on the in-phase component are multiplied by an exclusive OR gate 35. The signals obtained from these multiplications are analog-added by resistors 38, 39 and the output sum is integrated by an integrator 43. The bipolar attenuator 55 of in-phase in the quadrature amplitude modulator 51 is controlled using the output from the integrator 43.

In a similar manner to the above, the error signal of the in-phase component of the main signal and the quadrature phase component of the interference signal are multiplied by an exclusive OR 36 while the error signal of the quadrature phase component and the interference signal on the in-phase component are multiplied by an exclusive OR 37. The signals obtained by these multiplications are added to each other in analog by the resistors 40, 41, and integrated by the integrator 42. With the output from the integrator 42, the bipolar attenuator 54 of the quadrature phase in the modulator 51 is controlled.

FIG. 3 is a block diagram to show a third prior art device wherein a signal received on the main signal side and the received interference signal are detected in quadrature phase separately from each other, and the detector outputs are digitally processed unlike the first and the second prior art devices.

The signal received on the main signal side which have been converted into IF by a frequency converter 3 is input at a demodulator 12. In the demodulator 12, the local frequency 13 reproduced from the received signal on the main signal side is input at phase detectors 15, 16 to detect quadrature phase signals. The output from the detectors are passed through low-pass filters 17, 18 and taken out as base band signals of the in-phase and the quadrature phase.

Meanwhile, the interference signal converted into the IF band is input at phase detectors 27, 28 and detected in the quadrature phase by means of the local frequency 13 reproduced from the main signal. The outputs detectors are passed to low-pass filters 29, 30 to be taken out as the base-band signals of the in-phase and the quadrature phase.

The base-band signals of the received main signal and interference signal in respective in-phase and quadrature phase components are digitized by analog/digital converters 70 through 73 having a sufficient quantization precision. In this example, the analog/digital converters are used to exemplify digital processing.

In the case where the main signal is the signal of 16QAM, the outputs from analog/digital converters 70 through 73 are quaternary. Therefore, in order to output the error digital signals, they should be sampled by analog/digital converters having a precision of at least 3 bits. As shown in the table, binary signals are obtained to show the result of decision in the most and next bits and the direction of errors in the third bit. The sampling signal of the analog/digital converters 70 through 73 is clock signal 44 reproduced from the signal received on the main signal side.

The digitized interference signals in the in-phase and the quadrature phase components are input at bipolar attenuators 74 through 77 to eliminate the interference signal components mixed in the received signal on the main signal side by adders 78 through 81. The correlation between the error signals and the interference signals remaining in the main signals are obtained, and bipolar attenuators 74 through 77 are controlled in a manner to minimize the effect thereof.

More specifically, the polarity signal of the interference signal on the quadrature phase side (obtainable from the most significant bit of the analog/digital converter) is multiplied with the error signal of the main signal on the quadrature phase side by an exclusive OR 82, and the output therefrom is digitally integrated by an integrator 86 to control with the output thereto the bipolar attenuator 76 connected to the side of the quadrature side interference signal. An exclusive OR 83 multiplies the polarity signal on the quadrature side of interference signals with error signal of the main signal on the in-phase side, and the output therefrom is integrated digitally by an integrator 87 to control a bipolar attenuator 74 connected to the quadrature side of the interference signal. An exclusive OR 84 multiplies the polarity signal of interference signal on the in-phase side with the error signal of main signal on the in-phase side, and the output therefrom is integrated digitally by an integrator 88 to control with its output a bipolar attenuator 75 connected to the interference signal on the in-phase side. An exclusive OR 85 multiplies the polarity signal of the interference signal on the in-phase side with the error signal of the main signal on the quadrature side, and the output therefrom is digitally integrated by an integrator 89 to control a bipolar attenuator 77 connected to the in-phase side of the interference signals.

A problem exists in these prior art circuits in that the signals which cause the interference signal. This makes it necessary to install an auxiliary antenna for the sole purpose of receiving the signal which causes the interference. Also, when the main signal and the interference signal component share the same transmission path, the signals which cause interference cannot be precisely detected, and the interference signal component cannot, therefore, be completely eliminated.

This invention aims to solve those problems encountered in the prior art and to provide an interference cancellation circuit which can sufficiently eliminate and cancel an interference signal component even when the signal which causes the interference cannot be obtained directly.

SUMMARY OF THE INVENTION

The interference cancellation circuit according to this invention is characterized in that the interference signal component can be extracted from one of received signals obtained from two receiver circuits by adding the signals in a manner to offset the main signal component, and eliminated from the signal.

This invention circuit is characterized by the structure comprising two receiver circuits each of which receives a signal including the main signal and the interference signal, a first adjuster means which adjusts received signals respectively received at the outputs of above two receiver circuits relatively to each other in amplitude and phase, a first combining means which combines two received signals after adjustment by the first adjusting means, a first control means which controls said first adjusting means in a manner to make the interference signal component included in the output from the first combining means sufficiently larger in level than the main signal component, a second adjusting means which adjusts the output from said first combining means in amplitude and phase, second combining means which adds the output from the second adjuster to the signal received from either one of said receiver circuits or the sum of the received signals at two receiver circuits, and a second control means which controls said second adjuster in a manner to sufficiently diminish the interference signal component included in the output from the second combining means.

The first adjusting means may include two automatic amplitude gain control circuits provided one each in the outputs of the two receiver circuits, a first variable phase shifter connected to an output of either one of the automatic gain control circuits, and a first variable attenuator provided at an output of either of the first variable phase shifter or of the other automatic gain control circuit. The first control means may include a phase difference detector which detects difference in phase from the output from said two automatic gain control circuits, a phase control means which controls said first variable phase shifter with the output from the phase difference detector, and an amplitude control means which controls said first variable attentuator with the control voltage of said two automatic gain control circuits.

The second adjusting means may include a second variable phase shifter and a second variable attenuator while the second control means may include a quadrature phase detector which divides the output from the second combining means into the in-phase component and the quadrature phase component with the local frequency reproduced from the output from the second combining means, two error signal detectors each of which receives as input either one of the components obtained by the quadrature phase detector, a phase-detector which phase-detects the output signals from said second variable phase detector with said local frequency, a correlation detector which detects correlations between the output from the phase detector and either one of the two outputs from the error signal detectors separately, an amplitude controller which controls the second variable attenuator with the correlations of the in-phase components obtained by said correlation detector, and a phase control means which controls said second variable phase shifter with the correlation of components of the phase perpendicular to each other obtained from said correlation detector.

The correlation detector may comprise exclusive ORs and integrators.

In addition to the above, the first control means may include a divider which divides either one of the signals received at the outputs of the two receiver circuits, a first phase detector which detects in phase the divided signals with the local frequency reproduced from the output from the second combining means the output from the second, a second phase detector which phase detects the output signals from said first combining means with said local frequency, a third phase detector which phase detects at least one of the said divided signals and the output signal from said first combining means with said local frequency and with the carrier of quadrature phase, a first amplitude controller which controls the adjustment in amplitude at the first adjuster with correlation between the phase detector output of said divided signal and the phase detector output of the output signal from said first combining means, and a first phase control means which controls the phase adjustment at the first adjuster with the correlation between the phase detector output of said divided signal and the phase detector output of the output signal from the first adjuster.

As the first adjuster, a first variable attenuator and a first variable phase shifter provided at either input of the first combining means may be used. In such a case, the first amplitude controller includes a means to control said first variable attenuator while the first phase controller includes a means to control said first variable phase shifter.

As the first adjuster, a two-dimensional transversal filter which is variable separately in attenuation for the in-phase component and the quadrature phase component of an input signal separately may be provided at either one of the inputs of the first combining means. In such a case, the first amplitude controller includes a means to control attenuation in the in-phase component of said first transversal filter while the first phase controller includes a means to control attenuation in the quadrature component at the first transversal filter.

The second control means may include a quadrature detector which divides the output from said second combining means into the in-phase component and the quadrature component with the local frequency reproduced from the output of the second combining means, two error signal detectors which respectively input the two components obtained by said quadrature detector, a phase detector which phase-detects the output signals from said second variable phase shifter with said local frequency, and a second amplitude controller which controls the amplitude adjustment at the second adjuster with the correlation between the output from the phase detector and the outputs from said two error signal detectors in the quadrature phase components.

As the second adjuster, a second variable attenuator and a second variable phase shifter may be used. In such a case, the second amplitude controller may include a means to control a second variable attenuator while the second phase controller includes a means to control said second variable phase shifter.

As the second adjuster, a quadrature amplitude modulator having weight variable respectively for the in-phase component and the quadrature component of an input signal may be used. In such a case, the second amplitude controller includes a means to control the variable attenuator on the in-phase side thereof while the second phase controller includes a means to control a variable attenuator for the quadrature side thereof.

As the second adjuster, a second two dimensional transversal filter having attenuation variable separately for the in-phase component and the quadrature component of an in-put signal may be used. In such a case, the second amplitude controller includes a means to control the attenuation of the in-phase component at the second two dimensional transversal filter while the second phase controller includes a means to control attenuation of the quadrature component thereof.

The interference cancellation circuit according to this invention may further comprise a first quadrature phase detector which divides one of the received signals at either one of the receivers or the signal obtained by combining the two received signals with the local frequency reproduced from the main signal component included therein and the second and the third quadrature detectors which respectively divide the signals received by said receiver circuits with said local frequency into the quadrature component and the in-phase component. The first adjusting means includes the first and the third bipolar attenuators to which quadrature component of said third quadrature phase detector output is input, and the second and the fourth bipolar attenuators to which the in-phase component of said third quadrature phase detector is input. The first combining means includes the first and the second adders which add the outputs from said first and second bipolar attenuators with the in-phase component output from said second quadrature phase detector, and the third and the fourth adders which add the outputs from said third and fourth bipolar attenuators with the quadrature component outputs from said second quadrature phase detector. The second adjusting means includes the fifth and the seventh bipolar attenuators to which the quadrature component output from said second quadrature detector is input, and the sixth and the eighth bipolar attenuators to which the in-phase component outputs from said second quadrature phase detector is input. The second combining means includes the fifth and the sixth adders which add the outputs from the fifth and the sixth bipolar attenuators to the in-phase component output of said first quadrature phase detector, and the seventh and the eighth adders which add the output from said seventh and eighth bipolar attenuators to the quadrature component output from said first quadrature phase detector. The first control means includes a first bipolar attenuator controller which controls the first through the fourth bipolar attenuators with the signals obtained from the third and the fourth adders and the output signal from said third quadrature detector while the second control means includes a second bipolar attenuator control means which controls said fifth through eighth bipolar attenuators with the signal obtained by said seventh and eighth adders and the output signal from said second quadrature detector.

One each analog/digital converter may be provided at the outputs of the first through the third quadrature phase detectors so as to construct the first through the eighth bipolar attenuators, the first through the eighth adders, and the first and the second bipolar control means with digital circuits.

In such a case, the first through the eighth bipolar attenuators are constructed with transversal filters. The first through the eighth adders may be full-adders.

The invention circuit can moreover adjust the amplitude and phase of the outputs from the two receiver circuits based on the extracted interference signal by adding the outputs from the two receiver circuits so as to set the interference signal component at sufficiently low level.

In other words, this invention circuit is characterized by the third control means comprising two receiver circuits which receive a mixture of main signal and interference signal, a first adjuster means which adjusts the relative amplitude and phase of the output signals from the two receivers, a first combining means which combines the two received signals which have been adjusted in amplitude and phase by said first adjuster, a first controller means which controls said first adjuster in a manner to make the interference signal component included in the outputs from the first adder to become sufficiently higher level than the main signal component, a third adjuster means which adjusts the relative amplitude and phase of the received signals obtained at the outputs of the two receivers and which is provided separately from said first adjuster means, a third combining means which combines two received signals after relative adjustment in amplitude and phase by the third adjuster means, and a third controller means which controls said third adjuster means in a manner to make the interference signal component included in the output from the third adder to become sufficiently low level.

The phase difference of the main signal and the interference signal which have passed through different transmission paths are usually dependent on their paths. The interference signal component remains even if received signals are combined in a manner to off-set the main signal component after passing through the two transmission paths. By using such an interference signal component, the interference signal component can be removed from the received signal.

The interference cancellation circuit according to this invention receives the signals which are the mixture of main signals and interference signals respectively from plural transmission paths. This invention circuit can obtain interference signal of a high purity by combining signals of an opposite phase to but of the same amplitude as the main signal. Therefore it is unnecessary to directly receive the signal which is the cause of interference. Even if the directions of the main signal source and the interference signal source are the same, this invention circuit can obtain precisely the signal which causes interference to thereby remove interference signal mixed in the received signal with a higher precision.

BRIEF DESCRIPTION OF THE DRAWINGS

These and other aspects of the invention will be explained with reference to the accompanying drawings wherein:

FIG. 26 is a block diagrm to show a twentieth embodiment of interference cancellation cirucit according to this invention.

FIG. 35 is a block diagram to show a twenty-ninth embodiment of this invention.

EMBODIMENT 1

Figure 4:
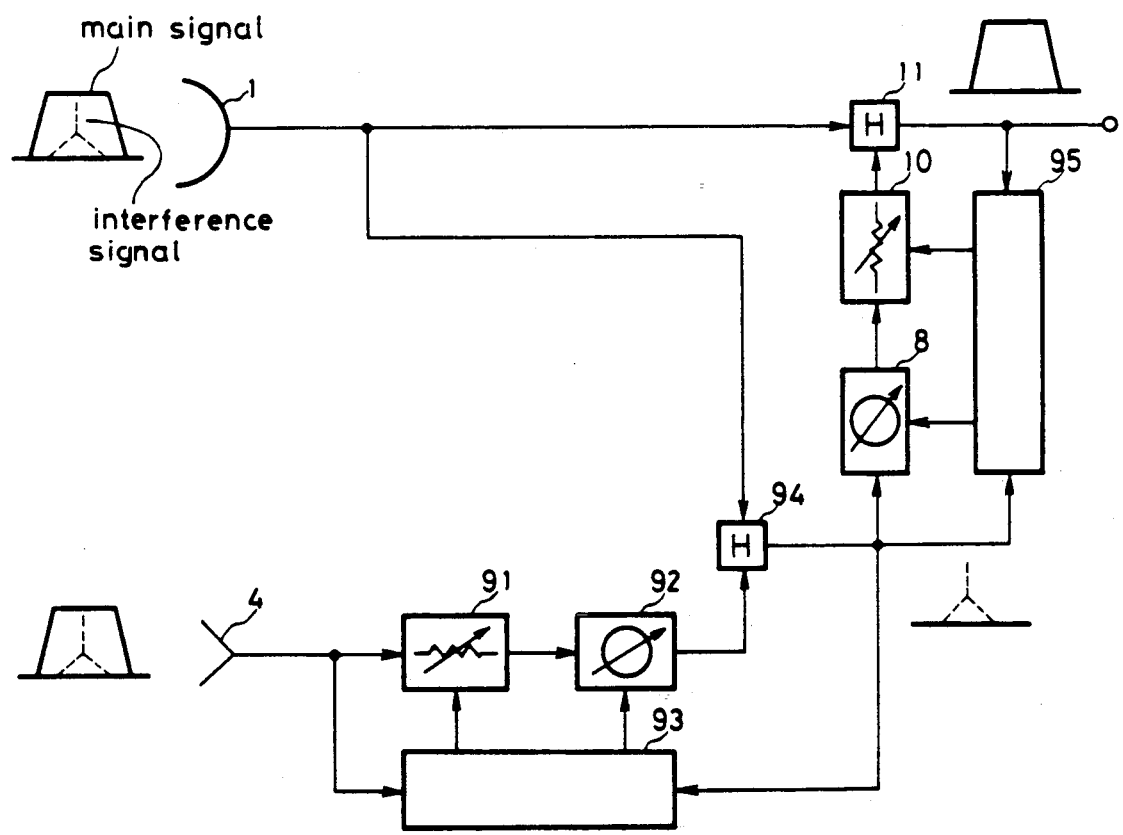
FIG. 4 is a block diagram to show a first embodiment of the interference cancellation circuit according to this invention.

FIG. 4 shows the first embodiment of this invention in a block diagram form.

The interference cancellation circuit shown in FIG. 4 comprises two receiver circuits each of which receives a signal which is a mixture of a main signal and an interference signal. According to a preferred embodiment, the interference signal is assumed to be FM in nature, and the main signal is of the 16 QAM type. The two receiver circuits respectively comprise a main antenna 1 with its output circuit and an auxiliary antenna 4 with its output circuit. Variable attenuator 91 and variable phase shifter 92 act as a first adjuster means for adjusting the amplitude and phase of received signals obtained at the two outputs of the receiving circuits relative to one another. A combiner 94 functions as a first combining means for combining two received signals having adjusted phase and amplitude. controller 93 is a first control means for controlling the first adjuster means to make the level of the interference signal component included in the output from the first combining, means sufficiently larger than the main signal component. A second adjuster means formed of a variable attenuator 10 and a variable phase shifter 8 adjusts the amplitude and phase of the output from the first adjuster. A second combiner 11 is a second combining means for combining the output from the second adjuster means to either one of the received signals by the received circuits for the sum of the two received signals (one received signal in this embodiment). A second controller means is formed of controller 95 and is used for controlling the second adjuster means to make the interference signal component included in the output from the second combining means sufficiently small.

The main antenna 1 and the auxiliary antenna 4 are both directed toward the direction of the source of the main signal. It is assumed herein that the main signal is a digital signal, and the source of interference is in the same direction as a worst case scenario. The main and the auxiliary antennas 1 and 4 each simultaneously receive the main signal together with the interference signal.

The signals received by the main antenna 1 are divided and supplied to one of the inputs of the combiner 94. The signal received by the auxiliary antenna 4 are supplied to the other input of the combiner 94 via the variable attenuator 91 and the variable phase shifter 92.

In order to extract the interference signal from the output from the conbiner 94, the main signal included in one of the inputs to the combiner 94 must be of the same amplitude but opposite in phase to the main signal included in the other input. The relative amplitude and phase differences between the received signal supplied from the auxiliary antenna 4 and the received signal supplied from the main antenna 1 are detected by first controller 93. The outputs controller 93 are used to control variable attenuator 91 and the variable phase shifter 92. The main signal is offset, and the interference signal alone is therefore output from an output of the combiner 94.

By using the thus extracted interference signal, the interference signal component mixed with one of the main signals is to be removed by the following method.

The interference signal output from the combiner 94 is supplied at one of the inputs of a combiner 11 via the variable phase shifter 8 and the variable attenuator 10. The received signal of the main antenna 1 is supplied at the other input of the combiner 11. In order to remove the interference signal from the output from the combiner 11, interference signals at the two inputs of the circuit 11 must be of the same amplitude but opposite phase to each other.

The controller 95 detects the relative difference in amplitude and phase between the interference signal output from the combined 94 and the interference component in the received signal of the main antenna 1, and controls the variable phase shifter 8 and the variable attenuator 10 so as to make the relation between the interference signal and the interference component have the same amplitude but opposite phase.

In this manner, the interference signal is automatically extracted from the received signals which are a mixture of the interference signal and the main signal, and is used to automatically cancel such interference.

EMBODIMENT 2

Figure 5:
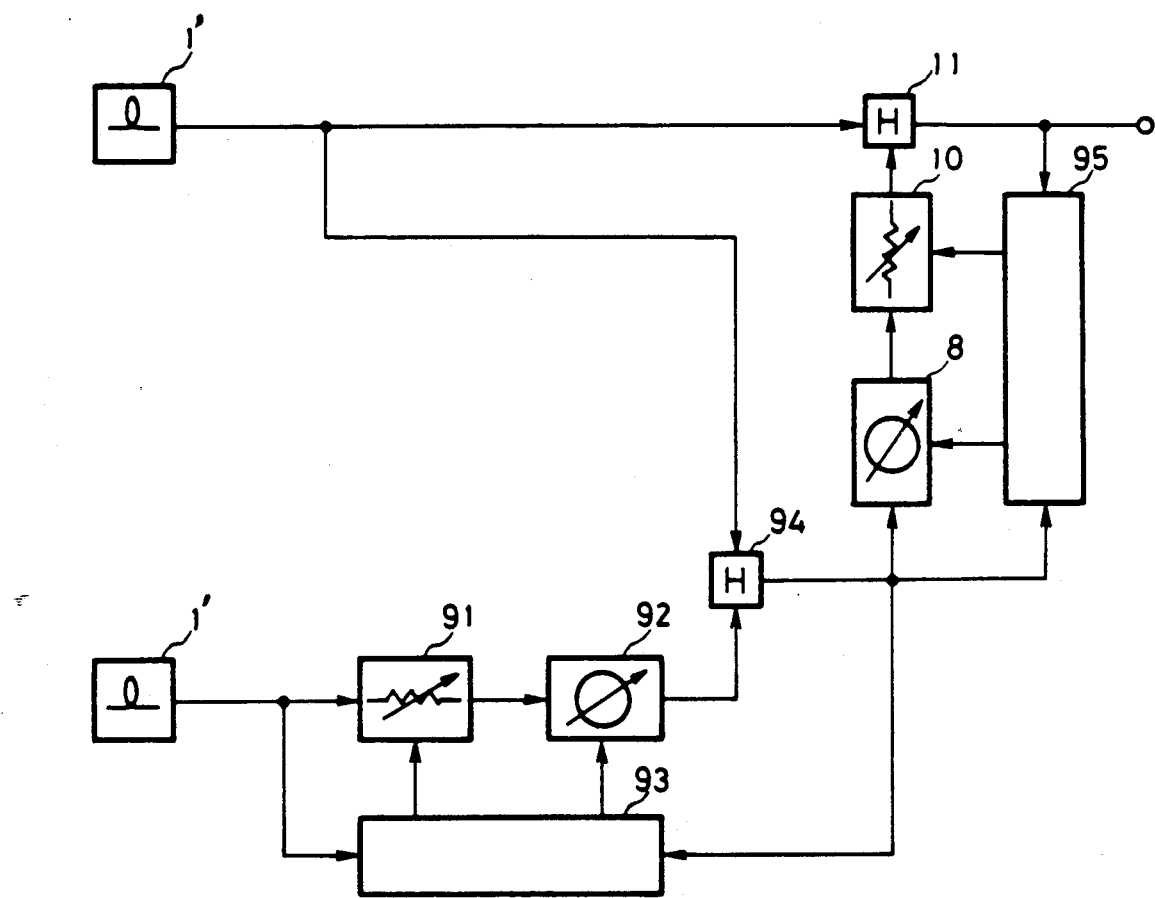
FIG. 5 is a block diagram to show a second embodiment of the interference cancellation circuit according to this invention.

FIG. 5 is a block diagram to show the second embodiment of this invention. This differs from the embodiment 1 in that the main antenna 1 and the auxiliary antenna 4 are replaced with a wire transmission path 1'. This invention is therefore applicable not only to radio signals but also to cable signals.

The circuit structures in the embodiments 1 and 2 have been described in greatly simplified form. Further detailed and more concrete structure of the circuits will be described in relation to other embodiments hereinafter.

EMBODIMENT 3

Figure 6:
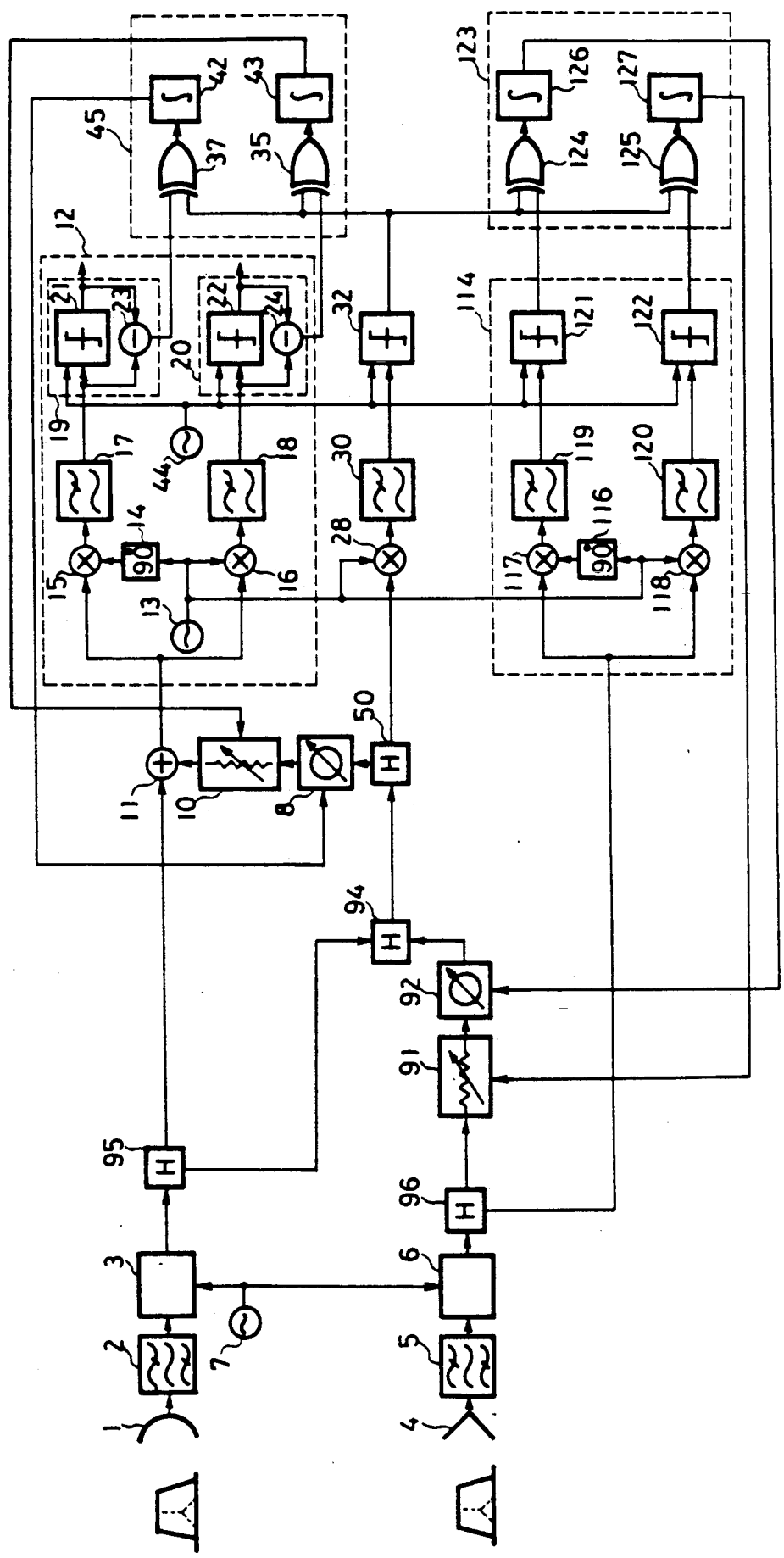
FIG. 6 is a block diagram to show a third embodiment of the interference cancellation circuit according to this invention.

FIG. 6 is a block diagram to show the third embodiment of this invention and shows the circuitry in much more detail.

The main and the auxiliary antennas 1 and 4 are directed in the direction of the main signal transmitter of a digital type signal. The main signal is received along with the interference signal. The signals received by the main and the auxiliary antennas 1 and 4 are supplied respectively to frequency converters 3, 6 via band pass filters 2, 5 which inproves the S/N. The frequency converters 3, 6 convert respective signals into an intermediate frequency band using the local frequency supplied from a local oscillator 7.

The signals converted into an IF band are input to signal dividers 95, 96. One of the outputs from the divider 95 is input to a combiner 94 while one of the outputs from the divider 96 is routed to the combiner 94 via a variable attenuator 91 and a variable phase shifter 92. The circuits 91 and 92 are controlled by feed back signals which control the circuits 91 and 92 to make the main signal components included in the two inputs at the combiner 94 identical in amplitude but opposite in phase to each other. This causes an interference signal which was mixed in the main signal appears at the output of the combiner 94 as the main signal component to become remarkably attenuated.

The feed-back control is conducted as follows.

The two main signals respectively received by the main antenna 4 and the auxiliary antenna 4 are so combined by the combiner 94 to give them the same amplitude but opposite phase to each other. Correlation is then detected between the remaining main signal component and the main signal before combining, and the amplitude and the phase are adjusted by the circuits 91 and 92 to minimize the correlation. This minimizes constantly the remaining main signal after combination.

The main signals when an interference cancellation operation is started. But as the operation proceeds to its normal steady-state operation, the interference signal component included in the main signal becomes more dominant as the main signal is cancelled out the interference signal component is output from the combiner 94 as an interference signal.

The output of the combiner 94 or the interference signal which is remaining after the main signal has been removed by using the local frequency 13 reproduced from a demodulator 12 on the main signal side. The signal is phase-detected by a phase-detector 28, and stripped of harmonic component by a low-pass filter 30. The output from the low-pass filter 30 is digitized by a decision circuit 32 by using a clock signal 44 reproduced by the demodulator 12. This produces a binary interference signal.

The other output of the divider 96 is input at a coherent quadrature phase-detector 114 which divides the signal into its in-phase component and the quadrature component. The input signal is phase-detected by the phase-detectors 117, 118 buy using the local frequency 13 and by detector 117 using a 90° shifted version (shifted by 90° shifter 116) of local frequency. The outputs are stripped of its harmonic component by low-pass filters 119, 120, and digitized by decision-circuits 121, 122 to digitize and divide the main signals into its in-phase componets and the quadrature components. The dicision circuits 121, 122 digitize in sequence with the clock signal 44 reproduced by the demodulator 12.

The main signal of the in-phase component is obtained from the circuit 122. This signal is digitally multiplied with the compensated main signal (interference signal) output digitally from the decision circuit 32, and has an in-phase relation thereto in exclusive OR gate 125. The result is intergrated by an integrator 127. The variable attenuator 91 is controlled by the output from the integrator 127.

Similarly, the main signal of the quadrature component output from the circuit 121 is digitally multiplied with the remaining main signal (interference signal) output from the circuit 32 which has the relative quadrature relation thereto by an exclusive OR gate 124, and the result is integrated by an integrator 126. The variable phase shifter 92 is controlled with the output from the integrator 126.

The decision circuits 32, 121, 122 are provided to secure the operation of the exclusive ORs 124, 125 and they are not always necessary.

. As described above, an interference signal mixed in signal can automatically be extracted and within the main signal can automatically be extracted and cancelled. In order to cause a delay time between the two main signals at the combiner 94 to coincide with each other, at least one of the signal paths should be provided with a delay circuit.

Once the interference signal is isolated, the interference component still remaining in the received signal at the main antenna can be erased. With the interference signal obtained by the aforementioned operation, the variable phase shifter 8 and the variable attenuator 10 are sequentially controlled. The outputs from the circuit 10 is added to the other output from the divider 95 by a combiner 11. The output signal from the circuit 10 is controlled to have a phase substantially opposite, but a amplitude identical to the interference signal component mixed with the main signal output from the divider 95. Therefore, the interference signal component can be removed from the output of the combiner 11.

A description will be made of the variable phase shifter 8 and the variable attenuator 10.

The main signal combined by the combiner 11 is then input at a demodulator 12. The demodulator 12 detects said main signal by a coherent quadrature phase detector a 90 degree phase shifter 14 and phase detectors comprising 15, 16 with the local frequency 13 reproduced from the main signal, and the output signals therefrom are passed through the low-pass filters 17, 18 to obtain the in-phase and quadrature phase baseband signals respectively. The obtained baseband signal is input at error signal detectors 19, 20 respectively. The error signal detectors 19, 20 respectively comprise decision circuits 21, 22 and subtractors 23, 24 for calculating the difference between the input and output thereof, and error signals are output from the subtractors 23, 24.

When a 16QAM signal is used as the main signal, an analog/digital converter of 3 bits or higher is used as the error signal detector. When the 16QAM signal is demodulated, a quaternary baseband signal is obtained. The quaternary signal is passed through a decision circuit of 3 bits or higher (A/D converter), the significant two bits expressing a decision signals, and the third from the top bit expressing an error signal as indicated in the table above. Therefore, the signal in the third bit is obtained as the error signal.

The interference signal which has been output from the combiner 94 and passed through the divider 50 is phase-detected by a phase detector 28 with the local frequency 13, stripped of its harmonic component by a low pass filter 30, and digitized by a decision circuit 32. This provides the binary interference signal. The decision circuit 32 digitizes using a clock signal 44 reproduced by the demodulator 12.

A correlation is detected between the error signals of the in-phase and quadrature components obtained by the demodulator 12 and the digitized interference signal by the decision circuit 32. More particularly, the error signal of the in-phase component is digitally multiplied with the interference signal by an exclusive OR 35, and the output therefrom is integrated by an integrator 43. The output from the integrator 43 is used to control the variable attenuator 10. Meanwhile, the error signal of the quadrature component is digitally multiplied with the interference signal by the exclusive OR 37, and the output therefrom is integrated by the integrator 42. The output signal thereof is used to control the variable phase shifter 8.

As described above, interference is automatically cancelled. In this embodiment, multiplication is conducted using binary signals by exclusive ORs 35, 37, but a binary circuit is not always necessary. The exclusive ORs may alternately be replaced with analog multipliers.

EMBODIMENT 4

Figure 7:
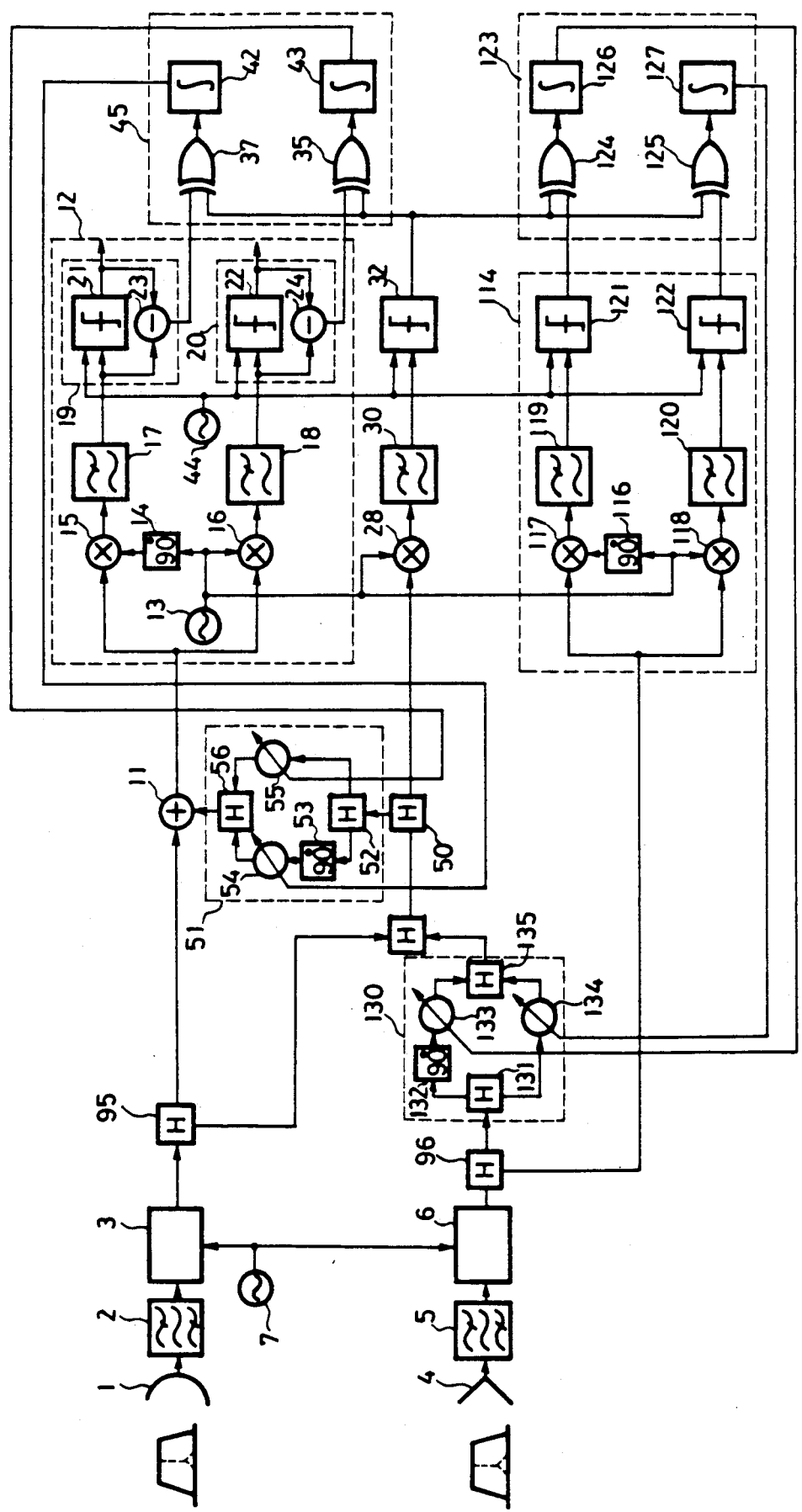
FIG. 7 is a block diagram to show a fourth embodiment of the interference cancellation circuit according to this invention.

FIG. 7 is a block diagram to show the fourth embodiment of this invention.

This embodiment differs from the embodiment 3 in that the variable phase shifters and the variable attenuators are replaced with quadrature amplitude demodulators in order to control the amplitude and phase of the main signal and of the interference signal.

The quadrature amplitude modulator 51 comprises a divider 52 for dividing the input signal, a 90 degree phase shifter 53 shifts one of the outputs from the divider by 90 degrees, a bipolar attenuator 54 on $\pi/2$ phase which adjusts the amplitude of the output from the phase shifter 53, a bipolar attenuator 55 on zero (0) phase which adjusts the amplitude of the other output from the divider 52, and a combiner 56 which combines the outputs from the bipolar attenuators 54, 55.

Similarly, a quadrature amplitude modulator 130 comprises a divider 131, a 90 degree phase shifter 132, bipolar attenuators 133, 134 and a combiner 135. The bipolar attenuator 134 on 0 phase within the quadrature amplitude modulator 130 is controlled by the output from the intergrator 127 in the correlation detector 123 while the bipolar attenuator 133 on $\pi/2$ phase is controlled by the output from the integrator 126.

Similarly, the bipolar attenuator 55 on 0 phase and the bipolar attenuator 54 on $\pi/2$ phase within the quadrature amplitude modulator 51 are controlled by the outputs from the integrators 43 and 42 within the correlation detector 45 respectively.

EMBODIMENT 5

Figure 8:
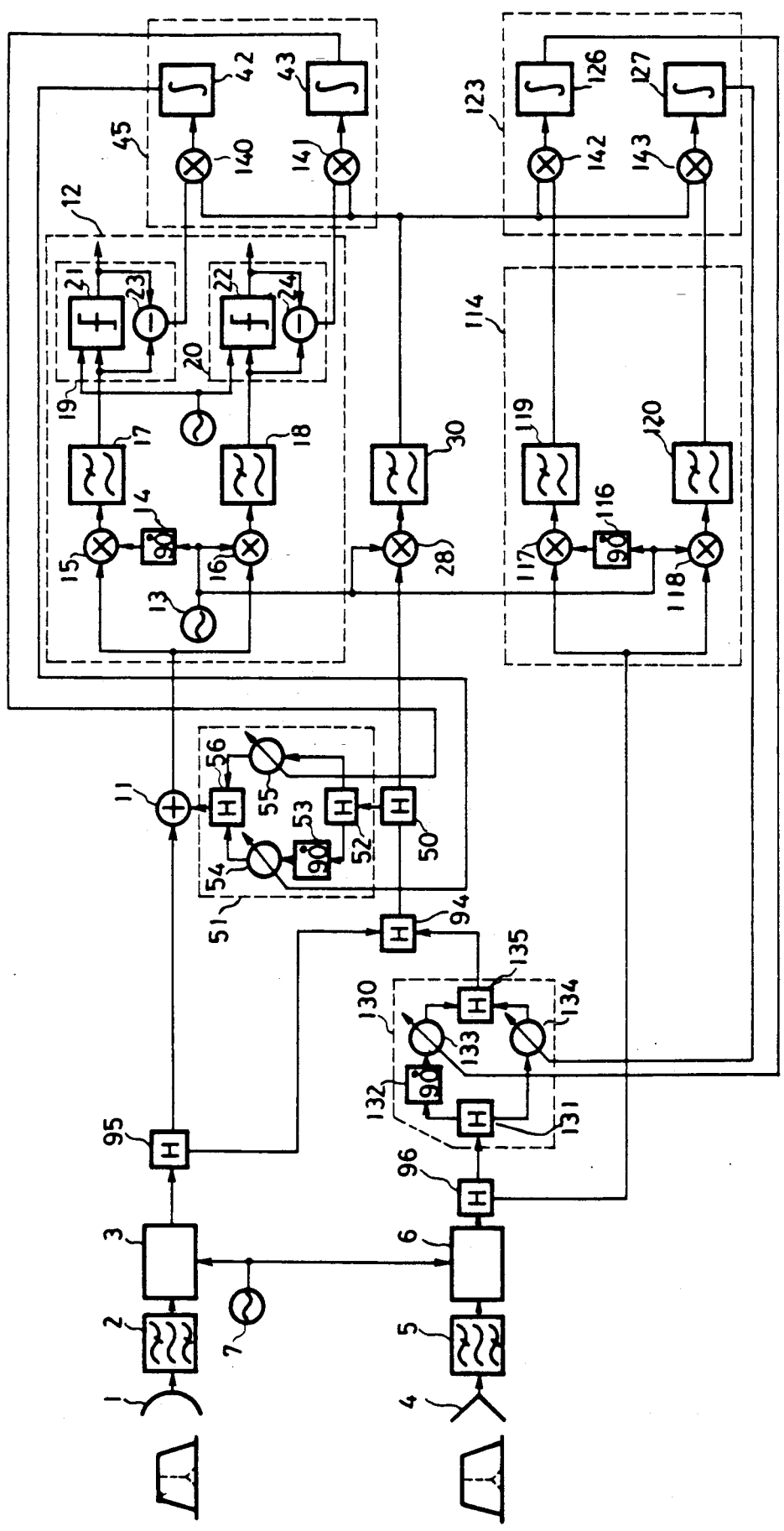
FIG. 8 is a block diagram to show a fifth embodiment of the interference cancellation circuit according to this invention.

FIG. 8 is a block diagram to show the fifth embodiment of the interference cancellation circuit of this invention. This embodiment differs from the embodiment 4 in that exclusive ORs are not used for detecting correlation, and analog multiplication is conducted by the multipliers 140 through 143 to calculate the control gain.

EMBODIMENT 6

Figure 9:
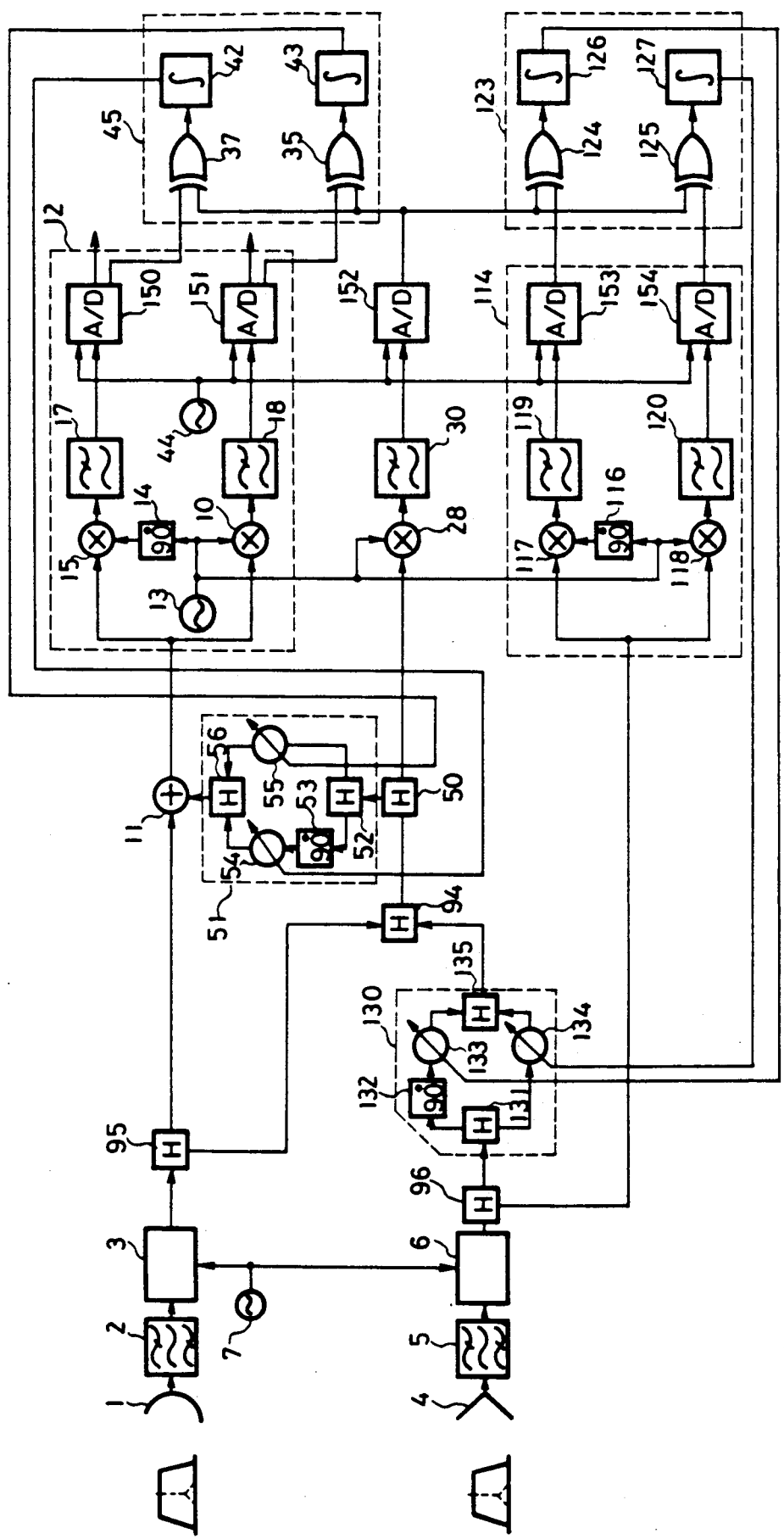
FIG. 9 is a block diagram to show a sixth embodiment of the interference cancellation circuit according to this invention.

FIG. 9 is a block diagram to show the sixth embodiment of the interference cencellation circuit according to this invention.

This embodiment differs from the embodiment 4 in that the error signal detectors 19, 20 and the decision circuits 32, 121, 122 are replaced with A/D converters 150 through 154.

When the main signal is 16QAM, the third significant bit expresses the error signal while the more significant two bits express the result of decision as shown in aforementioned table. The error signal can therefore be obtained from the third bit.

The A/D converters 150 through 154 sample the input signals with the clock signal 44 reproduced by a main signal demodulator 12. Correlation is obtained between the most significant bit (polarity signal) of the output from the A/D converter 152 which converts the baseband signal of interference signal into the digital signal and the third bit (error signal) of the A/D converters 150, 151. With the correlation signal' the bipolar attenuators 54, 55 of the quadrature amplitude demodulator 51 are controlled. Then, the interference signal is removed.

On the other hand, the A/D converters 153, 154 of the quadrature phase detector 114 output the most significant bit (polarity signal) of the quadrature phase and the in-phase components respectively. Correlation is obtained between this signal and the most significant bit of the A/D converter 152, and the bipolar attenuators 33, 34 of the quadrature amplitude demodulator 30 are controlled by the correlation signal to extract the interference signal which has been mixed in with the main signal.

EBMDODIMENT 7

Figure 10:
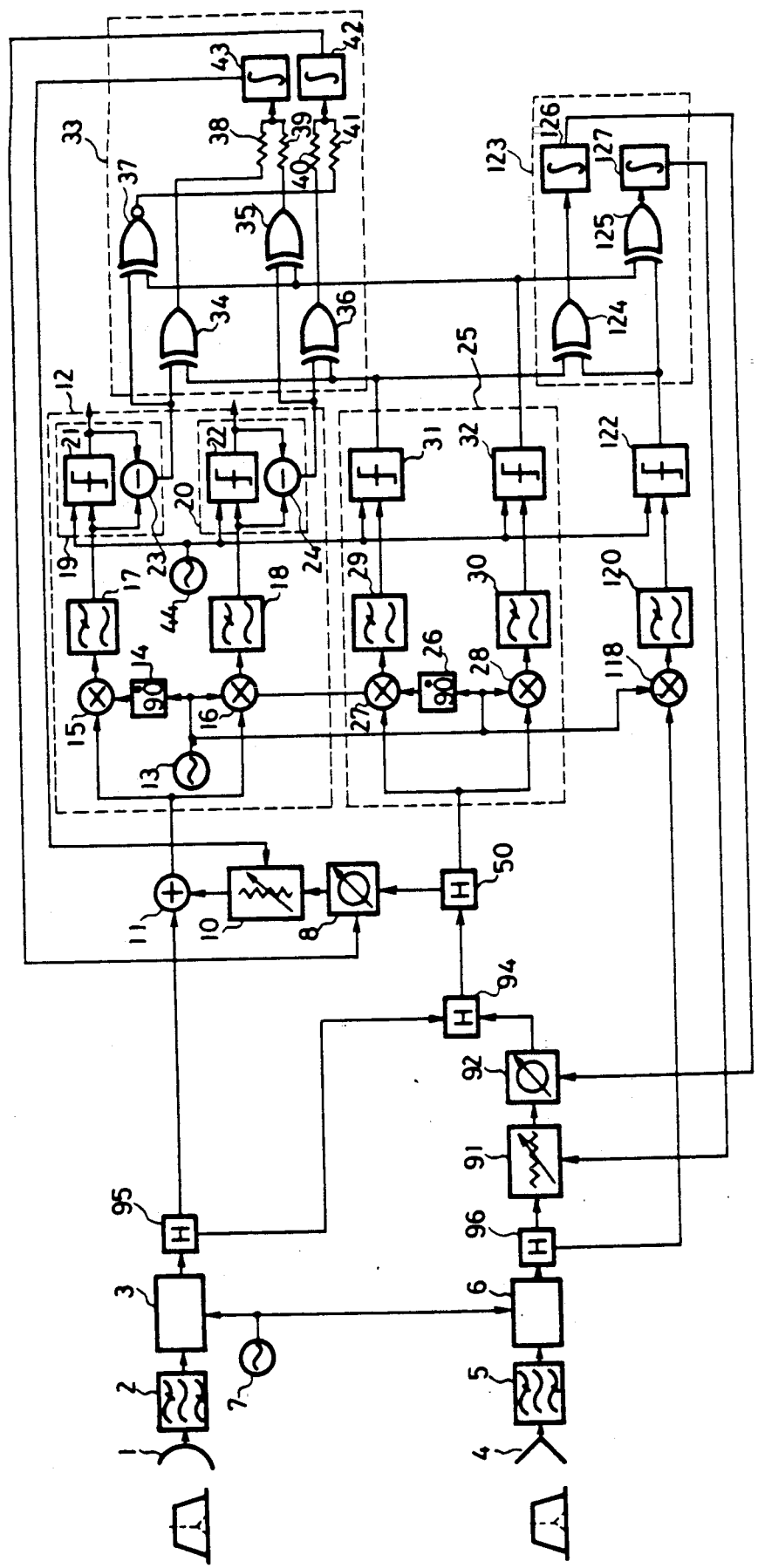
FIG. 10 is a block diagram to show a seventh embodiment of the interference cancellation circuit according to this invention.

FIG. 10 is a block diagram to show the seventh embodiment of the interference signal cancellation circuit of this invention.

Figure 1:
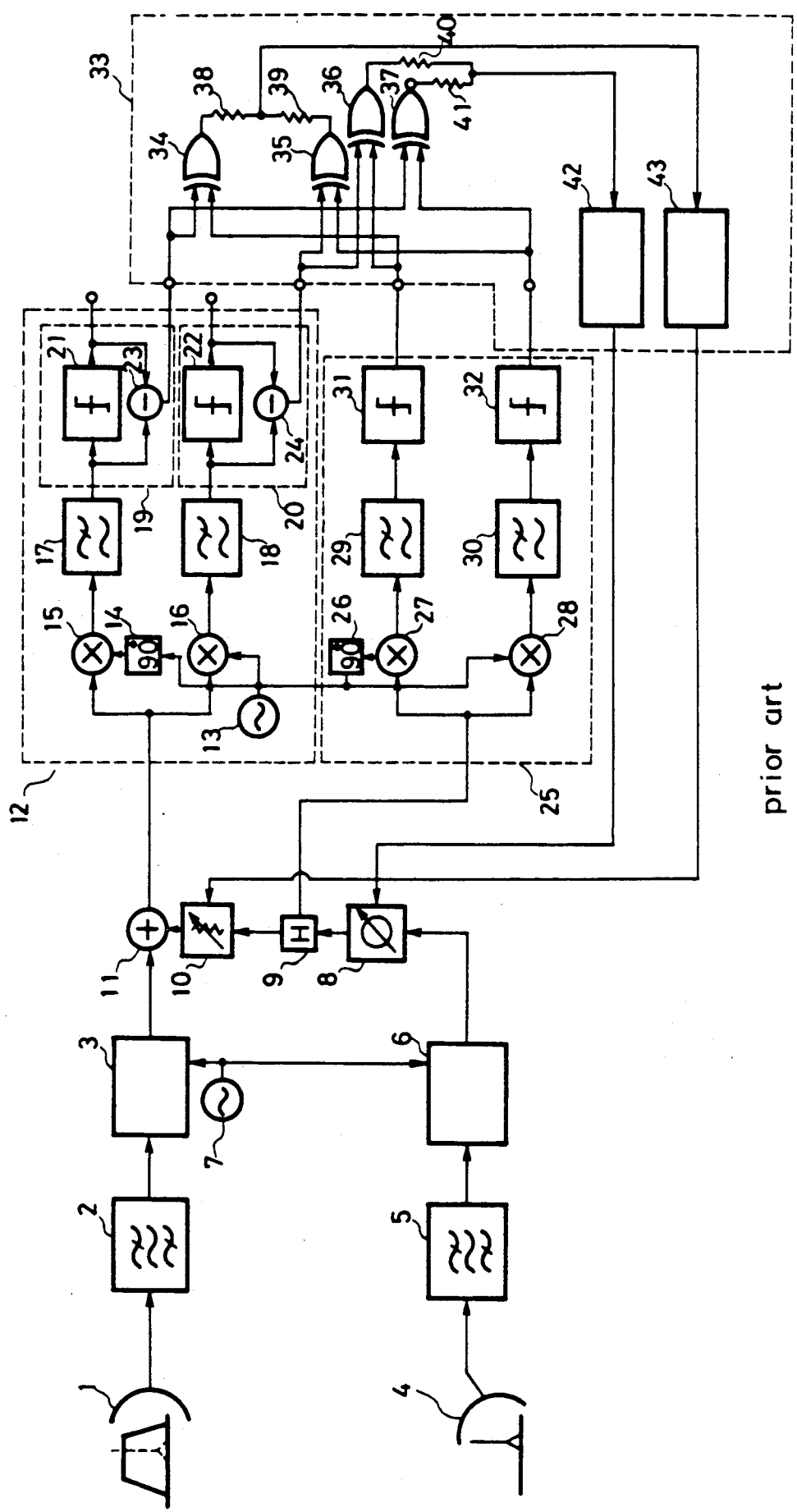
FIG. 1 is a block diagram to show a first prior art circuit.
Figure 2:
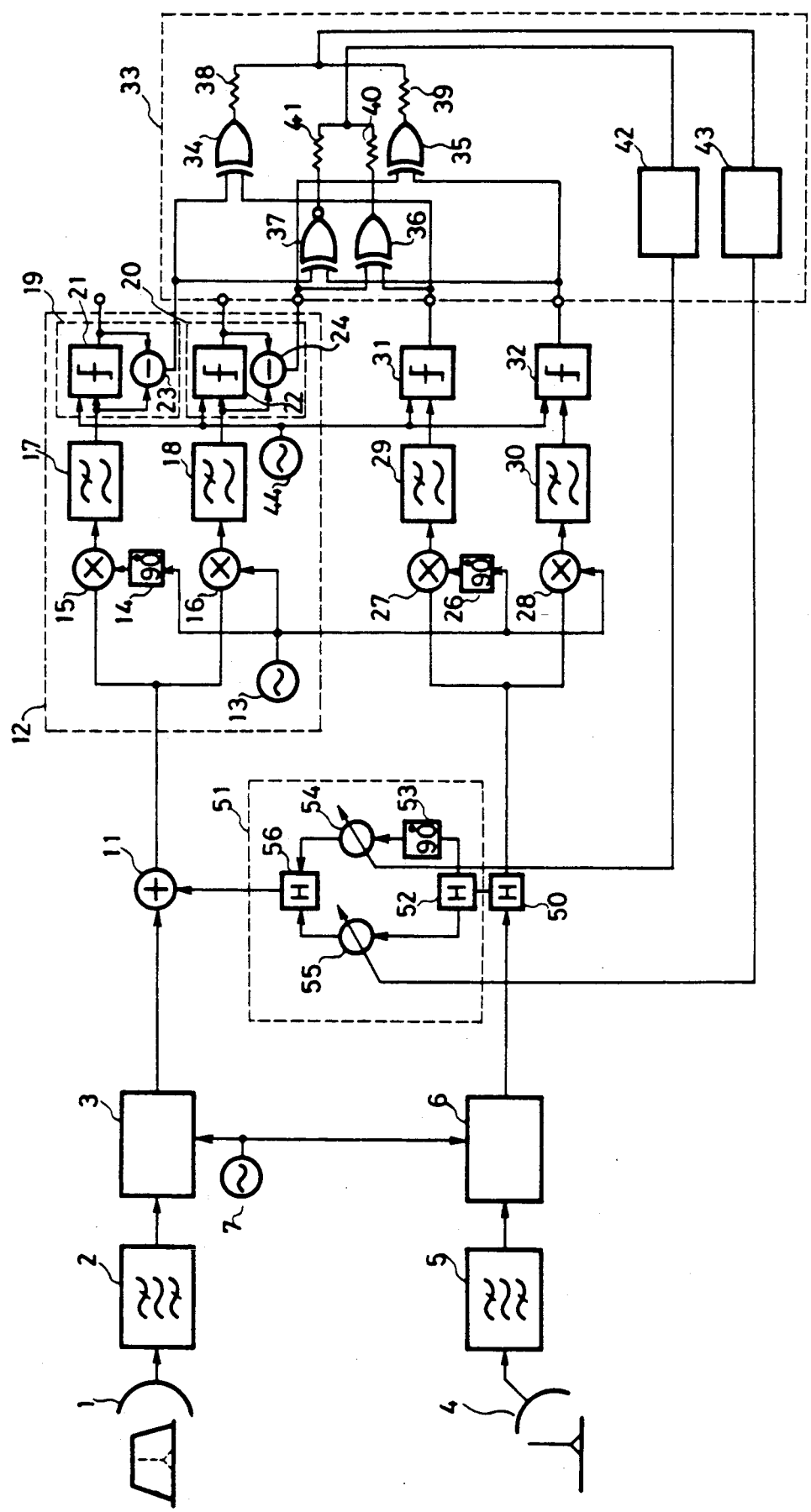
FIG. 2 is a block diagram to show a second prior art circuit.
Figure 3:
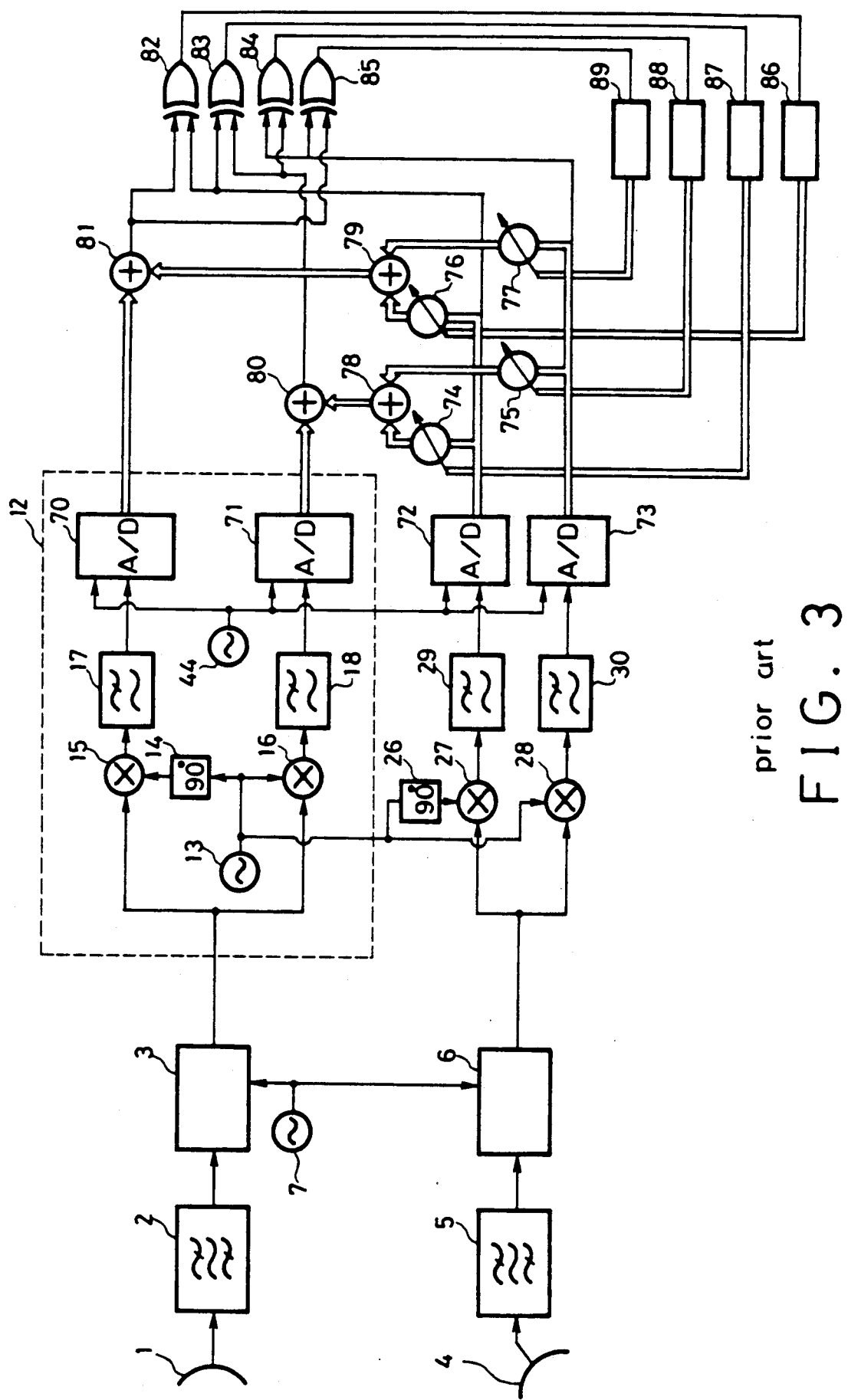
FIG. 3 is a block diagram to show a third prior art circuit.

This embodiment differs from the embodiment 3 in that digitization of extracted interference signals is conducted not only in in-phase detection but also by quadrature phase detection by a coherent quadrature phase detector, and digitization of the output from the divider 96 is conducted for phase detection in the in-phase component alone by a phase detector 118 and a decision circuit 122 instead of quadrature phase detection. The correlation detector 45 is replaced with a correlation detector 33 similar to that shown in the prior art of FIG. 1.

EMBODIMENT 8

Figure 11:
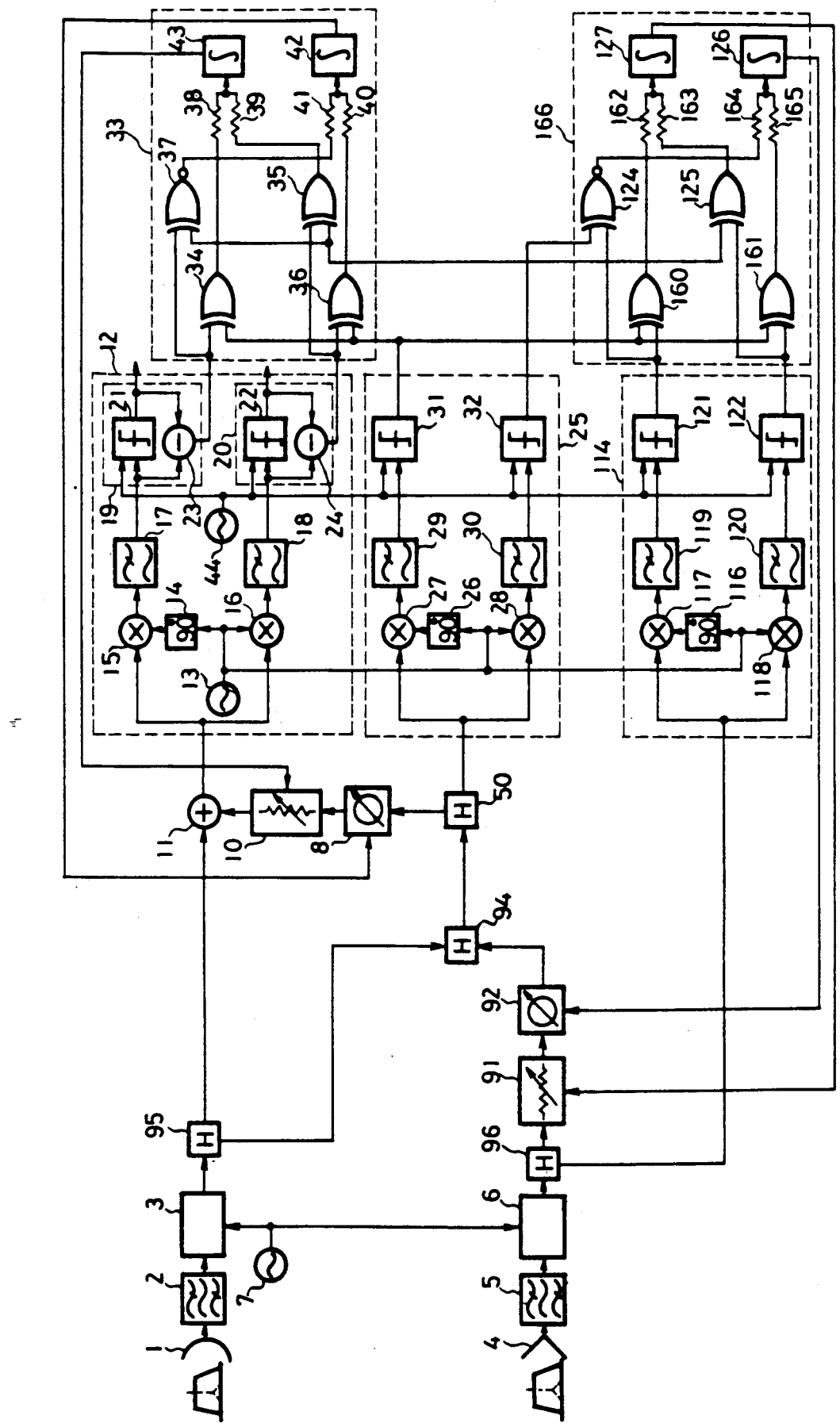
FIG. 11 is a block diagram to show an eighth embodiment of the interference cancellation circuit according to this invention.

FIG. 11 is a block diagram to show the eighth embodiment of the interference cancellation circuit according to this invention. This embodiment differs from the embodiment 3 in that the interference signal thus extracted is quadrature-phase detected for digitization. By this structure, the scale of the circuit becomes larger than the embodiment 3, but the control gain becomes twofold to improve the response and convergence performance in control.

The structure of the correlation detector 166 is similar to the correlation detector 33 and comprises exclusive ORs 124, 125, 160, 161, resistors 162 through 165 and intergrators 126, 127.

EMBODIMENT 9

Figure 12:
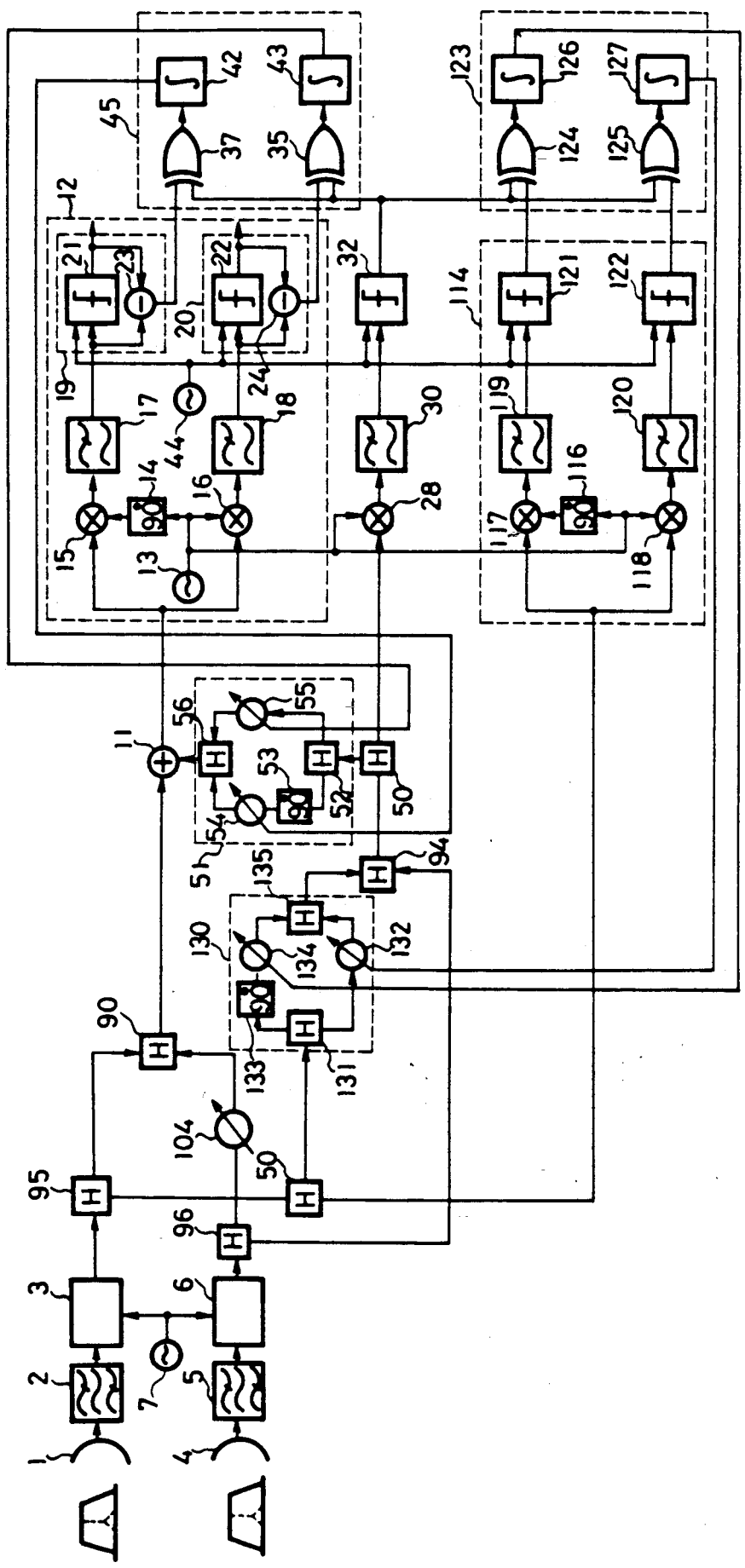
FIG. 12 is a block diagram to show a ninth embodiment of the interference cancellation circuit according to this invention.

FIG. 12 is a block diagram to show the ninth embodiment of this invention interference cancellation circuit.

This embodiment differs from the embodiment 4 in that an antenna for a space diversity receiver is used as the auxiliary antenna 4. This makes the provision of a new auxiliary antenna unnecessary and improves the efficiency in installation and economy of the system. A phase shifter 104 is used to adjust the combined phases in space diversity as the device is generally used to combine two received signals in-phase.

EMBODIMENT 10

Figure 13:
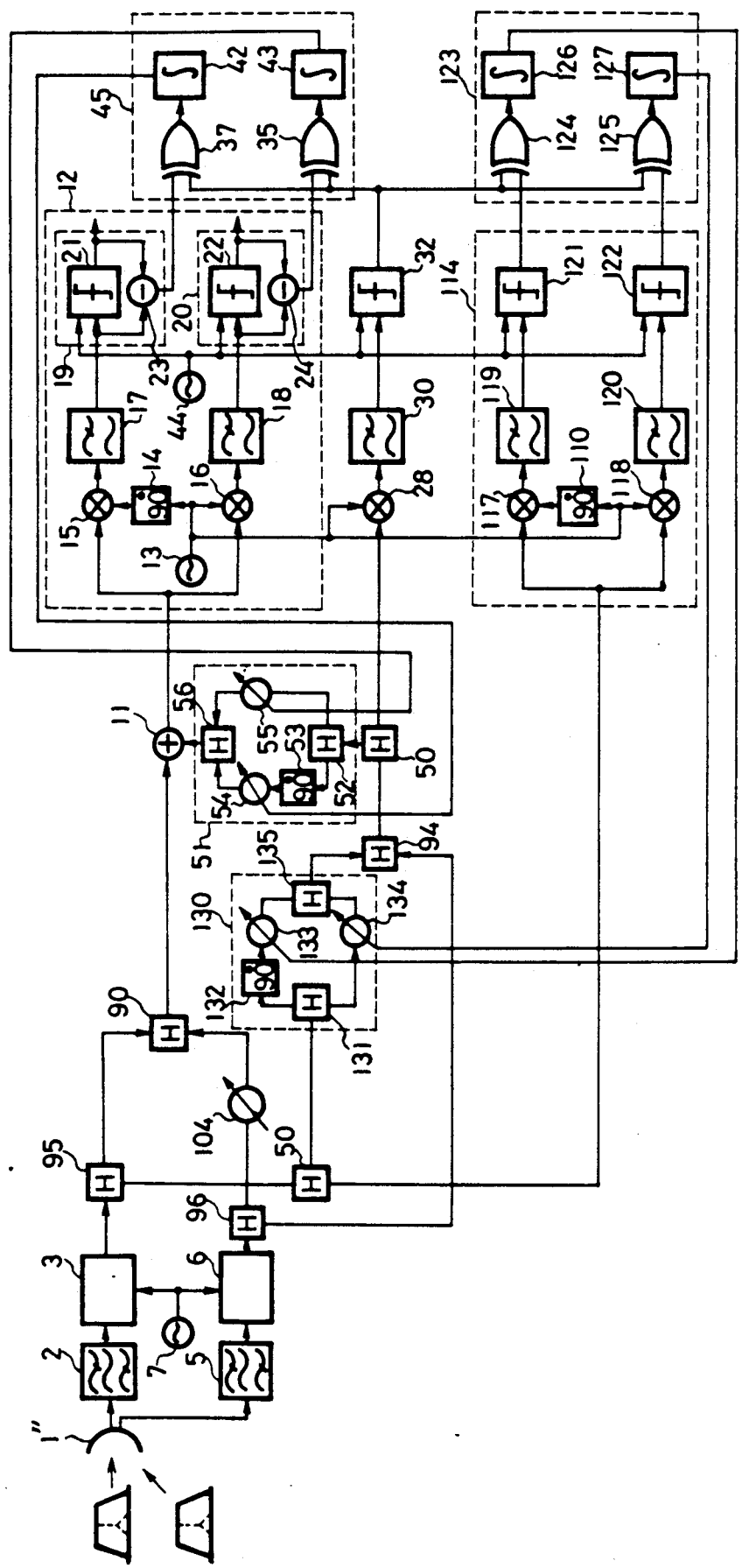
FIG. 13 is a block diagram to show a tenth embodiment of the interference cancellation circuit according to this invention.

FIG. 13 is a block diagram to show the tenth embodiment of the interference cancellation circuit according to this invention.

This embodiment differs from the embodiment 9 in that a receiver antenna 1" for angle diversity is used as the main and auxiliary antennas 1 and 4. Compared to the structure using two antennas, this system can be reduced in size remarkably as it needs only one antenna 1" for the angle diversity receiver.

EMBODIMENT 11

Figure 14:
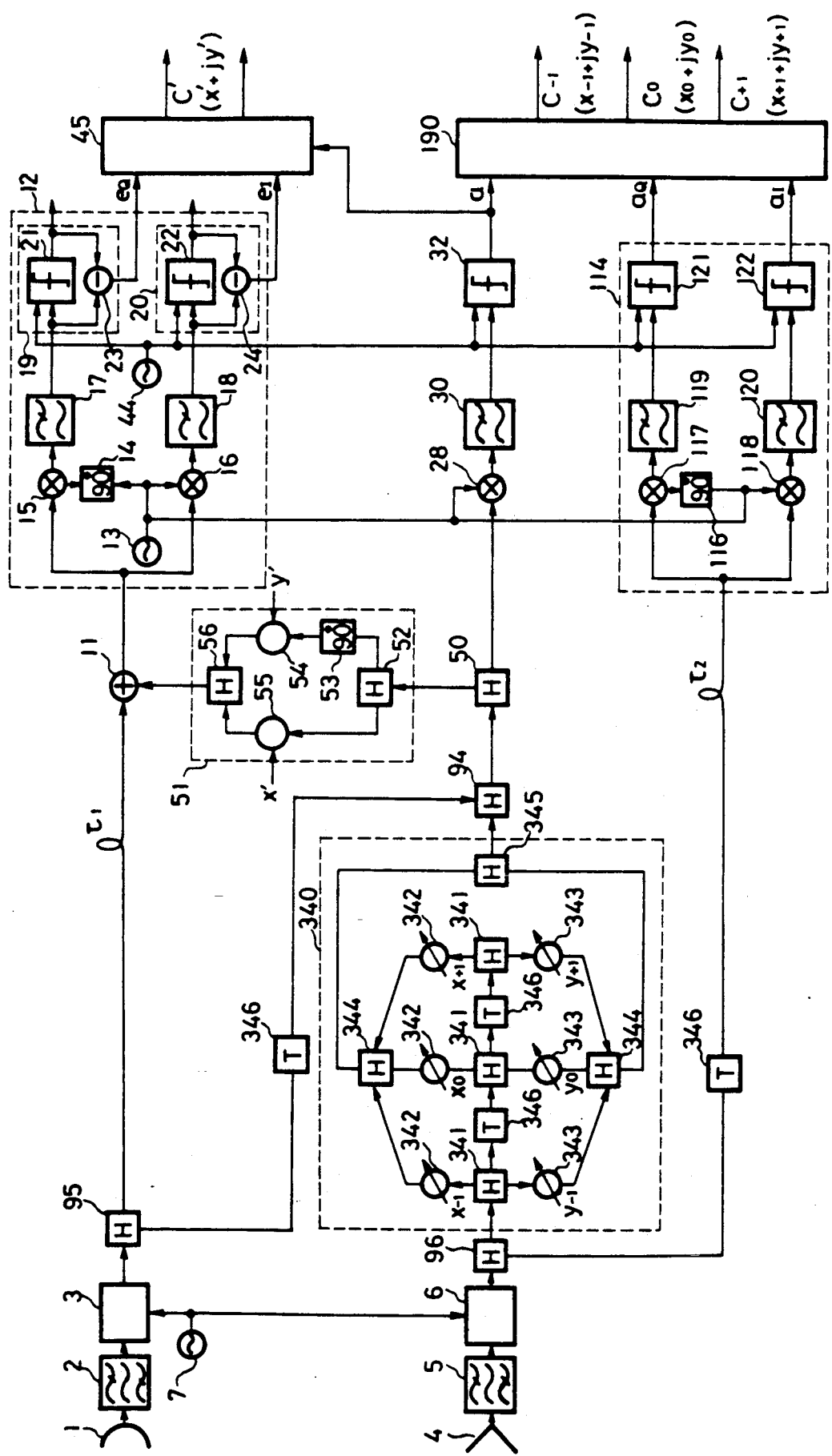
FIG. 14 is a block diagram to show an eleventh embodiment of the interference cancellation circuit according to this invention.

FIG. 14 is a block diagram to show the eleventh embodiment of the interference cancellation circuit according to this invention.

This embodiment differs from the fourth embodiment in that the quadrature amplitude modulator 130 is replaced with a transversal filter 340 (an embodiment with a 3-tap structure is shown). By structuring the circuit in this manner, as long as the received signals either at the main antenna 1 or at the auxiliary antenna 4 have the proper frequency characteristic, the main signal can still be cancelled to extract the interference signal.

The transversal filter 340 extracts the interference signal mixed with the main signal by the following operation.

The main signal which has passed through the signal divider 96 in the receiver system of the auxiliary antenna 4 is input at a quadrature amplitude modulator comprising a delay circuit with plural taps, or a two dimensional transversal filter 340, to control the amplitude and phase of the main signal having the proper frequency characteristics. The transversal filter 340 further divides one of the signal outputs from the divider 96 using a divider 341. The divider and feeds one of the outputs therefrom to a first bipolar attenuator 342 which controls the in-phase component, and feeds the other output to a second bipolar attenuator 344 which controls the quadrature component. The filter further respectively inputs the outputs of both bipolar attenuators 342, 343 at an adder 344 for addition.

The output from the divider 341 is passed through a delay circuit 346 with a delay equivalent to the clock cycle T of the data (or its multiplication by an integer or by 1/integer) from the main signal, and divided by the divider 1341 similarly to the above. One of the signals divided by the divider 1341 is supplied to another first bipolar attenuator 1342 which controls the in-phase component. The other signal is supplied to another second bipolar attenuator 1343 which controls the quadrature phase component. The outputs from the bipolar attenuators 1342, 1343 are added to the outputs of attenuators 342 and 343 by the adder 344 to be output.

The signals which have been delayed by $2 \times T$ by the two delay circuits 346 and 1346 are divided by yet another signal divider 2341, and has its in-phase components controlled by bipolar attenuator 2342 while controlling the quadrature component by the bipolar attenuator 2343. The outputs from the bipolar attenuators 2342, 2343 are also added by the adder 344 for output. The outputs from the adder 344 are combined by a 90 degree combiner 345 to provide the output signal.

On the other hand, the received signal on the side of the main antenna 1 a is divided by a signal divider 95, delayed a delay circuit 346 and input at a combiner 94 to be added with the output from the 90 degree combiner 345. The delay circuit 346 is used to correct and set the delay time of the signal at the delay time T which is identical to the delay time at the center tap of the transversal filter 340.

The two main signals input at the combiner 94 are out-of-phase to each other but are identical in amplitude to each other. As the frequency characteristics thereof are converted to be the same, both signals are combined to extract the interference signal alone.

By using a transversal filter 340 for adding the main signal received by the main antenna 1 with its frequency characteristics to the main signal received by the auxiliary antenna 4 having different frequency characteristics in opposite phase but of the same amplitude to each other, the main signal is remarkably attenuated to emphasize the interference component which is contained therein.

In order to control respective weights of the transversal filter 340, it is necessary to correlate the main signal which is still remaining after combining of the two signals or the interference signal with one of the main signals before combining, and weighting circuits (the first and bipolar attenuators 342, 343) are feed-back controlled in a manner to minimize the amount of the main signal after addition or correlation.

The operation will now be described in more a specific and detailed manner.

The output from the combiner 94 is divided by a divider 50 and input at a phase detector 28. The phase detector 28 detects the in-phase signal from the divider 50 using the local frequency reproduced by the demodulator 12 for the main signal. The detector output is removed of its harmonic components by a low-pass filter 30 and digitized by a decision circuit 32 by means of clock signal 44 reproduced by a demodulator 12. Thus, binary interference signal a is obtained.

The signal received by the auxiliary antenna 4 is divided by the divider 96. One of the outputs from the divider 96 is passed through a delay circuit 346 for adding the delay time T which si identical to the center tap of the transversal filter 340, and supplied to a coherent quadrature phase detector 114 via a delay line $\tau 2$. The signal is phase-detected by phase detectors 117, 118 by means of the local frequency 13 reproduced by the demodulator 12.

The detector output has its harmonic components removed by low-pass filters 119, 120, and is digitized by the decision circuits 121, 122 by means of a clock signal 44 reproduced by the demodulator 12. By these operations, a binary main signal in-phase component $a_I$ and a main signal quadrature component $a_Q$ are obtained.

The digitized interference signal a, the digitized main signal in-phase component $a_I$ and the main signal quadrature component $a_Q$ are input at a transversal filter controller 190. Bipolar variable attenuators 342, 343 of the transversal filter 340 are controlled with the following outputs from the transversal filter controller 190.

$$c_{-1}(= {}^x{-1} + j^Y{-1})$$

$$c_0(= {}^x{_0} + j^Y{_O})$$

$$c_{+1}(= {}^x{_{+1}} + j^Y{_{+1}})$$

Figure 15:
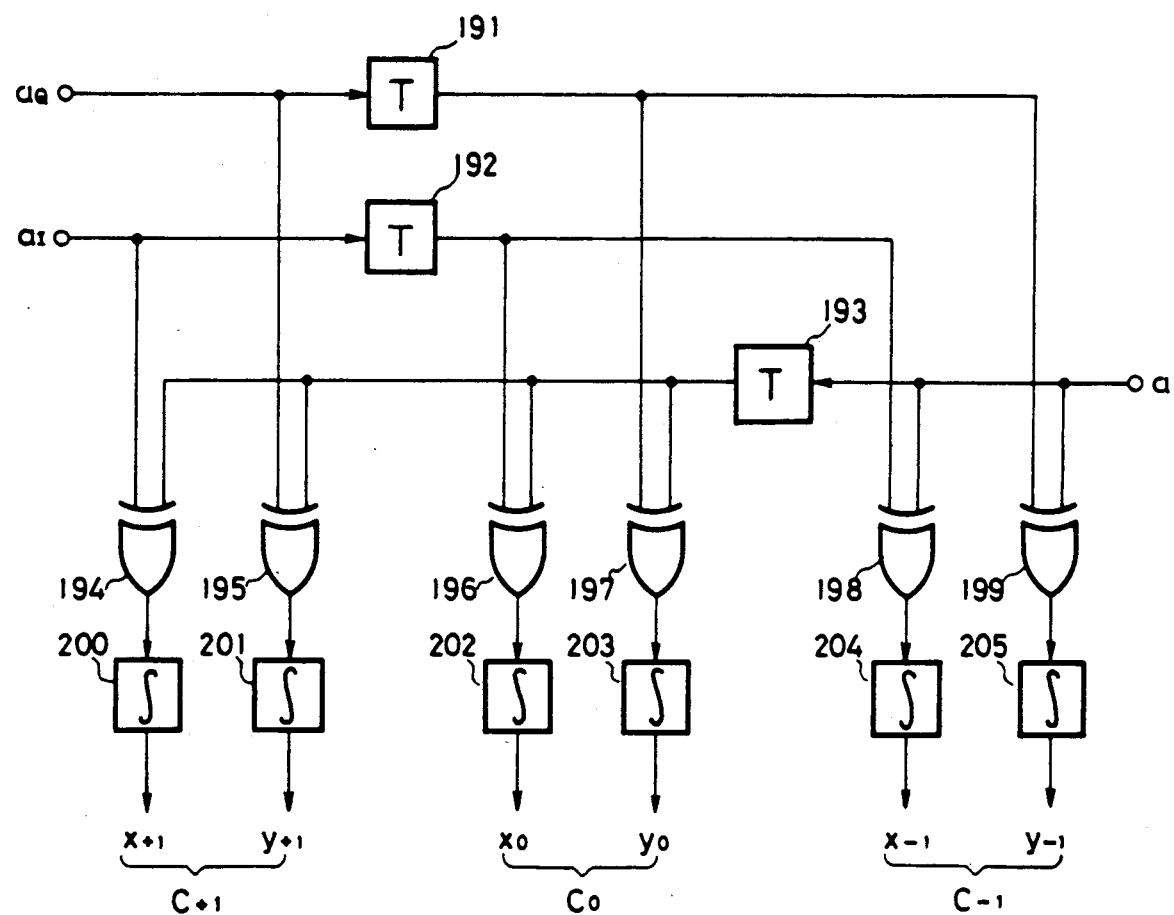
FIG. 15 is a block diagram to show the details of a transversal filter control circuit.

FIG. 15 shows the circuit structure of the transversal filter controller 190.

For instance, signal $X_{-1}$ which controls the bipolar attenuator 342 of the first tap is generated as follows. The binary interference signal a is input at one of the input terminals of the exclusive OR 198 while a signal obtained by delaying the binary main signal in-phase component $a_I$ for $1 \times T$ by the delay circuit 192 is input at the other input terminal. These signals are multiplied by the exclusive OR 198, and the output therefrom is integrated by an integrator 204. This operation provides correlation between two signals. With the output $X_{-1}$ therefrom, the bipolar attenuator 342 which is related to the in-phase component of the first tap of the transversal filter 340 is controlled.

Similarly, the interference signal a and the signal obtained by delaying the binary main signal quadrature component $a_Q$ by $1 \times T$ by the delay circuit 191 are multiplied using the exclusive OR 199, and integrated by the integrator 205. With the output $Y_{-1}$, therefrom, the bipolar attenuator 343 which is related to the quadrature component of the first tap at the transversal filter 340 is controlled.

In a similar manner, the bipolar attenuators 1342, 1343 of the second tap and 2342, 2343 of the third tap are controlled by the signals $C_{-1}$, $C_0$, and $C_{+1}$ to cause the frequency characteristics and amplitude in the output from the 90 degree combiner 345 to coincide with those in the output from the divider 95 on the main signal side but to become out-of-phase to each other. Therefore, even if the frequency characteristics of the two input received signals differ slightly from each other, if when they are combined, the main signal is almost fully erased while the level of the interference component mixed therein is increased. Then, the interference component is output as an interference signal from the combiner 94.

In this embodiment, it is necessary to adjust relative timings using delay lines τ1 and τ2 to maximize the effect of the cancellation. Moreover, it is necessary to cause relative delay times of the two main signals to coincide with each other.

Although the number of taps at the transversal filter is described as being three, the precision in extraction of the interference signals may be increased by increasing the number of taps. A similar effect may be achieved by using transversal filters of other structures.

EMBODIMENT 12

Figure 16:
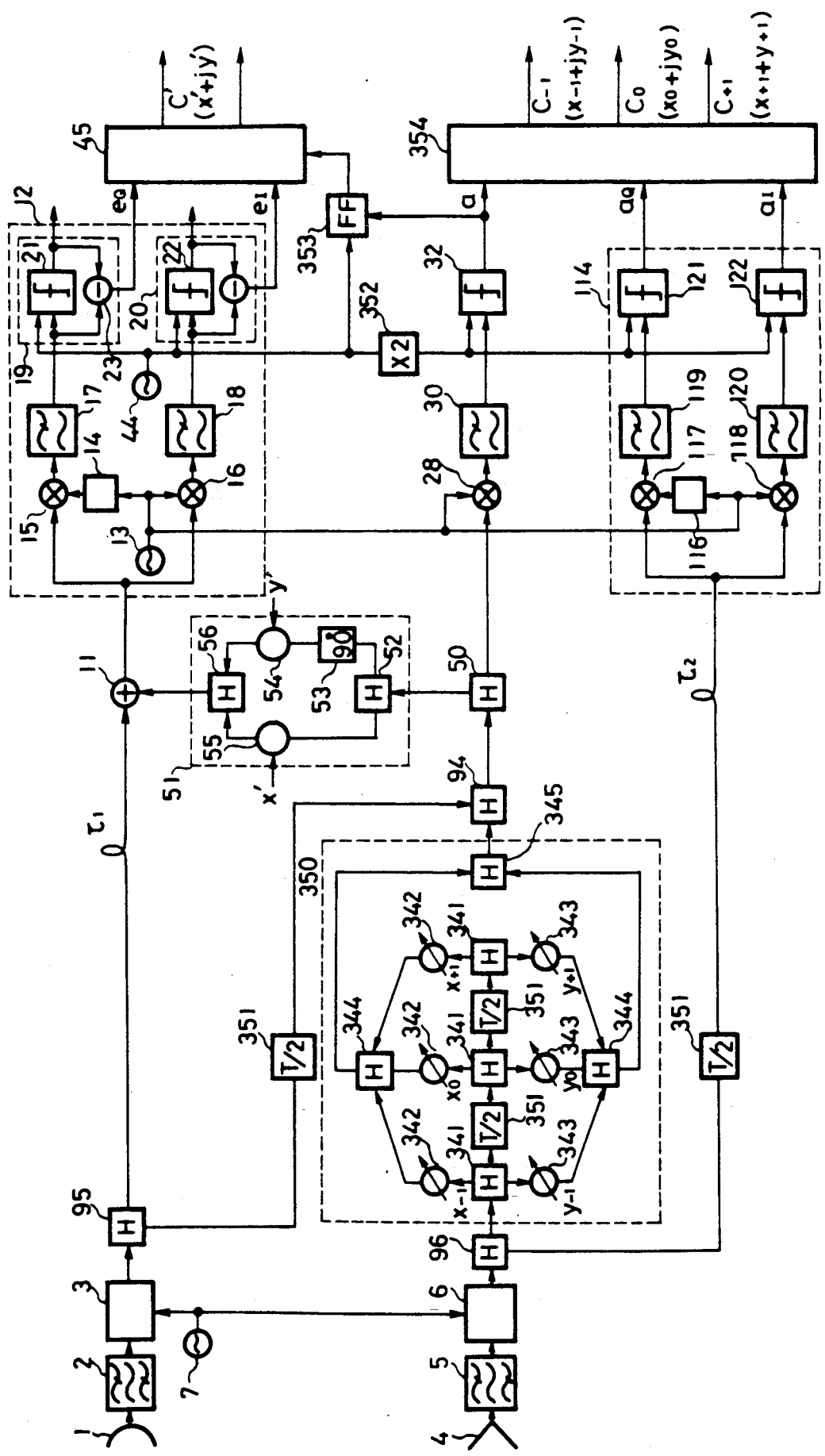
FIG. 16 is a block diagram to show a twelfth embodiment of the interference cancellation circuit according to this invention.

FIG. 16 is a block diagram to show the twelfth embodiment of an interference cancellation circuit according to this invention.

This embodiment differs from embodiment 11 in that the transversal filter 340 is replaced with a transversal filter 350 having an extra delay circuit 351 with a delay time which is one half of the data clock cycle T. This embodiment further uses a transversal filter controller 354 having a delay circuit 351 of the delay time T/2. By structuring the circuit in this way, even if the relative delay times of the two main signals do not conincide with each other, the effect of cancellation is prevented from decreasing. However, in this embodiment, it is necessary to double the operational speed of the decision circuits 32, 121, 122 connected to inputs of the transversal filter controller 354. The clock signal 44 is doubled in frequency by a frequency multiplier 352 to be input at the decision circuits 32, 121, 122. As the correlation detector 45 for controlling the quadrature amplitude demodulator 51 must be synchronized to clock signal 44 in operation, the output from the decision circuit 32 is decreased to one half in frequency by a flip flop 353.

Although the additional delay circuit 351 of T/2 was described for this embodiment, any delay time of T divided by an integer may be similarly used.

Figure 17:
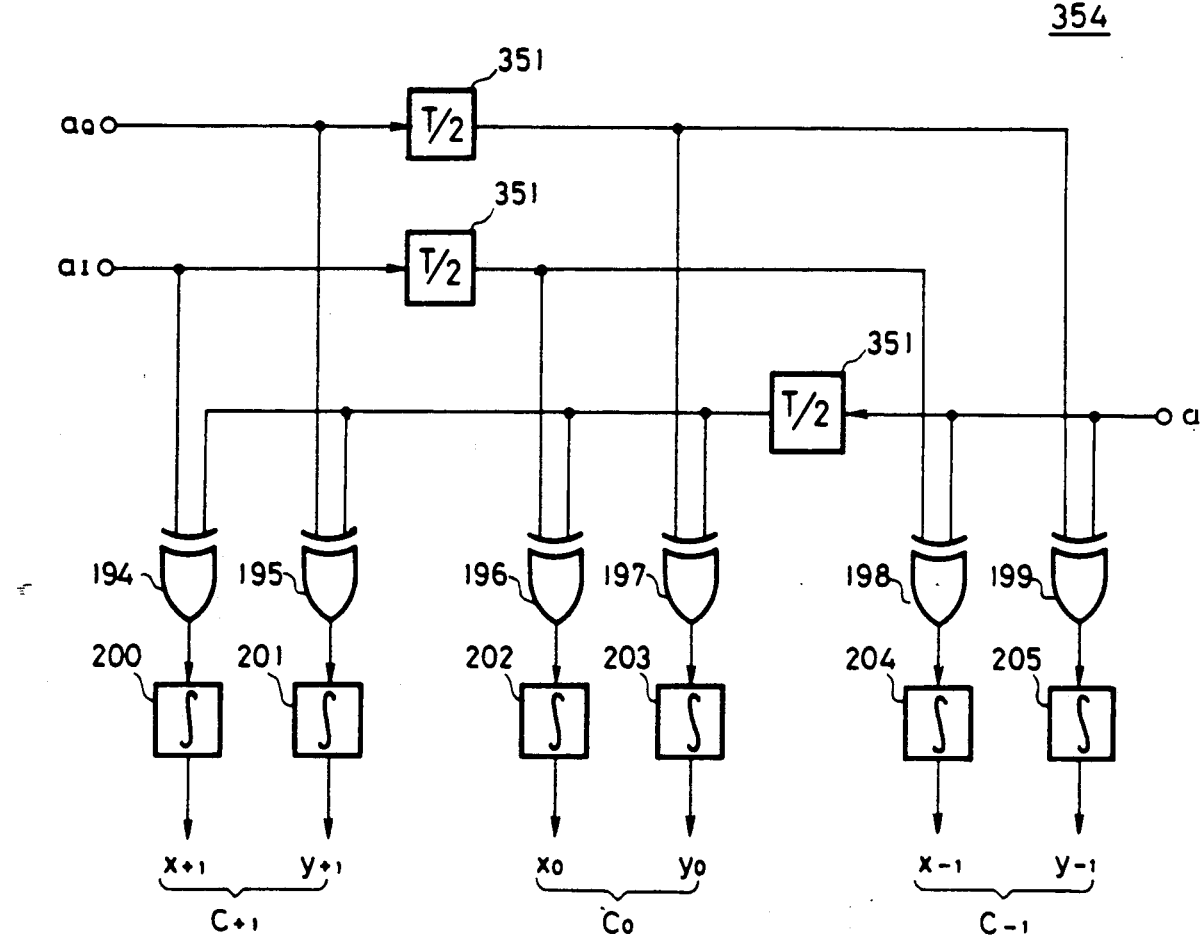
FIG. 17 is a view to show the circuit structure of a transversal filter control circuit.

FIG. 17 shows the circuit structure of a transversal filter controller 354 using the T/2 delay circuit 351.

EMBODIMENT 13

Figure 18:
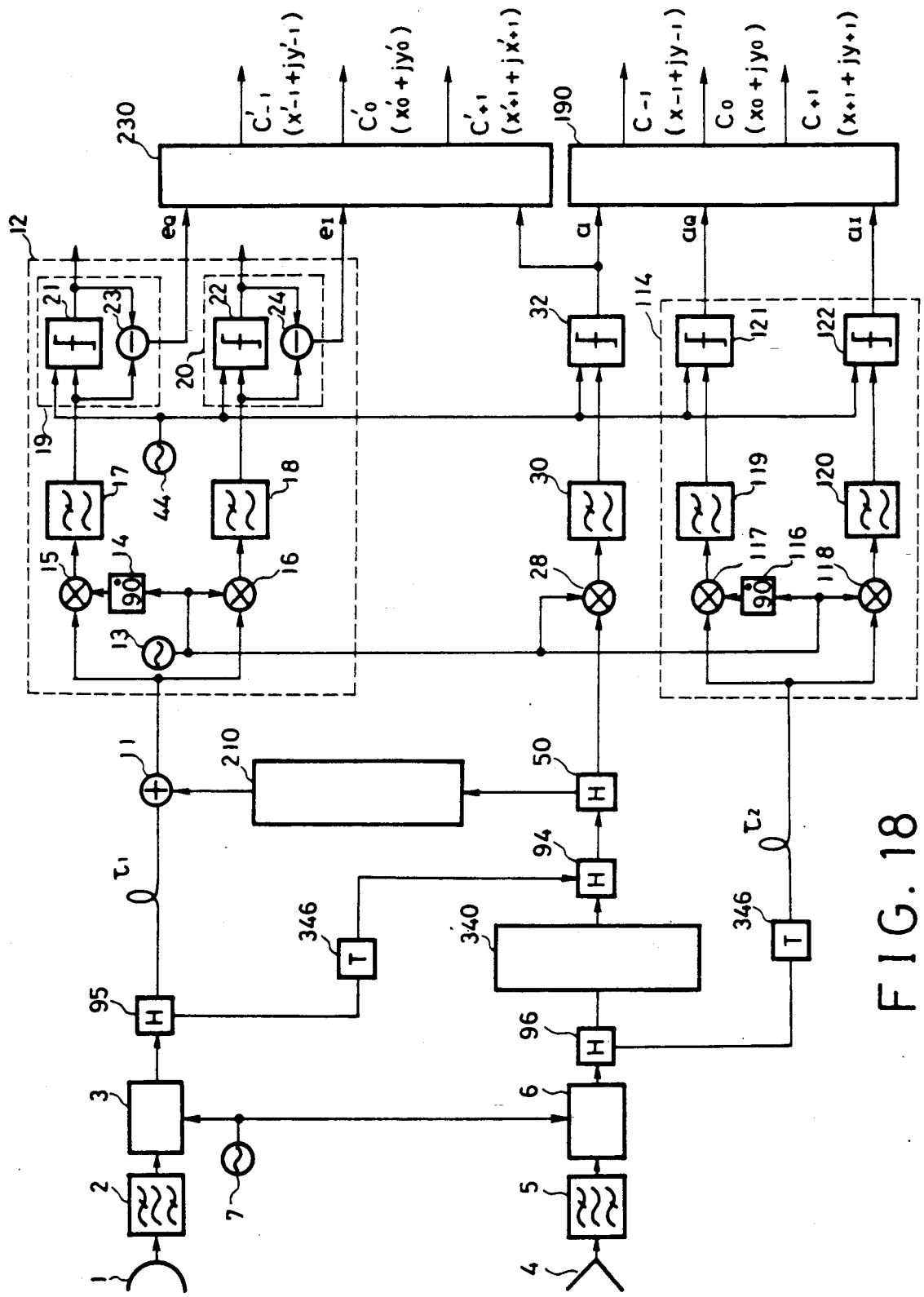
FIG. 18 is a block diagram to show a thirteenth embodiment of the interference cancellation circuit according to this invention.

FIG. 18 is a block diagram to show the thirteenth embodiment of the interference cancellation circuit according to this invention.

This embodiment differs from the embodiment 11 in that a transversal filter 210 comprising delay lines with plural taps is used to cancel an interference signal mixed in the main signal instead of adjusting the amplitude and phase of the interference signal with a quadrature amplitude demodulator 51 having a single tap. With this structure, the circuit is highly effective in interference cancellation even if the interference signal is a wide band signal and has frequency characteristics.

In FIG. 18, the interference signal output from the combiner 94 is passed through the transversal filter 210 and supplied to the combiner 11. The transversal filter 210 and the transversal filter controller 230 are structured similarly to the aforementioned transversal filter 340 and the transversal filter controller 190.

EMBODIMENT 14

Figure 19:
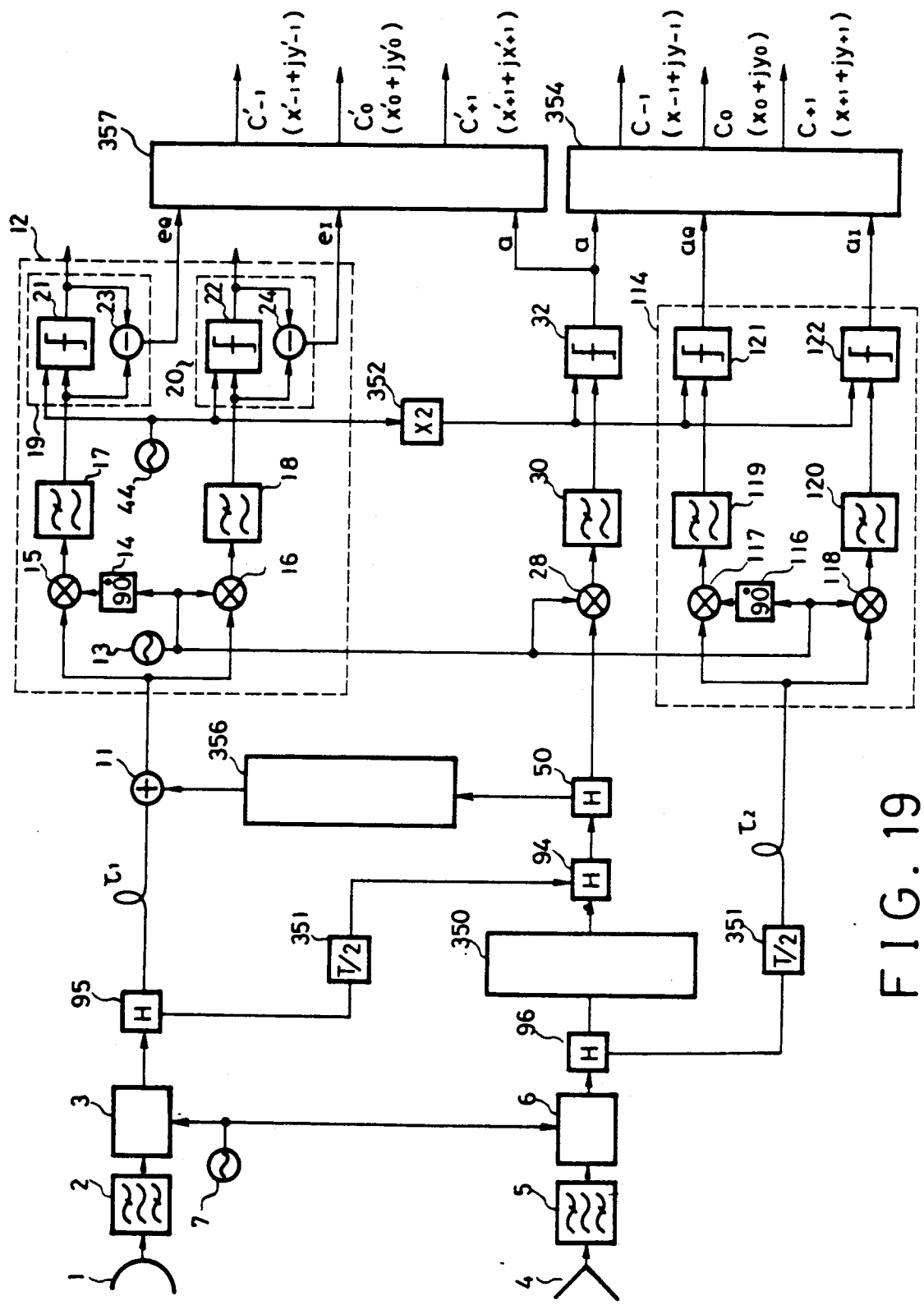
FIG. 19 is a block diagram to show a fourteenth embodiment of the interference cancellation circuit according to this invention.
Figure 20:
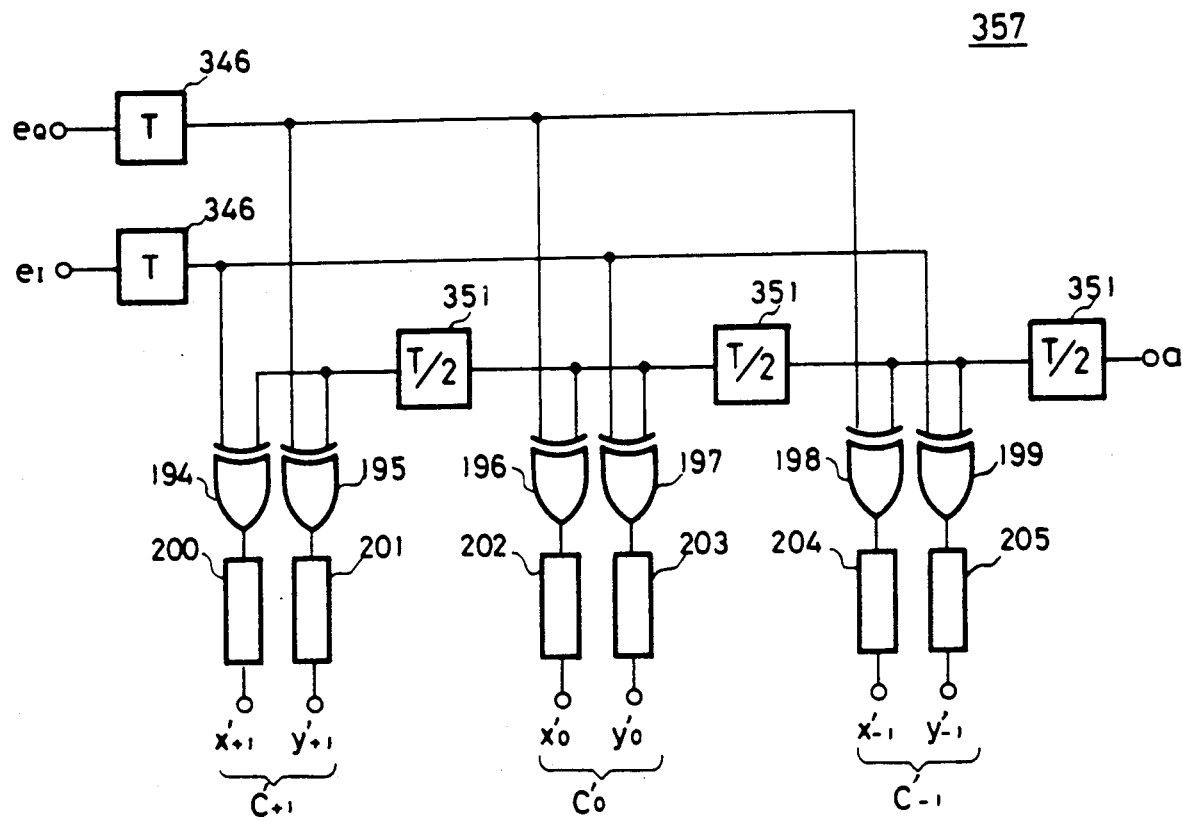
FIG. 20 is a view to show the circuit sturcture of a transversal filter control circuit.

FIG. 19 is a block diagram to show the foruteenth embodiment of the interference cancellation circuit according to this invention, and FIG. 20 a circuit diagram of a tansversal filter controller 357.

This embodiment differs from the embodiment 13 in that the transversal filters 340, 210 and the transversal filter controllers 190, 230 are replaced with the transversal filter 350 and the transversal filter controller 354 shown for the embodiment 12 and a transversal filter 356 and a transversal filter controller 357 of the same structure as the above.

The same effect may be achieved by replacing only the transversal filter 340 of the embodiment 13 with the transversal filter 350 of this embodiment without replacing the transversal filter 210, and using correspondingly the transversal filter controller 354. Alternatively, the transversal filter 210 of the embodiment 13 is replaced by the transversal filter 356 of this embodiment and using the transversal filter controller 357 correspondingly thereto.

EMBODIMENT 15

Figure 21:
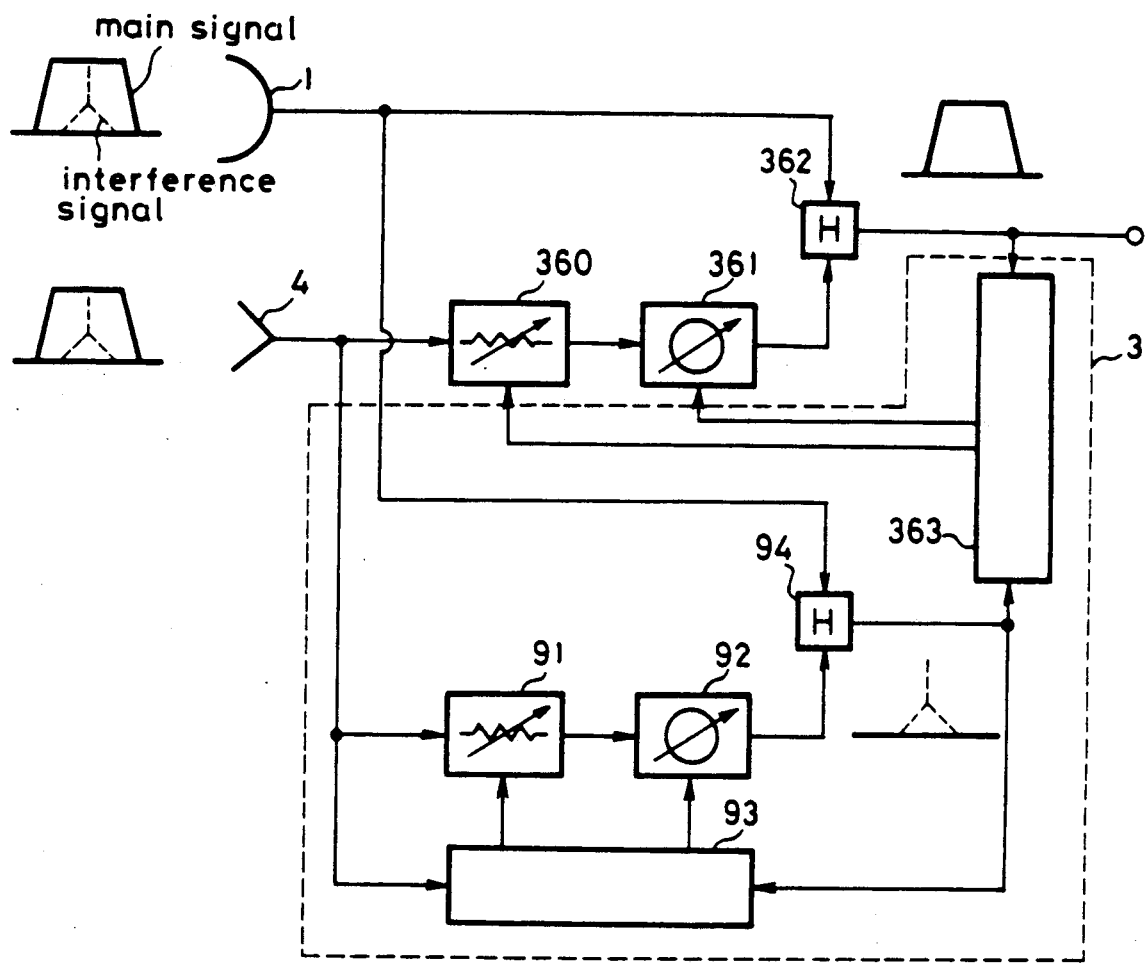
FIG. 21 is a block diagram to show a fifteenth embodiment of the interference cancellation circuit according to this invention.

FIG. 21 is a block diagram to show the fifteenth embodiment of the interference cancellation circuit according to this invention.

This embodiment is identical to the embodiment 1 in that the interference signal is extracted from the two received signals, but differs from the embodiment 1 in that the interference signal component included in the received signal of the auxiliary antenna 4 is adjusted in amplitude and phase, combined with the received signal of the main antenna 1, and adjusted in amplitude and phase in a manner to minimize the interference signal component included in the output from the combiner. To this extent it is opposite from embodiment 1 which maximizes the interference signal.

More particularly, a signal or a mixture of the main signal and the interference signal is received one each by two receiver circuits or the main antenna 1 with its own output circuit and the auxiliary antenna 4 with its own output circuit. This embodiment further comprises the following; a variable attenuator 91 and a variable phase shifter 92 as the first adjusting means which adjusts the relative amplitude and phase of received signal obtained at the respective outputs of the two receiver circuits; a combiner 94 as the first combining means which combines the two received signals which have been adjusted in amplitude and phase by the first adjusting means; a controller 93 as the first controlling means which controls the first adjusting means so as to make the interference signal component included within the output from the first combining means sufficiently larger in level than the main signal component, a variable attenuator 360 and a variable phase shifter 361 as the third adjusting means which adjusts the relative amplitude and phase of the received signal at the outputs of the two receiver circuits and which is separately provided from the first adjusting means; a combiner 362 as the third combining means which combines the two received signals which have been adjusted in amplitude and phase by the third adjusting means; and a controller 363 as the third controlling means which controls the third adjusting means to make the interference signal component included within the output from the third combining means sufficiently small.

The method to cancel the interference signal mixed within the main signal will be described below.

In order to cancel the interference signal out of the output from the combiner 362, the variable attenuator 360 and the variable phase shifter 361 are controlled in a manner to make the interference signal within the signal received by the auxiliary antenna 4 and the interference signal within the signal received by the main antenna 1 identical in amplitude but opposite in phase to each other.

Correlation between the interference signal output from the combiner 94 and the interference component included within the output from the combiner 362 is detected by a controller 363, and the variable attenuator 360 and the variable phase shifter 361 are controlled to remove the interference component. In order to make the ratio of the main signal power to the interference signal power (D/U), in the output from the combiner 362 larger than the ratio of the main antenna 1 against the auxiliary antenna 4 in input or their D/U ratio, the variable attenuator 360 may be inserted not only in the side of the auxiliary antenna 4 but also on the main antenna 1.

By the operation mentioned above, the interference signal mixed within the main signal may be automatically cancelled.

This embodiment will now be described more specifically below.

EMBODIMENT 16

Figure 22:
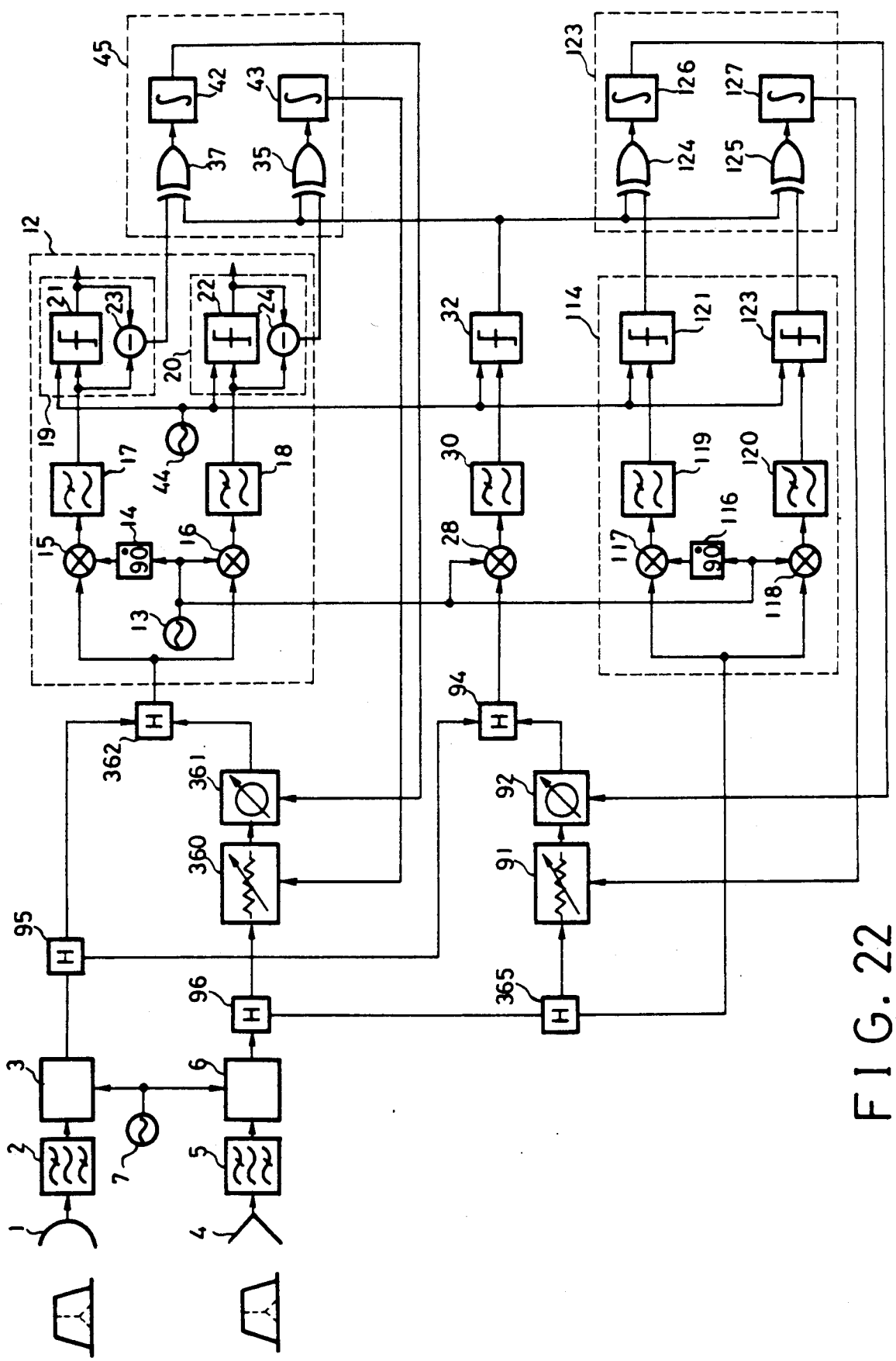
FIG. 22 is a block diagram to show a sixteenth embodiment of interference cancellation circuit according to this invention.

FIG. 22 is a block diagram to show the 16th embodiment of the interference cancellation circuit according to this invention.

The signals received by the main antenna 1 and the auxiliary antenna 4 are passed through band pass filter 2, 5 to improve signal-to-noise ratio and are converted into intermediate frequency respectively by the frequency converters 3, 6 by means of the local frequency from a common local oscillator 7.

The signals that have been converted to IF are input respectively at dividers 95, 96. One of the outputs from the divider 95 is input at the combiner 362. One of the outputs from the divider 96 is input at a combiner 94 via the divider 365, the variable attenuator 91 and the variable phase shifter 92. The circuits 91 and 92 are feedback controlled so that the main signal in the above mentioned output from the divider 96 has the same amplitude as, but opposite phase to, the main signal in the other output from the divider 95. This greatly attenuates the main signal output within the output from the combiner 94, to thereby emphasize the interference signal.

The method of controlling the circuits 361 and 362 is described below. This method causes the interference signal within the signal received by the auxiliary antenna 4 to have the same amplitude, as but opposite phase to, the interference signal in the signal received by the main antenna 1.

The main signal combined by the combiner 362 is input at the demodulator 12. The demodulator 12 detects in quadrature phase the main signal by the phase detectors 15, 16 by means of the local frequency reproduced from the main signal, and the output signals therefrom are passed to the low-pass filters 17, 18 respectively for removing the harmonic components to obtain in-phase and quadrature phase baseband signals.

Thus obtained baseband signals are input at error detectors 19, 20 respectively. The error detectors 19, 20 comprise decision circuits 21, 22 and substractors 23, 24 out of which error signals are output.

On the other hand, the interference signal output from the combiner 94 is detected in-phase by the phase detector 28 by means of a local frequency 13, removed of its harmonic component by the low-pass filter 30, and digitized by a decision circuit 32. This operation provides binary interference signals. The decision circuit 32 operates with a clock signal 44 reproduced by the main signal demodulator 12 to digitize the signals.

The operation proceeds to the step of detecting the correlation between the in-phase and quadrature error signals obtained from the demodulator 12 and the digitized interference signal. More particularly, the error signal and the interference of the in-phase component signal are digitally multiplied by an exclusive OR 35, and the output therefrom is used to control a variable attenuator 360. The error signal and the interference signal of the quadrature component are digitally multiplied by an exclusive OR 37, and the output therefrom is integrated by an integrator 42, and the output signal therefrom is used to control a variable phase shifter 361. In this manner, interference is automatically cancelled.

EMBODIMENT 17

Figure 23:
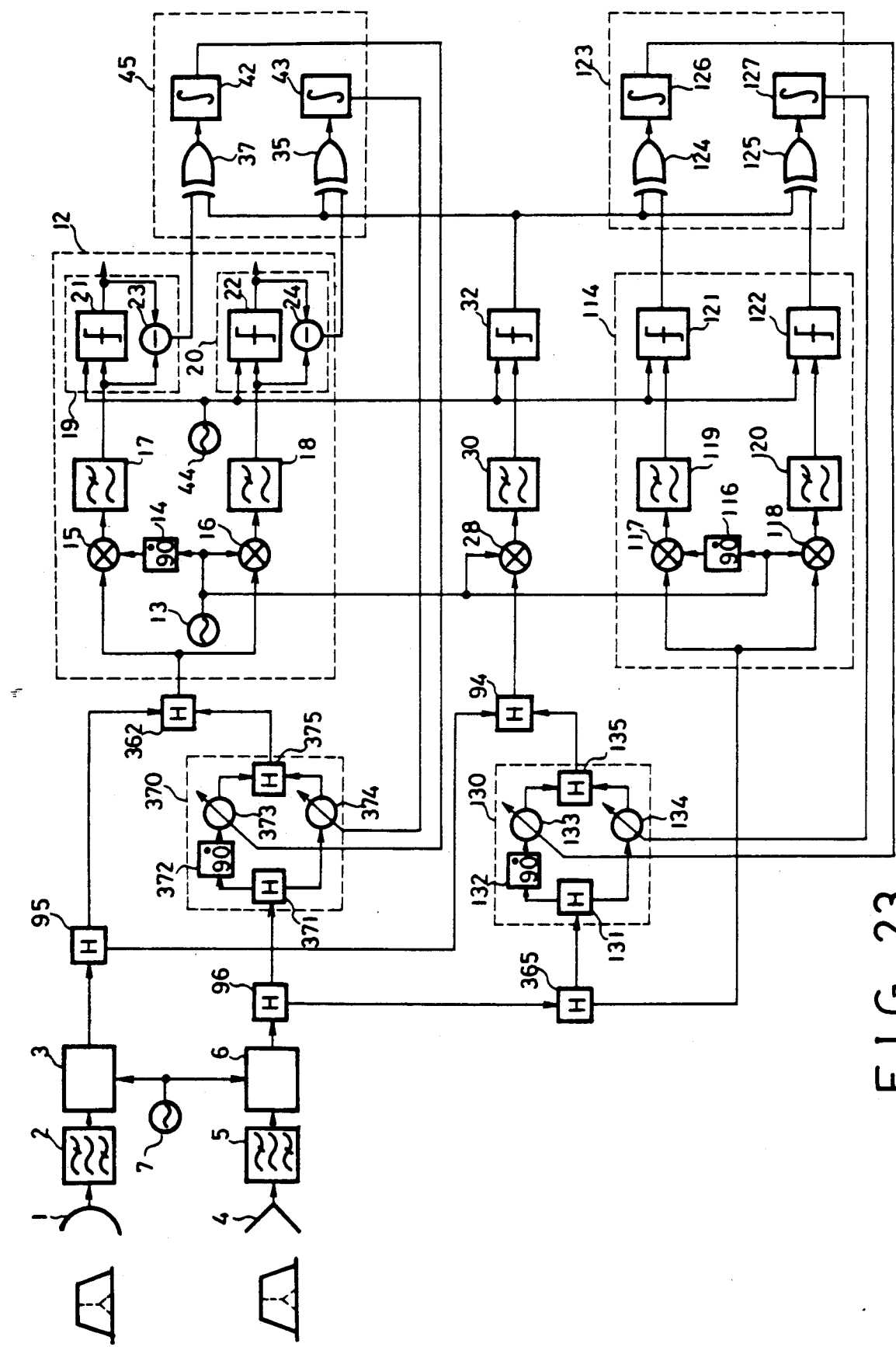
FIG. 23 is a block diagram to show a seventeenth embodiment of interference cancellation circuit according to this invention.

FIG. 23 is a block diagram to show the 17th embodiment of the interference cancellation circuit according to this invention.

This embodiment differs from the embodiment 16 in that the amplitude and phase of the signal received by the auxiliary antenna 4 is controlled by a quadrature amplitude modulator while this is controlled by a variable attenuator and a variable phase shifter in the embodiment 16.

More particularly, the circuits 361 and 360 are controlled respectively with the correlation output from the integrators 42, @3, and the variable phase shifter 92 and the variable attenuator 91 are controlled with the correlation output from the integrators 126, 127 in the embodiment 16, the same operation is executed by using the quadrature amplitude modulators 130, 370 in this embodiment.

The quadrature amplitude modulator 130 comprises a divider 131 for dividing input signals, a 90 degree phase shifter 132 which shifts one of the outputs of the divider 131 by 90 degrees, a bipolar attenuator 133 of quadrature phase which adjusts the amplitude of the output from the 90 degree phase shifter 132, a bipolar attenuator 134 which adjusts the amplitude of the other output from the divider 131, and a combiner 135 which combines the outputs from the bipolar attenuators 133, 134.

The quadrature amplitude modulator 370 similarly comprises a divider 371, a 90 degree phase shifter 372, a bipolar attenuator 373, 374 and a combiner 375.

The bipolar attenuator 134 controlling in-phase within the other quadrature amplitude modulator 130 is controlled by the output from the integrator 127 of the correlation detector output 123. The quadrature phase bipolar attenuator 133 is controlled by the output from the integrator 126.

The in-phase bipolar attenuator 374 and the quadrature phase bipolar attenuator 373 within the other quadrature amplitude modulator 370 are similar and respectively controlled with the outputs from the integrators 43, 42 within the correlation detector 45.

EMBODIMENT 18

Figure 24:
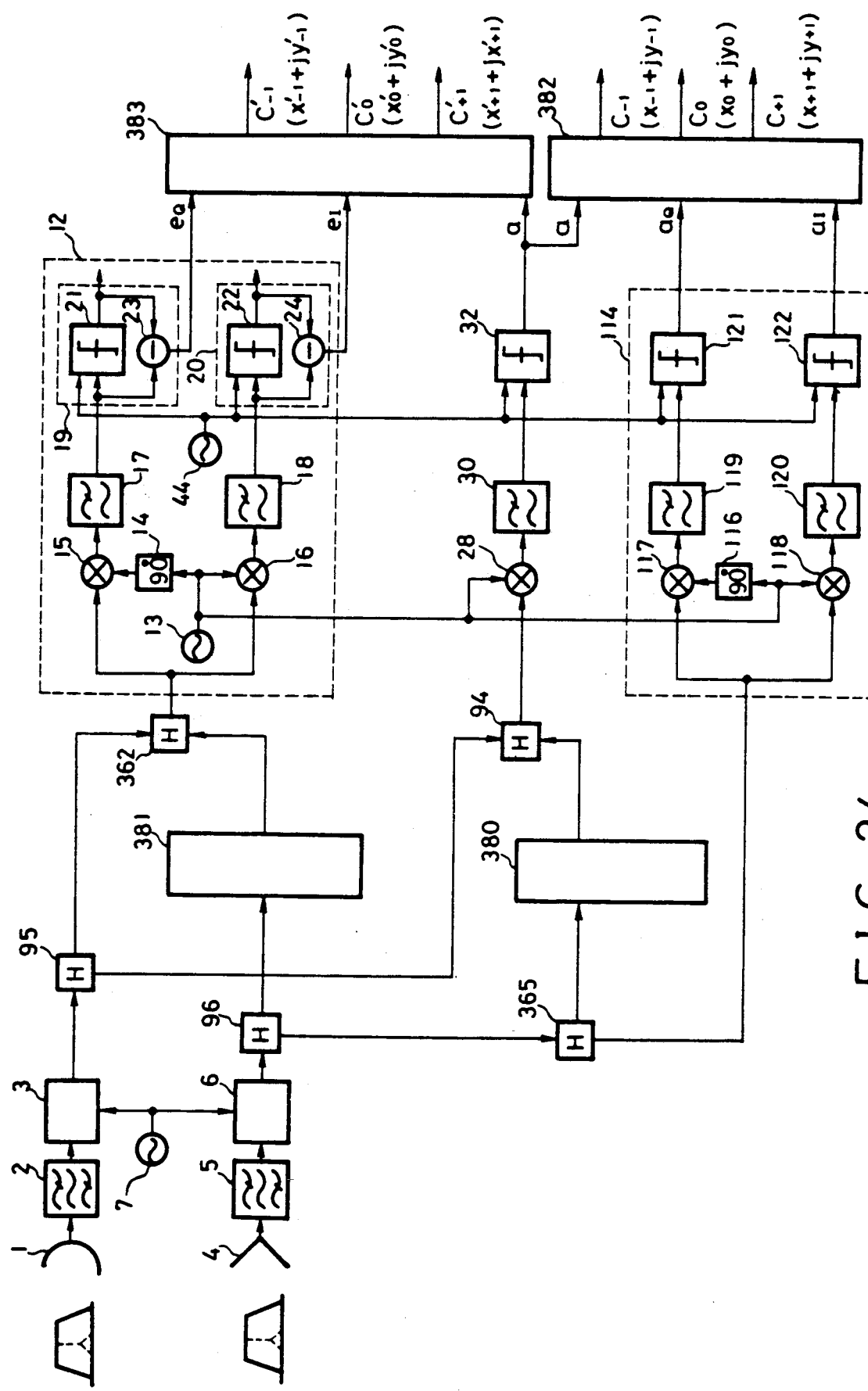
FIG. 24 is a block diagram to show an eighteenth embodiment of interference cancellation circuit according to this invention.

FIG. 24 is a block diagram to show the 18th embodiment of the interference cancellation circuit according to this invention.

This embodiment differs from the embodiment 17 in that the quadrature amplitude modulators 130, 370 are replaced with the transversal filters 380, 381 for controlling the amplitude and phase of the signal received by the auxiliary antenna 4. By structuring the circuit in this manner, even if the signals received by the main antenna 1 or the auxiliary antenna 4 have the same frequency characteristics, interference signal can still be cancelled from the received signal. The transversal filters 380, 381 may be the same as those shown in FIG. 14, and the transversal filter controllers 382, 383 may be the same as those shown in FIG. 15.

EMBODIMENT 19

Figure 25:
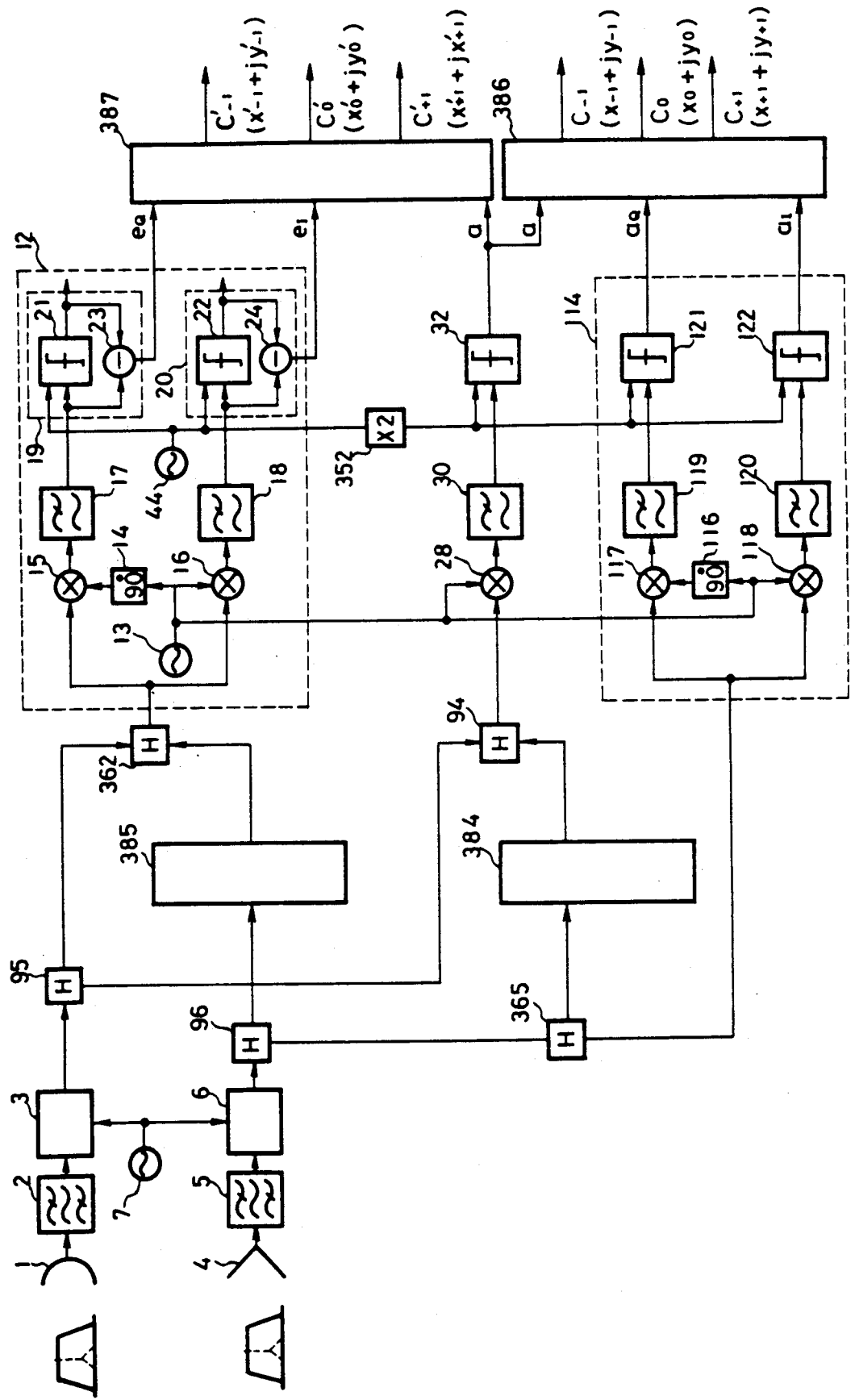
FIG. 25 is a block diagram to show a nineteenth embodiment of interference cancellation circuit according to this invention.

FIG. 25 is a block diagram to show the 19th embodiment of the interference cancellation circuit according to this invention. In this embodiment, the delay time between the taps of the controllers 386, 387 of the transversal filters 384, 385 is T/2, or more particularly the transversal filters 384, 385 are the same as the transversal filter 350 shown in FIG. 16, and their controllers 386, 387 are the same as the one shown either in FIG. 17 or 20. In this case, clock signal 44 is doubled in frequency by a frequency multiplier 352 and input at decision circuits 32, 121, and 122 similarly to the case shown in FIG. 16.

EMBODIMENT 20

FIG. 26 is a block diagram to show the 20th embodiment of the interference cancellation circuit according to this invention.

The interference cancellation circuit of this embodiment comprises a main antenna 1 with its output circuit and an auxiliary antenna 4 with its output circuit as the two receiver circuits which separately receive a mixture of the main signal and the interference signal; a variable attenuator 91 and a variable phase shifter 92 as the first adjusting means which adjusts the relative amplitude and phase of received signals obtained at the its of the two receiver circuits; a combiner 94 receiving outputs as the first combining means which combines the two received signals which have been adjusted in amplitude and phase by the first adjusting means; a controller 93 as the first controlling means which controls the first adjusting first means so as to make the interference signal component included within the output from the first combining means sufficiently larger in level than the main signal component; a variable attenuator 10 and a variable phase shifter 38 as the second adjusting means which adjusts the amplitude and phase of the output from the first combining means, a combiner 11 as the second combining means which combines the output from the second adjusting means to the sum of the received signals of the two receiver circuits, and a controller 95 as the second controlling means which controls the second adjusting means so as to make the interference signal component included in the output from the second combining means sufficiently small.

The main and auxiliary antennas 1 and 4 are directed to the transmission source of the main signal (digital signals in this embodiment). As the interference source direction, receiver circuits inevitably assumed to be in the same direction receive the main signal and the interference signal simultaneously.

In digital radio transmission, a so called combing system is generally employed. In this case, two antennas are used as they are and the signals respectively received by the main antenna 1 and the auxiliary antenna 4 are combined by a combiner 90.

The method of extracting the interference signal mixed with the main signal will be described below.

The signal received by the main antenna 1 is supplied at one of the inputs of a combiner 94 after being divided. The signal received by the auxiliary antenna 4 is also divided. The signal received by the auxiliary antenna 4 is also divided and then passed through the variable attenuator 91, and the variable phase shifter 92, and supplied at the other input of the combiner 94.

Main signals at the two inputs of the combiner 94 should be in opposite phase but in the same amplitude to each other in order to extract the interference signal out of the output from the combiner 94. The received signal sent from the auxiliary antenna 4 and the received signal sent from the main antenna 1 have this in relative amplitude and phase differences detected by a controller 93 and the variable phase shifter 92, and the variable attenuator 91 is controlled with the output therefrom. By appropriate control, the main signal is erased from the output from the combiner 94 to leave the interference signal alone.

The method to cancel the interference signal mixed within the main signal based on thus extracted interference signal will now be described.

The interference signal output from the combiner 94 is supplied at one of the inputs of the combiner 11 via the variable attenuator 10 and the variable phase shifter 8. The received signal output from the combiner 90 is supplied at the other input of the combiner 11. The interference signals at the inputs of the combiner 11 should be in opposite phase but in the same amplitude to each other in order to cancel the interference signal from the output from the combiner 11.

Therefore, the relative difference in amplitude and phase between the interference signal output from the combiner 94 and the interference component included within the signal output from the combiner 90 are detected, and the variable attenuator 10 and the variable phase shifter 8 are controlled so as to cause the two signals to have opposite phases and the same amplitude to each other.

As described above, the interference signal which has been mixed within the main signal is automatically extracted, and interference may be automatically cancelled based the extracted signal.

A more detailed construction of the controllers 93 and 95 will be described in relation to the 21st embodiment and those following.

EMBODIMENT 21

Figure 27:
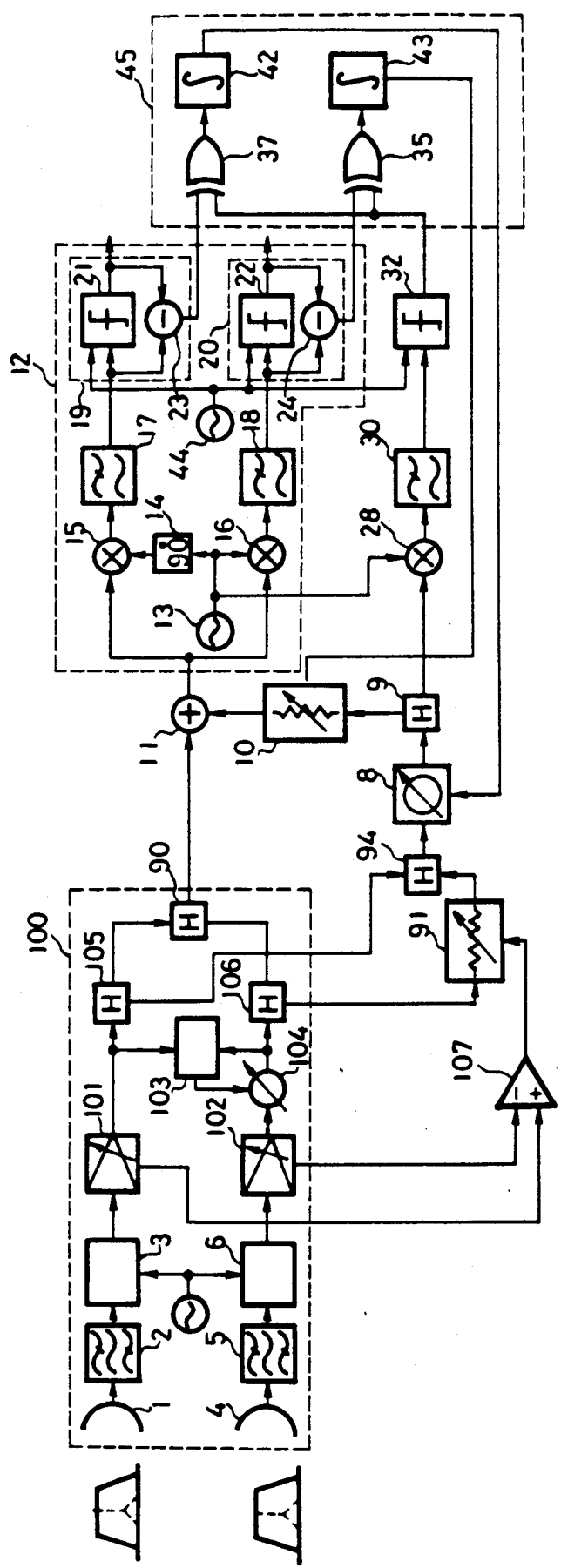
FIG. 27 is a block diagram to show a twenty-first embodiment of this invention.

FIG. 27 is a block diagram to show the 21st embodiment of this invention wherein a main antenna 1 and an auxiliary antenna 4 are directed to the transmission source of the main signal (digital signal), which includes an interference signal.

The signals received by the two antennas are passed through the band pass filters 2, 5 (not always required) for improving S/N, and are converted into an intermediate frequency by the frequency converters 3, 6 by means of a common local oscillator 7.

The signals converted to IF band are respectively passed through automatic gain controllers 101, 102 to give the same amplitude to the outputs therefrom. Out of the outputs with the same amplitude, the output from the circuit 101 is supplied to a combining phase controller 103 and a divider 105 while the output from the circuit 102 is supplied to the same combining phase controller 103 and a divider 106 via a variable phase shifter 104.

The variable phase shifter 104 has its phase adjusted by the phase controller 103, and the outputs from the dividers 105, 106 are therefore supplied to the combiner 90 having the same phase.

The in-phase combiner circuit 100 comprises the parts denoted by reference numerals 1 through 7, 101 through 106, and 90.

The interference signal mixed within the main signal can be extracted as follows.

The controller voltage of the two automatic gain controllers 101, 102 are input at a differential amplifier 107, the output therefrom is used to control a variable attenuator 91 connected to the divider 106, and the output from the variable attenuator 91 and the output from the divider 105 are given the same amplitude. As the output from the circuit 91 and the output from the divider 105 have already been adjusted have the same phase, if they are input at a 180 degree combiner 94, they are added to each other in out-of-phase. The main signal from the combiner 94 is offset in out-of-phase relation to output the interference signal alone.

By employing thus-obtained interference signal, the interference component remaining within the main signal which is produced by combining the two signals in-phase is cancelled.

More particularly, the interference signal obtained as above is sequentially input at a variable attenuator 10 which controls the amplitude and at a variable phase shifter 8 which controls the phase, and the outputs from the circuits 8 and 10 are combined by an combiner 11.

As the output signal from the circuit 10 has already been adjusted to have a substantially opposite phase to and the same amplitude as the interference component mixed in the signal output from the combiner 90, the output from the combiner 11 does not contain the interference component.

The delay times at the combiner 94 which combines the two main signals in an out-of-phase relation but with the same amplitude should be coincidental to each other.

The control method of the circuits 8 and 10 will now be described below.

The received signals combined by the combiner 11 are input at the demodulator 12. The demodulator 12 detects in-quadrature the received signals by a quadrature phase detector comprising a 90 degree phase shifter 14 and phase detectors 15, 16 by means of the local frequency reproduced from the received signals, and passes the output signals respectively to low-pass filters 17, 18 to obtain quadrature and in-phase baseband signals. The obtained baseband signals are respectively input at error signal detectors 19, 20. The error signal detectors 19, 20 comprise decision circuits 21, 22, and subtractors 23, 24 for calculating the difference between the inputs and outputs, and error signals are output from the subtractors 23, 24.

When the main signal is a 16QAM signal, an A/D converter of 3 bits or more may be used as the error signal detector. Quaternary baseband signal is obtained by demodulating the 16QAM signal. By passing the quaternary signal through a decision circuit (A/D converter) having the output of 3 bits or more, the most significant two bits in the output therefrom indicate a decision signal and the third bit an error signal as shown in the table above. The error signal may be obtained from the third bit in this way.

The interference signal obtained by the combiner 94, on the other hand, is passed through a variable phase shifter 8 and a divider 9, is phase-detected by a phase detector 28 by means of aforementioned local frequency 13, has its harmonic component removed by a low-pass filter 30 and digitized by a decision circuit 32. This operation provides digitized interference signals. The decision circuit 32 digitizes the signal by employing the clock signal 44 reproduced by the demodulator 12 on the main signal side.

The correlation of the error signal is detected in the in-phase and the quadrature components obtained by the demodulator 12 with the interference signal which has been digitized. More particularly, the error signal and the interference signal of the in-phase component are digitally multiplied by an exclusive OR 35, and the output is integrated by an integrator 43, and the variable attenuator 10 is controlled with the output. The error signal of the quadrature component and the interference signal are digitally multiplied by an exclusive OR 37, and the output therefrom is integrated by an integrator 42. The variable phase shifter 8 is controlled with the output signal therefrom.

The correlation detector 45 comprises exclusive ORs 35, 37 and integrators 42, 43. By connecting the outputs of the integrators 42, 43 with the variable attenuator 10 and the variable phase shifter 8 respectively, amplitude controlling means and phase controlling means are respectively constructed. The controller 95 of the embodiment 20 comprises a phase detector 28, a low-pass filter 30, a decision circuit 32 and a correlation detector 33. The controller 93 in the embodiment 20 comprises a phase controller 103 and a differential amplifier 107.

In this manner, interference may be cancelled automatically. Although multiplication in binary codes with exclusive ORs 35, 37 is described herein, the digitizing circuit for the interference signals is not absolutely necessary, and the same effect may be achieved by an analog multiplier instead of an exclusive OR gate.

EMBODIMENT 22

Figure 28:
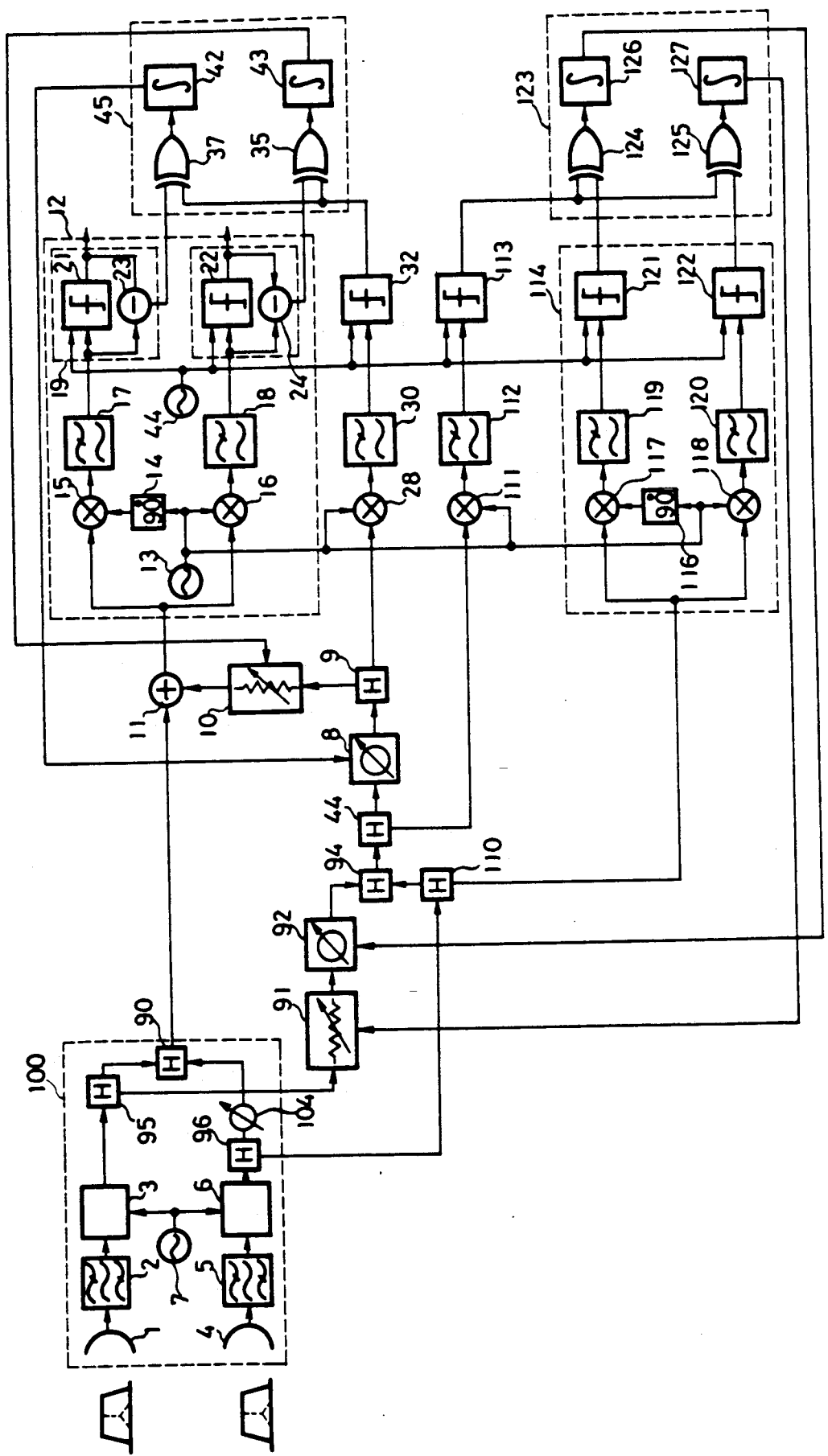
FIG. 28 is a block diagram to show a twenty-second embodiment of this invention.

FIG. 28 is a block diagram to show the 22nd embodiment of the interference cancellation circuit according to this invention.

This embodiment mainly differs from the embodiment 21 in the structure of the in-phase combiner circuit 100 and of the controller 93. The circuit structure of the controller 95 is the same as that of the embodiment 21.

In the embodiment 21 shown in FIG. 27, phases of the received signals from the main and the auxiliary antennas 1 and 4 are aligned by the in-phase combiner circuit 100 by inputting control voltages at the differential amplifier 104 for aligning the outputs from the automatic gain controllers 101, 102 at the same level so as to adjust the outputs at the same amplitude in advance, and by offsetting the main signal by the 180 degree combiner 94. In this embodiment, however, a variable attenuator 91 is provided and a variable phase shifter 92 for adjusting the amplitude and the phase of the received signals. Both circuits 91, 92 are controlled by feed-back so as to give to the two signals received by two antennas 1 and 4 the same amplitude signals resent but opposite phases to each other.

The feed-back control is executed as follows. The two main signals received by the two antennas 1 and 4 are combined in a manner to give them the same amplitude but opposite phases, and the main signal still remaining after combination is correlated with either one of the two signals before combination. The amplitude and the phase of the other main signal are controlled by the variable attenuator 91 and the variable phase shifter 92 in a manner to minimize the remaining main signal or the correlation. This keeps the main signal remaining after combination constantly minimum.

At the point where the interference cancellation operation starts, the main signal is dominant while as the operation proceeds into normal operation, the interference component included in the main signal becomes more dominant and is output from the combiner 94 as the interference signal.

More specifically, by employing the local frequency 13 reproduced by the main signal demodulator 12, the output from the combiner 94 or the interference signal remaining after the main signal has been erased is detected in phase by the phase detector 111, and passed through a low-pass filter 112 to remove the harmonic component. The output from the filter 112 is digitized by a decision circuit 113 by using clock signals 44 reproduced by the main signal demodulator 12. Thus, the interference signal is obtained in binary code.

The signal received by the auxiliary antenna 4 is divided by the divider 110 and input at the coherent quadrature phase detector 114. The input signal is detected in-phase by phase detectors 117, 118 by means of the local frequency 13, passed through low-pass filters 119, 120 to remove the harmonic component and digitized by the decision circuits 121, 122. This provides digitized main signal of in-phase and quadrature phase components. The clock signal reproduced by the demodulator 12 is supplied to the decision circuits 121, 122 for digitization.

The main signal of in-phase component obtained from the decision circuit 122 is digitally multiplied with the remaining main signal (interference signal) output from the decision circuit 113 which is related in phase to the above main signal by the exclusive OR 125, and the result is integrated by an integrator 127. The variable attenuator 91 is controlled with the output from the integrator 127.

Similarly, the main signal of quadrature phase output from the decision circuit 121 is digitally multiplied with the remaining main signal (interference signal) output from the decision circuit 113 which is in quadrature relation by an exclusive OR 124, and the result is integrated by an integrator 126. With the output from the integrator, the variable phase shifter 92 is controlled.

The correlation detector 123 comprises exclusive ORs 124, 125 and integrators 126, 127, while the controller 93 in FIG. 26 comprises a phase detector 111, a low-pass filter 112, a decision circuit 113, a guadrature phase detector 114 and a correlation detector 123.

As mentioned above, the decision circuits 113, 121, 122 are not absolutely necessary.

As described in the foregoing, the interference signal mixed within the received signal is automatically extracted for removal. The delay time of the two received signals should be adjusted to coincide with each other at the combiner 94.

EMBODIMENT 23

Figure 29:
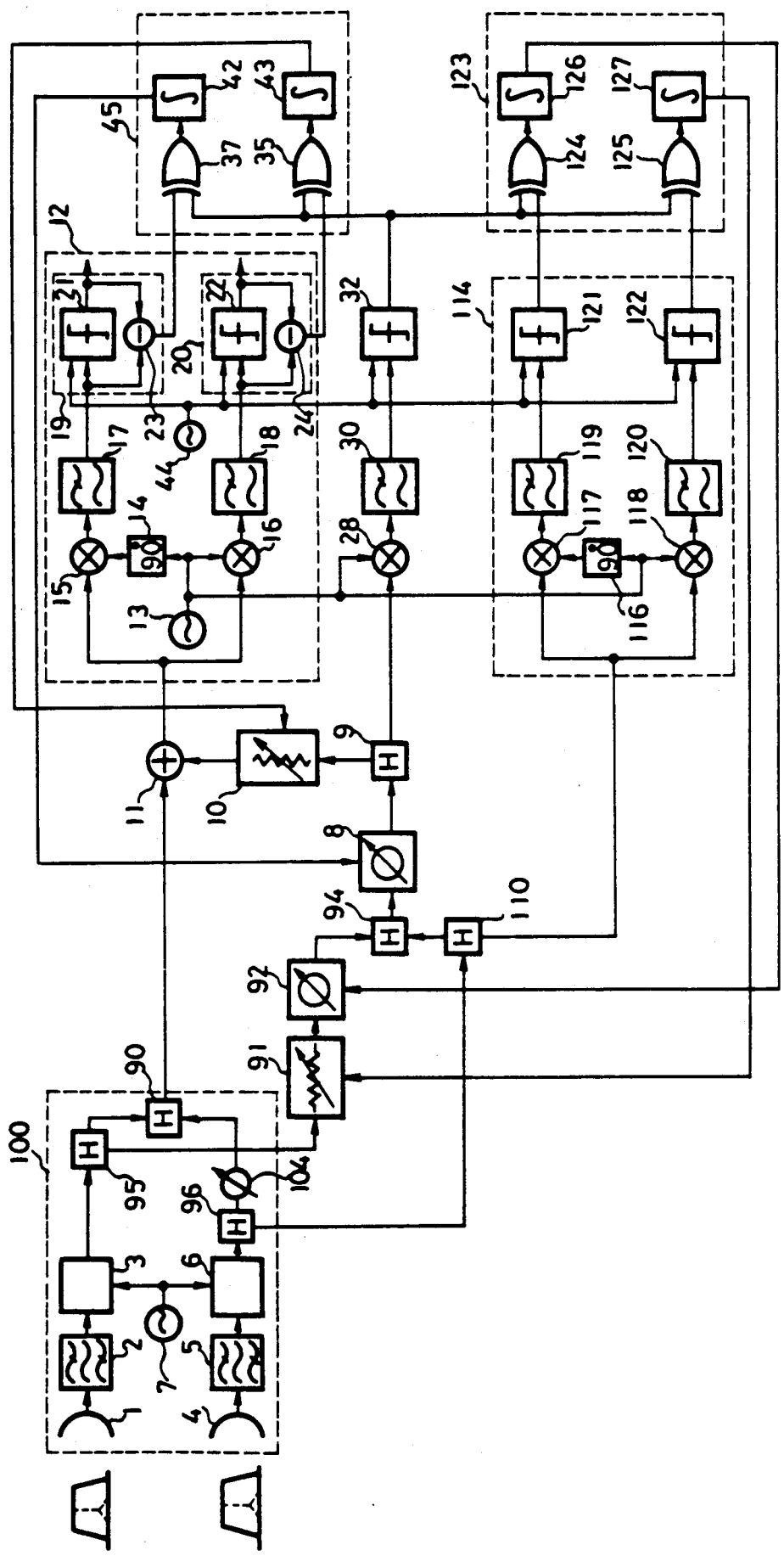
FIG. 29 is a block diagram to show a twenty-third embodiment of this invention.

FIG. 29 is a block diagram to show the 23rd embodiment according to this invention.

The embodiment 23 differs from the embodiment 22 shown in FIG. 28 in that operation separately conducted by the phase detector 111, the low-pass filter 112 and the decision circuit 113 for extracting interference signals, and the phase detector 28, the low-pass filter 30 and the decision circuit 32 are excuted by a common circuit or by a phase detector 28, a low-pass filter 30 and a decision circuit 32. This simplifies interference cancellation circuit remarkably.

The method to control the variable attenuators 10, 91 and the variable phase shifters 8, 92 are the same as that described for the embodiment 22.

Embodiment 24

Figure 30:
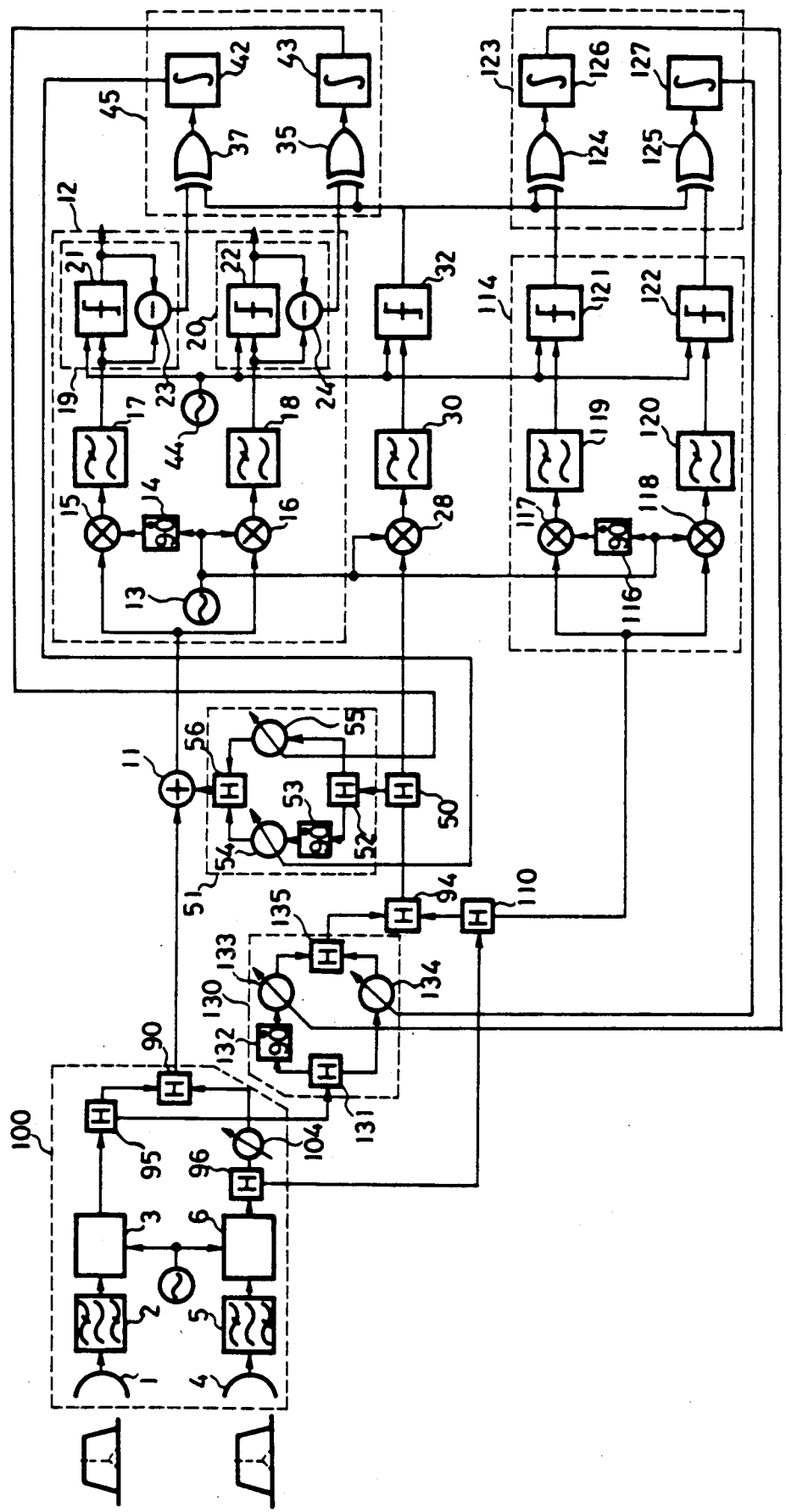
FIG. 30 is a block diagram to show a twenty-fourth embodiment of this invention.

FIG. 30 is a block diagram to show the 24th embodiment according to this invention.

This embodiment differs from the embodiment 23 shown in FIG. 29 in that the amplitudes and phases of the main signal and the interference signal are controlled by guadrature amplitude modulators instead of the variable attenuator and the variable phase shifter of the embodiment 23.

The variable attenuators 10, 91 and the variable phase shifters 8, 92 are controlled by the correlation outputs from the integrators 43, 127, 42, and 126 in the embodiment 23. In the embodiment 24, however, the same function is obtained by the quadrature amplitude modulators 130, 51.

The quadrature amplitude modulator 130 comprises a divider 131 for dividing input signal, a 90 degree phase shifter 132 which shifts by 90 degrees the phase of one of the outputs of the divider 131, a bipolar attenuator 133 of quadrature phase for adjusting the amplitude of the output from the phase shifter 132, an in-phase bipolar attenuator 134 for adjusting the amplitude of the other output from the divider 131, and a combiner 135 which combines the outputs from the bipolar attenuators 133, 134.

The quadrature amplitude demodulator 51 similarly comprises a divider 52, a 90 degree phase shifter 53, bipolar attenuators 54, 55 and a combiner 56.

The in-phase bipolar attenuator 134 in the quadrature amplitude modulator 130 is controlled by the output from the integrator 127 while the quadrature bipolar attenuator 133 is controlled by the output from the integrator 126. Similarly, the quadrature and in-phase attenuators 54, 55 within the quadrature modulator 51 are controlled respectively with the outputs from the integrators 42, 43.

EMBODIMENT 25

Figure 31:
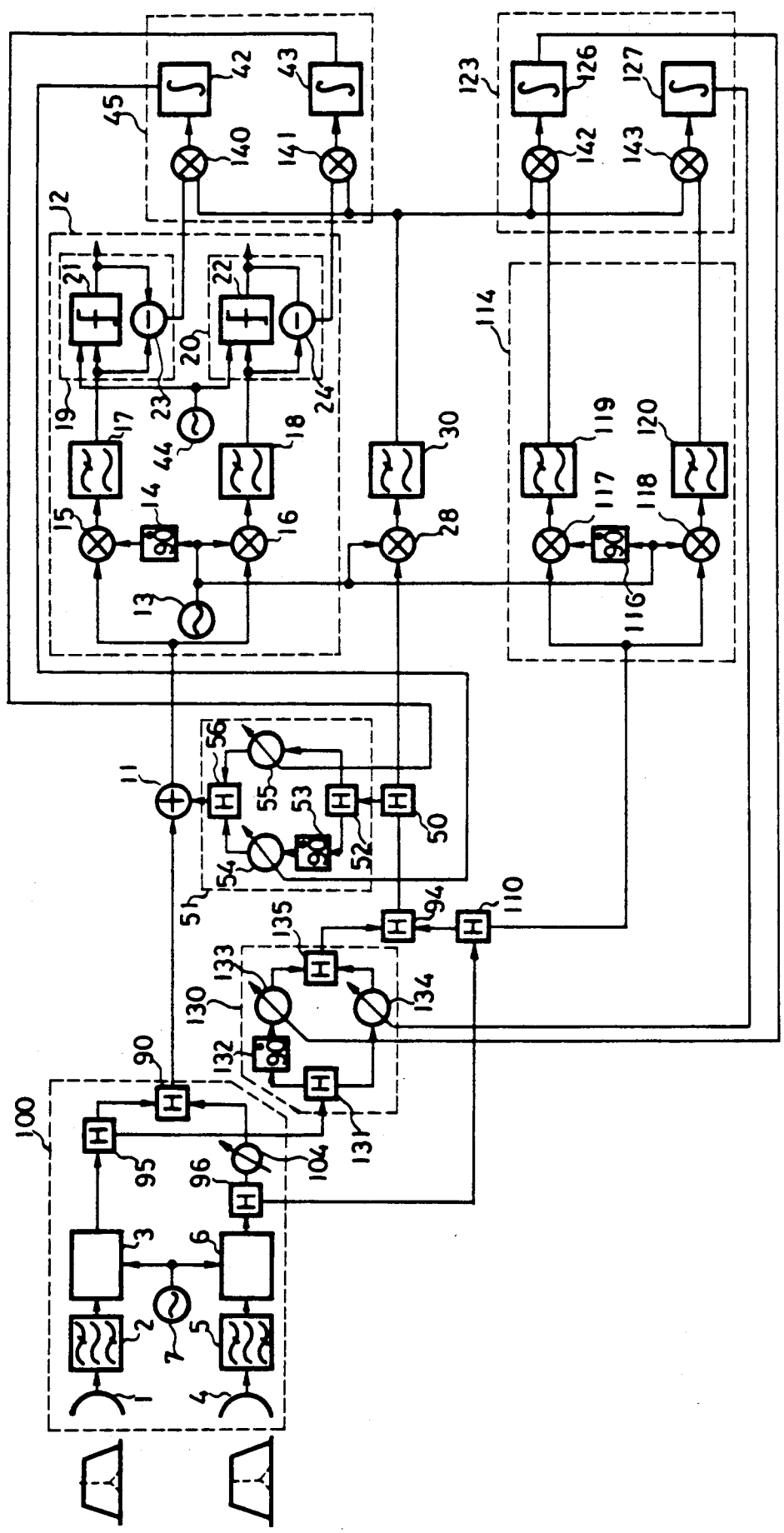
FIG. 31 is a block diagram to show a twenty-fifth embodiment of this invention.

FIG. 31 is a block diagram to show the 25th embodiment of this invention.

The embodiment 25 differs from the embodiment 24 shown in FIG. 30 in that correlation detection is conducted not by an exclusive OR, but by analog multiplication with multipliers 140 through 143 to increase control gain.

EMBODIMENT 26

Figure 32:
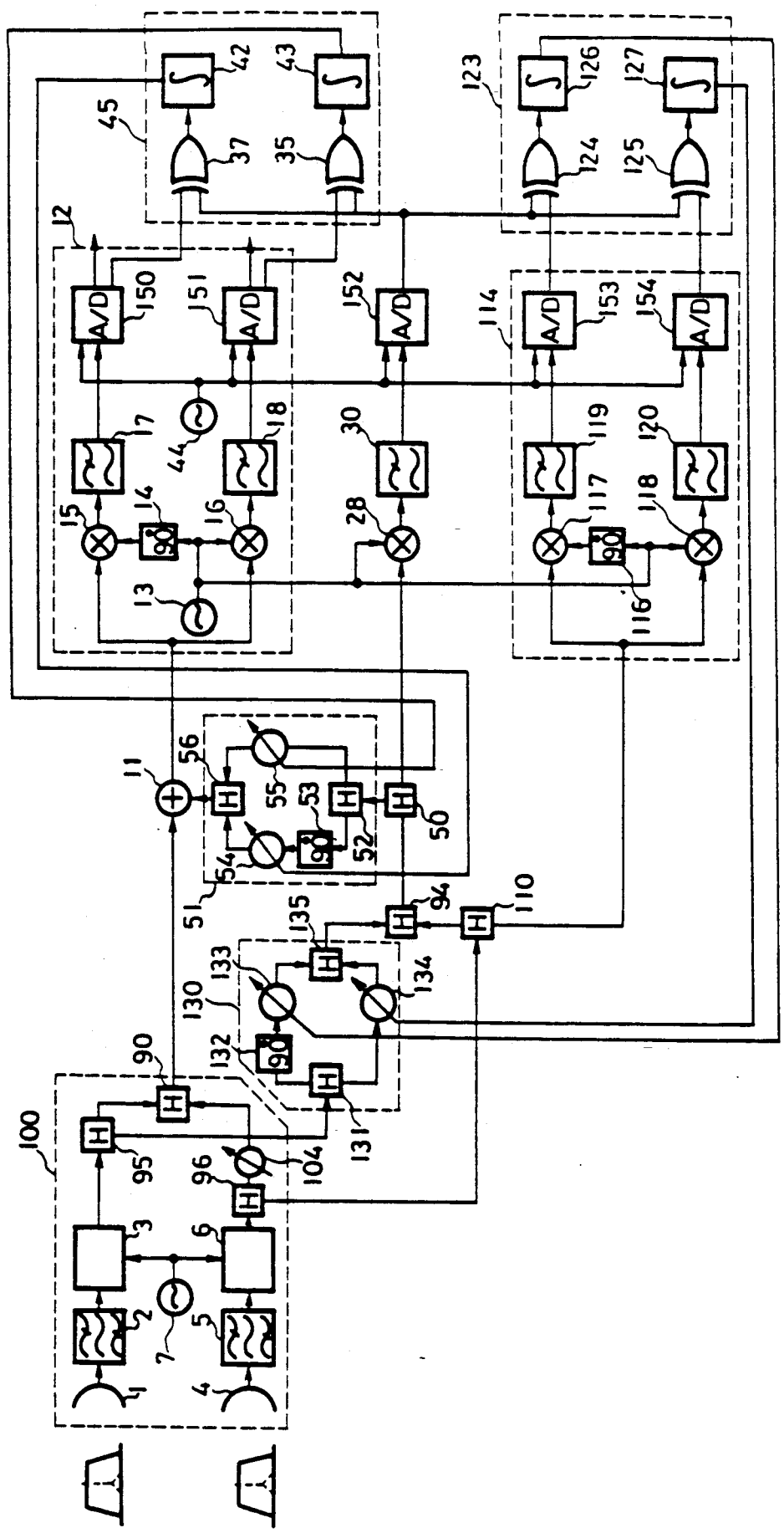
FIG. 32 is a block diagram to show a twenty-sixth embodiment of this invention.

FIG. 32 is a block diagram to show the 26th embodiment of this invention.

The embodiment differs from the embodiment 24 shown in FIG. 30 in that the error signal detectors 19, 20 and the decision circuits 32, 121, 122 are replaced by A/D converters 150 through 154.

When the main signal is 160QAM, if an A/D converter of the output more than 3 bits is used as indicated in the table above, the most significant two bits of the output thereof indicate the result of decision and the third bit the error signal. It therefore becomes possible to take out the error signal out of the third from the most significant bit.

The A/D converters 150 through 154 conduct sampling with the clock signal 44 reproduced by the demodulator 12. Then, the first bit (polarity signal) of the A/D converter 152 which converts the baseband signal of the interference signal into digital signal is correlated with the third bit (error signal) of the A/D converters 150, 151, and the bipolar attenuators 54, 55 within the modulator 51 are controlled by the correlation signals. By this operation interference signal can be removed.

A/D converters 153, 154 within the quadrature phase detector 114 connected to the output of the divider 110 output respectively the most significant bit (polarity signal) of the in-phase component and the quadrature phase component. The most significant bit thereof is correlated with the most significant bit of the A/D converter 152 in detection, and the bipolar attenuators 133, 134 of the quadrature amplitude modulator 130 are controlled by the correlation signal to extract the interference signal mixed with the main signal.

EMBODIMENT 27

Figure 33:
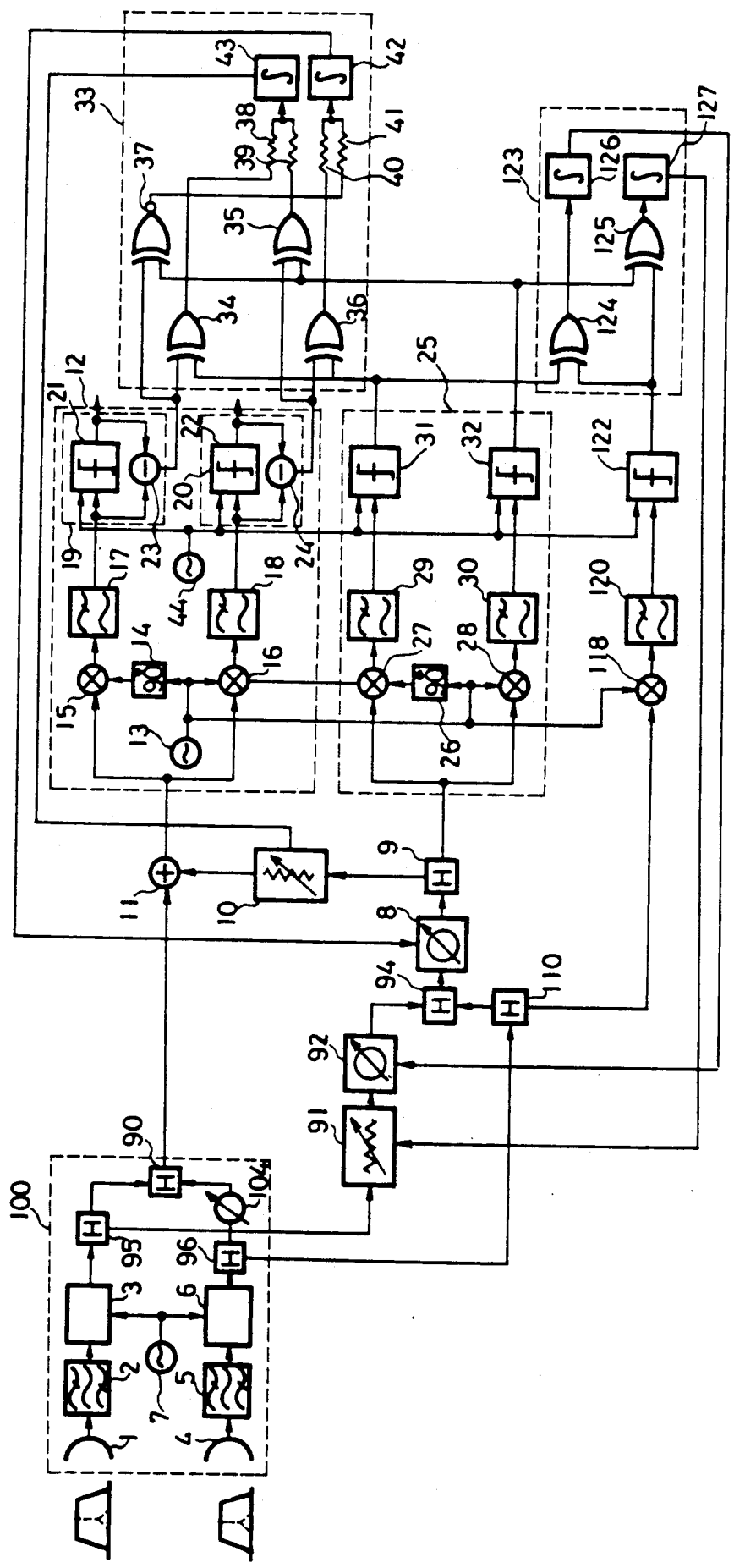
FIG. 33 is a block diagram to show a twenty-seventh embodiment of this invention.

FIG. 33 is a block diagram to show the 27th embodiment of this invention.

This embodiment differs from the embodiment 23 shown in FIG. 29 in that digitization of the extracted interference signal is conducted by a quadrature phase detector 25 (the structure thereof is the same as the one of the quadrature phase detector 114 shown in relation to the embodiment 23) instead of phase detector, and the in-phase component alone is detected in-phase for digitization of the output from the divider 110 without using the quadrature phase detector. For this reason, the structure of the correlation detector 33 slightly differs from that of the circuit 45 of the embodiment 23, but is the same as the prior art circuit 33 shown in FIG. 1.

EMBODIMENT 28

Figure 34:
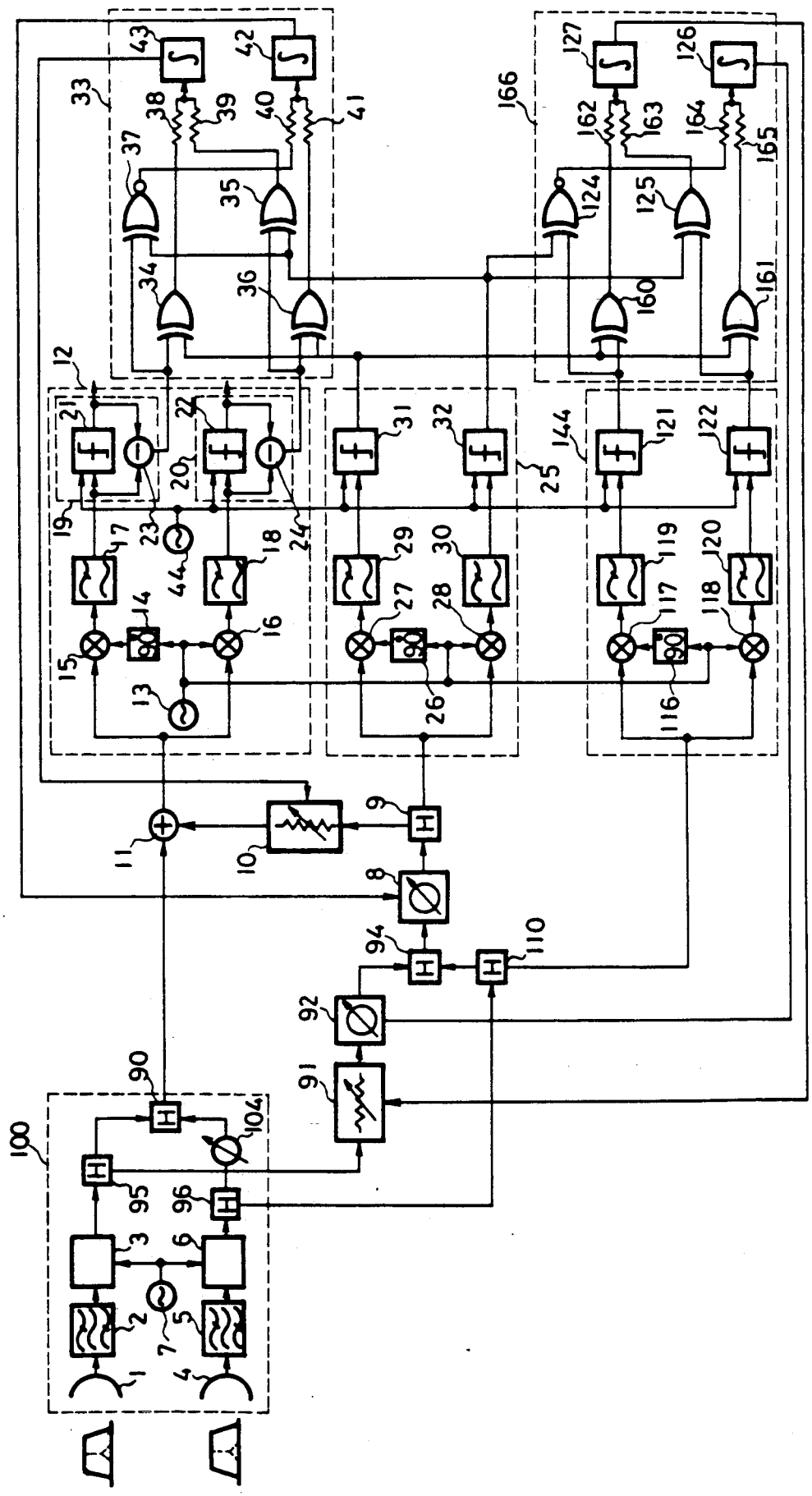
FIG. 34 is a block diagram to show a twenty-eighth embodiment of this invention.

FIG. 34 is a block diagram to show the 28th embodiment of this invention.

This embodiment differs from the embodiment 23 shown in FIG. 29 in that the extracted interference signal is digitized by a quadrature detector 25 similarly to the embodiment 27. This makes the circuit scale larger than the embodiment 23 but the control gain becomes twice as much to thereby improve response and convergence in control performance.

The structure of the correlation detector 166 is the same as that of the correlation detector 33 comprising exclusive ORs 124, 125, 160, 161, resistances 162 through 165, and integrators 126, 127.

The 29th through 35 th embodiments of this invention will be explained below. These embodiments differ from aforementioned embodiments remarkably in that the quadrature amplitude modulator 130 used in the 24th through 26th embodiments is replaced by a two-dimensional transversal filter 170.

EMBODIMENT 29

FIG. 35 is a block diagram to show the 29th embodiment of this invention.

In the figure, the main and auxiliary antennas 1 and 4 are directed in the arrival direction of the main signal (digital signal) to receive the main signal. The main signal contains the interference signal due to the interference from other systems.

The signals received by the two antennas 1, 4 are passed through band pass filters 2, 5 (not necessarily required at all times) in order to improves S/N, and converted into IF band by frequency converters 3, 6 by means of local signal from a common local oscillator 7.

The signals converted into IF band are input into a combiner 90 via dividers 95, 96 and combined. In radio communication systems, the combing system is generally employed and two signals are often combined in-phase by a combiner 90. (For in-phase combination, a phase shifter may be necessary, but it is not shown for simplicity's sake.) In such a case, the two antennas are utilized for this invention.

The interference signal mixed within the main signal is extracted by the following method.

The received signal having a frequency characteristic which has been passed through the divider 95 of the receiver circuit on the main antenna side 1 is input at a quadrature amplitude modulator comprising delay lines with plural taps or a two-dimensional transversal filter 170 (in this embodiment with three taps) to be controlled in amplitude and phase.

The two dimensional transversal filter 170 divides the signal from the divider 95 further by a divider 173, and supplies one of the outputs to a bipolar attenuator 182 which controls the in-phase component and the other output to a bipolar attenuator 179 which controls the quadrature phase component relatively via a 90 degree phase shifter 176, and inputs the outputs from both bipolar attenuators 182, 179 to a combiner 185 for combination.

The output from the divider 95 is passed through a delay circuit 171 which delays it by 1×T (T denotes clock cycle of data, but may be the quotient of the division by an integer) from the received signal, and is divided by a divider 174 in a manner similar to the above. One of the outputs is supplied to a bipolar attenuator 183 which controls the in-phase component while the other output is supplied to a bipolar attenuator 180 which controls the quadrature phase component via a 90 degree phase shifter. The outputs from both bipolar attenuators 183, 180 are combined by a combiner 186 for output.

The signal delayed by 2×T by the two delay circuits 171, 172 is divided by the divider 175, and the in-phase component thereof is controlled by a bipolar attenuator 184 while the quadrature component thereof is controlled by a 90 degree phase shifter 178 and a bipolar attenuator 184. The outputs from these attenuators 184, 181 are combined by a combiner 187 for output in a manner similar to the above. Respective outputs from said combiners 185, 186, 187 are combined by a combiner 188 for output.

The received signal on the auxiliary antenna 4 side is divided by a divider 96 and is input at a combiner 95 via a delay circuit 171' and a divider 110 to be combined with the output from the combiner 188. The delay circuit 171' is to correct the delay time 1×T which is identical to the central tap of the two-dimensional transversal filter 170.

The two received signals input at the combiner 94 are converted to be in opposite phases but of the same amplitude to each other, and to have the same frequency characteristics. By combining both of them, the interference signal alone can be extracted.

In the manner mentioned above, by using the two dimensional transversal filter 170, the frequency characteristic of the signal received by the main antenna 1 is aligned with that of the signal received by the auxiliary antenna 4, and by adding the two signals of which phases are opposite to each other but of which amplitudes are the same, it becomes possible to attenuate the main signal remarkably and to leave the interference signal component contained therein at a sufficiently high level.

In order to control respective weights of the two-dimensional transversal filter 170, it is necessary to correlate the main signal which is still remaining after combination of the two signals or the interference signal with one of the main signals before combination, and weighing circuits (bipolar attenuators 179 through 184) are controlled in feed-back in a manner to minimize the amount of the main signal after combination or correlation. The operation will now be described in more specific and detailed manners.

The output from the combiner 94 is divided by the divider 44 and phase-detected by a phase detector 111 by means of local frequency 13 reproduced by the main signal demodulator 12. The output from the detector is passed through a low-pass filter 112 to remove harmonic component and digitized by a decision circuit 113 with the clock signal 44 reproduced by the demodulator 12 ot obtain binary interference signal a.

The signal received by the auxiliary antenna 4 is divided by the divider 96 and input at the divider 110. One of the outputs from the divider 110 is input at the combiner 94 while the other output is supplied to a coherent quadrature phase detector 114 via a delay line T2. The signal is phase-detected by phase detectors 117, 118 with the local frequency 13 reproduced by the demodulator 12.

The detector output is removed of harmonic component by low-pass filters 119, 120. The outputs from these filters are digitized by decision circuits 121, 122 with the clock signal 44 reproduced by the demodulator 12. By these operation, binary main signal in-phase component $a_I$ and main signal quadrature component $a_Q$ are obtained.

Digitized interference signal a, digitized main signal in-phase component $a_I$ and main signal quadrature component $a_Q$ are input at a transversal filter controller 190. Bipolar attenuators 179 through 184 of the transversal filter 170 are controlled with the following outputs from the transversal filter controller 190.

$$C_{-1}(=X_{-1}+jY_{-1})$$

$$C_0(=X_0+jY_0)$$

$$C_{+1}(=X_{+1}+jY_{+1})$$

The transversal filter controller 190 may be that shown in FIG. 15.

Description will now be given to a method to cancel the interference signal mixed within the main signal based on the interference signal obtained by the transversal filter 170.

The extracted interference signal is passed first to the quadrature amplitude modulator 51 for adjustment in amplitude and phase in a manner to have them opposite in phase but the same in amplitude as the interference signal component mixed within the main signal. The interference signal is then combined with the main signal by the combiner 11 to eliminate the interference signal component from the received signal.

The interference signal output from the divider 50 is input at the quadrature amplitude modulator 51 and is divided by a divider 52. One of the divided interference signals is input at the quadrature attenuator 55 which controls the in-phase component while the other is passed through the 90 degree phase shifter 53, and input at a quadrature attenuator 54 which controls the quadrature component of the interference signal. The outputs from both bipolar attenuators 54, 55 are combined by the combiner 56 and the output thereof is supplied to the combiner 11. The combiner 11 combines the main signal which has been output from the combiner 90 for combining two received signals (main signals) and which has been passed through the delay line T1 with the interference signal output from the combiner 56 for output.

The method for controlling the quadrature amplitude modulator 51 will now be described.

The interference signal output from the combiner 94 is passed through the combiners 44, 50, phase-detected by the phase detector 28 by means of the local frequency 13 reproduced by the demodulator 12, passed through a low-pass filter 30 to remove harmonic component and digitized by a decision circuit 32. This produces binary interference signal a'. The digitization by the decision circuit 31 is conducted with the clock signal 44 reproduced by the demodulator 12.

The output from the combiner 11, on the other hand is input at the demodulator 12, phase-detected by phase detectors 15, 16 by means of the local frequency 13, passed through the low-pass filters 17, 18 to remove harmonic component, and taken out as baseband signals of the in-phase and quadrature phase components.

Figure 36:
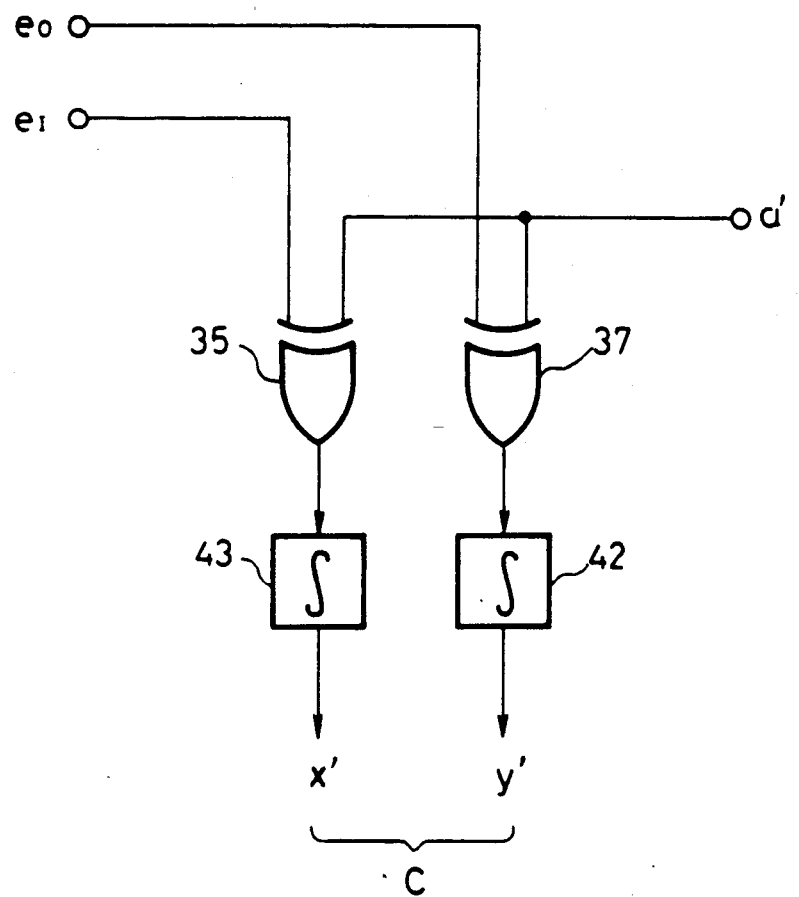
FIG. 36 is a block diagram to show an embodiment of a correlation detector.

The baseband signals of the in-phase and quadrature phase components are supplied to error signal detectors 19, 20 for detecting the interference signal remaining within the received signal, and are taken out as error signals of the in-phase component $e_I$ and of the quadrature phase component $e_Q$. Thus obtained interference signal a' and error signals $e_I$ and $e_Q$ are input respectively at the correlation detector 45. FIG. 36 shows the structure of the circuit 45. The circuit has the same structure as the correlation detector 45 shown in relation to the embodiment 3 in FIG. 6. More particularly, the correlation detector 45 multiplies the interference signal a' with the error signal $e_I$ which is in the same phase as the above by means of the exclusive OR 35, detects the correlation by integrating it by the intergrator 43, and outputs the control signal X'. The in-phase bipolar attenuator 55 is controlled with this signal.

Similarly, the interference signal a' is multiplied with the error signal $e_Q$ which is in phase perpendicular thereto by the exclusive OR 37 and the output thereof is integrated by the integrator 42 for detecting their correlation. The output Y' from the integrator 42 is used to control the quadrature bipolar attenuator 54 of the quadrature amplitude modulator 51.

In this embodiment, even if the digital radio system having plural receiver antennas inevitably receives not only the main signal but the interference signal, and the main signals received through different antennas have different frequency characteristics, it becomes possible to extract the interference signal alone out of the received main signals and automatically cancel the interference component mixed therein based on the interference signal.

For practical application, it is necessary to adjust relative timings by delay lines T1, T2, to maximize the effect of cancellation. It is also necessary to align relative delay times at the inputs of the combiner 94 which combines the two received signals.

The number of taps at the transversal filter in this embodiment is three, but if the number is increased, the precision for interference signal extraction can be further enhanced.

EMBODIMENT 30

In the Embodiment 29 above, the amplitude and phase of interference signal are adjusted by a quadrature amplitude modulator 51 having a single tap for the purpose of cancelling the interference component mixed in the main signal when a transversal filter having plural tap delay lines is used, the circuit which achieves sufficient effect for cancelling interference is realized even if the interference signal is a wide band signal and has frequency characteristics. The embodiment 30 realizes such a circuit.

Figure 37:
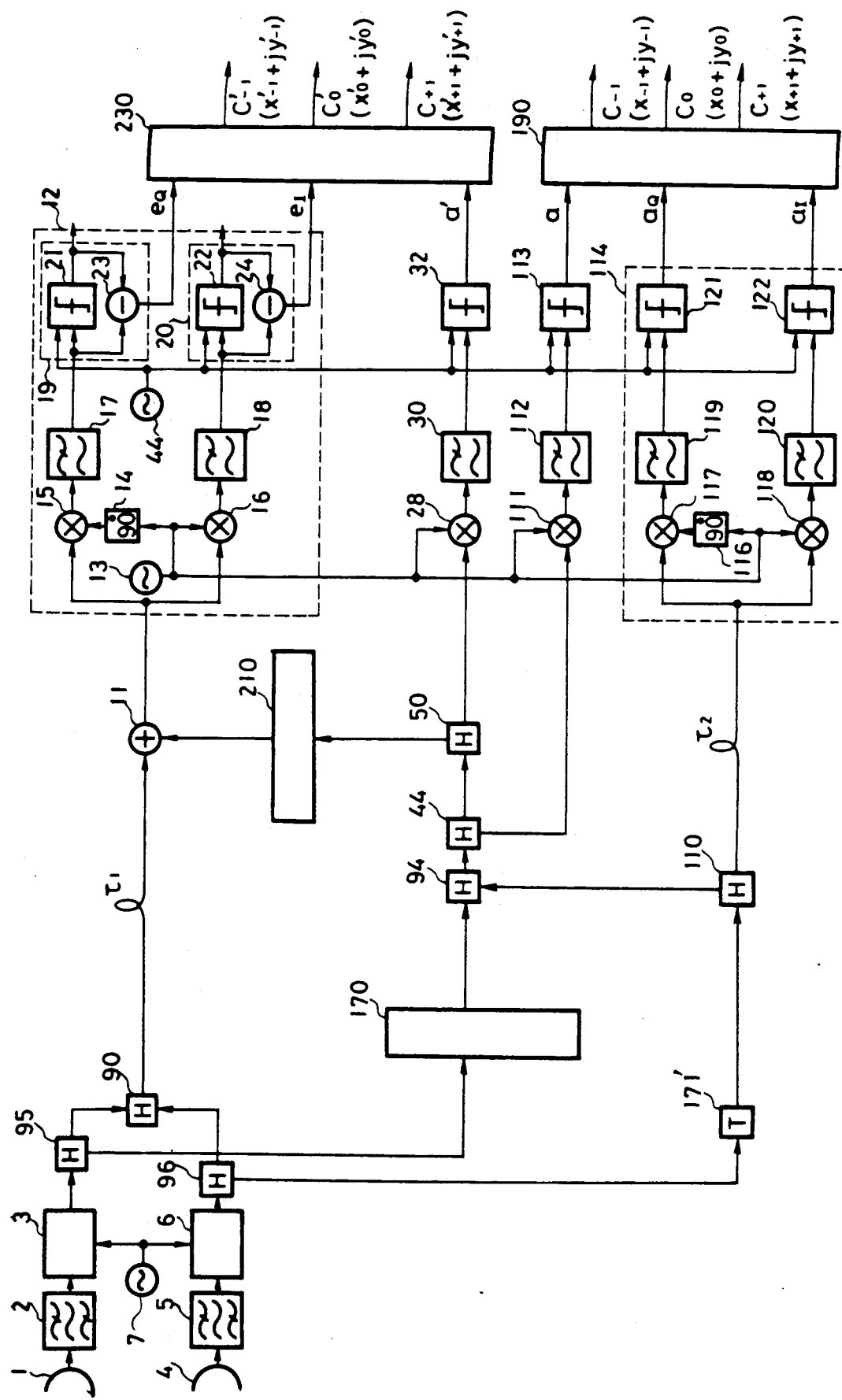
FIG. 37 is a block diagram to show a thirtieth embodiment of this invention.

FIG. 37 is a view to show the structure of this embodiment wherein the interference signal output from the combiner 50 is supplied to the combiner 11 via a transversal filter 210.

Figure 38:
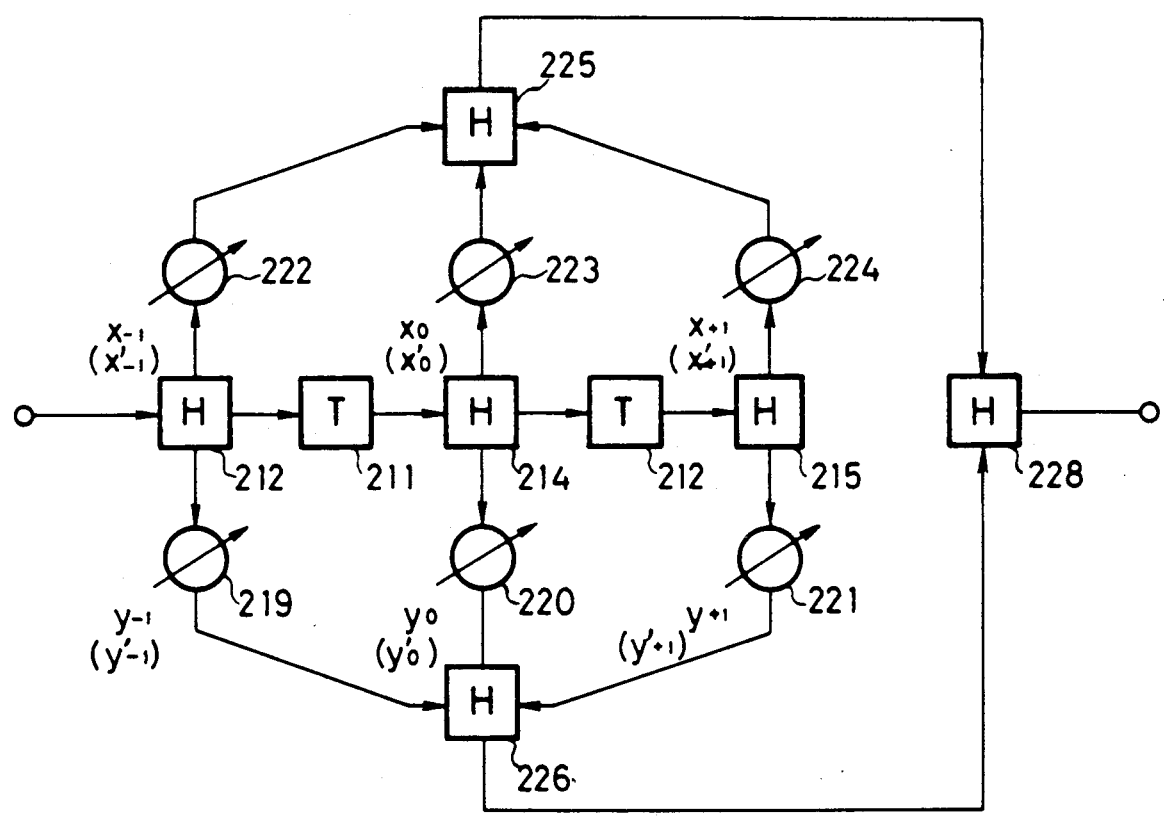
FIG. 38 is a block diagram to show the details of a transversal filter.

FIG. 38 is a block diagram to show the transversal filter 210 in details.

This transversal filter 210 differs from the two-dimensional transversal filter 170 of the embodiment 29 in that 90 degree phase shifters 176, 177, 178 provided at each tap for controlling the quadrature component are replaced by 90 degree dividers 213, 214, 215.

These dividers 213, 214, 215 are connected at their outputs with bipolar attenuators 219 and 222, 220 and 223, 221 and 224. The signal input at the divider 213 is supplied to the divider 214 via the delay circuit 211, as well as to the bipolar attenuators 219, 222 in the phases different by 90 degrees from each other. The signal input at the divider 214 is supplied to the divider 215 via the delay circuit 212 as well as to bipolar atenuators 220, 223 in the phases different from each other by 90 degrees. The signal input at the divider 215 is supplied to the bipolar attenuators 221, 224 in the phases different from each other 90 degrees. The bipolar attenuators 219 through 224 are controlled and weighted with the following respective output signals of the transversal filter controller 230 which is identical in structure to the transversal filter controller 19 shown in FIG. 15.

$$C_{-1}'(=X_{-1}'+jY_{-1}')$$

$$C_{0}'(=X_{0}'+jY_{0}')$$

$$C_{+1}'(=X_{+1}'+jY_{+1}')$$

The outputs from the bipolar attenuators 219, 220, 221 are combined by the combiner 226, those from the bipolar attenuators 222, 223, 224 by the combiner 225, and those from the combiners 225, 226 by the combiners 228, and output from the transversal filter 210.

EMBODIMENT 31

Figure 39:
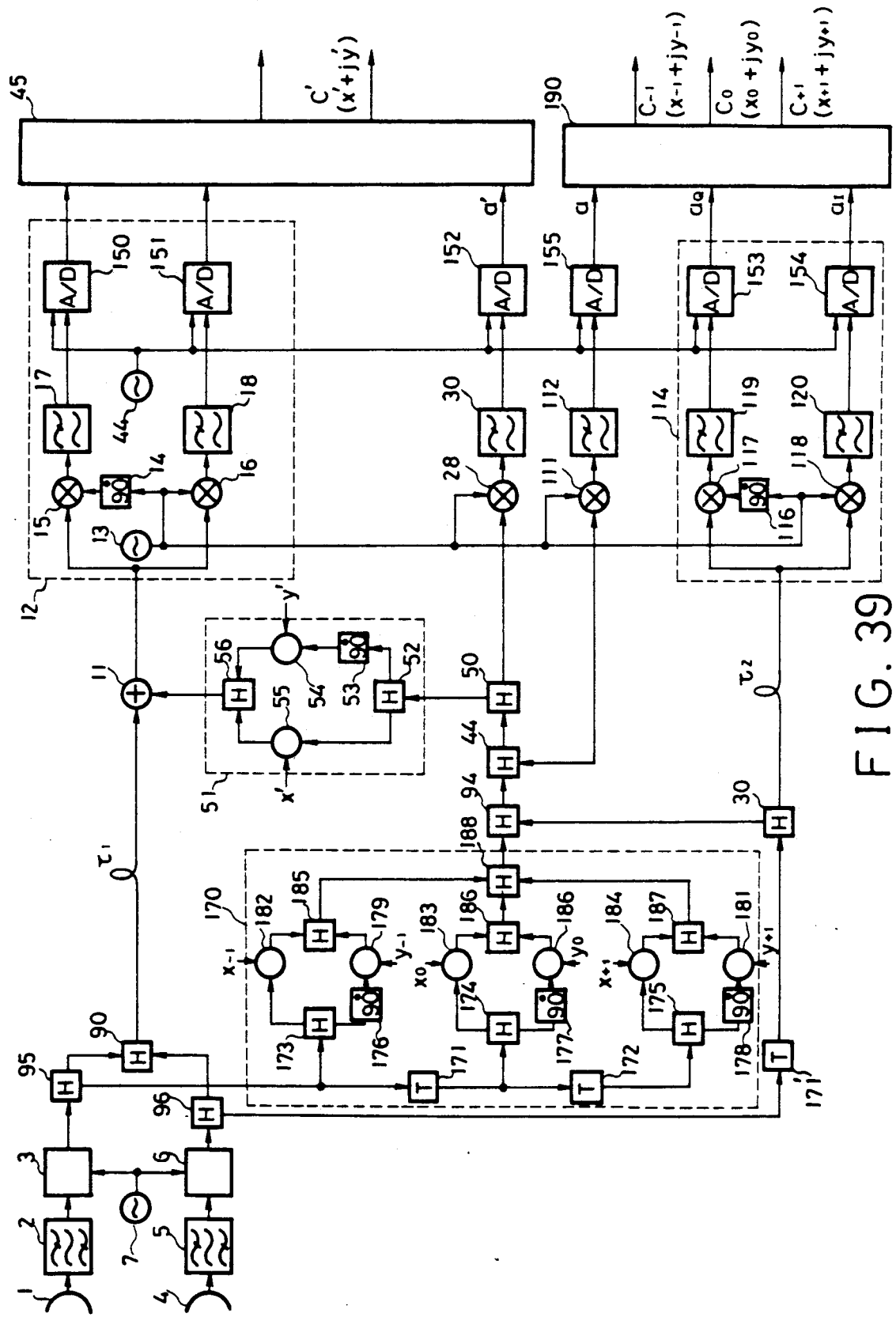
FIG. 39 is a block diagram to show a thirty-first embodiment of this invention.

FIG. 39 is a block diagram to show the 31st embodiment according to this invention.

This embodiment differs from the embodiment 29 shown in FIG. 35 in that the error signal detectors 19, 20 and the decision circuits 32, 113, 121, 122 are replaced with A/D converters 150 through 155.

For instance, if the main signal is a 16 QAM signal, the demodulated baseband signal is quaternary. If this signal is input, and an A/D converter of the output of 3 bits or more is used, the most significant two bits of the digital outputs of the converter denote the decision signals, and the third bit from the m.s.b. the error signal as indicated in the above table. By taking out the signal at the third bit, the remaining interference component can be extracted as the error signal.

EMBODIMENT 32

In the embodiments 29 through 31 explained hereinabove, digital signals digitized by the decision circuits 31, 32, 121, 122 or the A/D converters 152 through 155 are described as the signals to be input at the correlation detector 45 and the transversal filter controllers 190, 230. However, the circuit for digitization is not absolutely necessary. In this embodiment, the exclusive ORs in the correlation detector 45 and the transversal filter controller 190 are replaced with analog multipliers.

Figure 40:
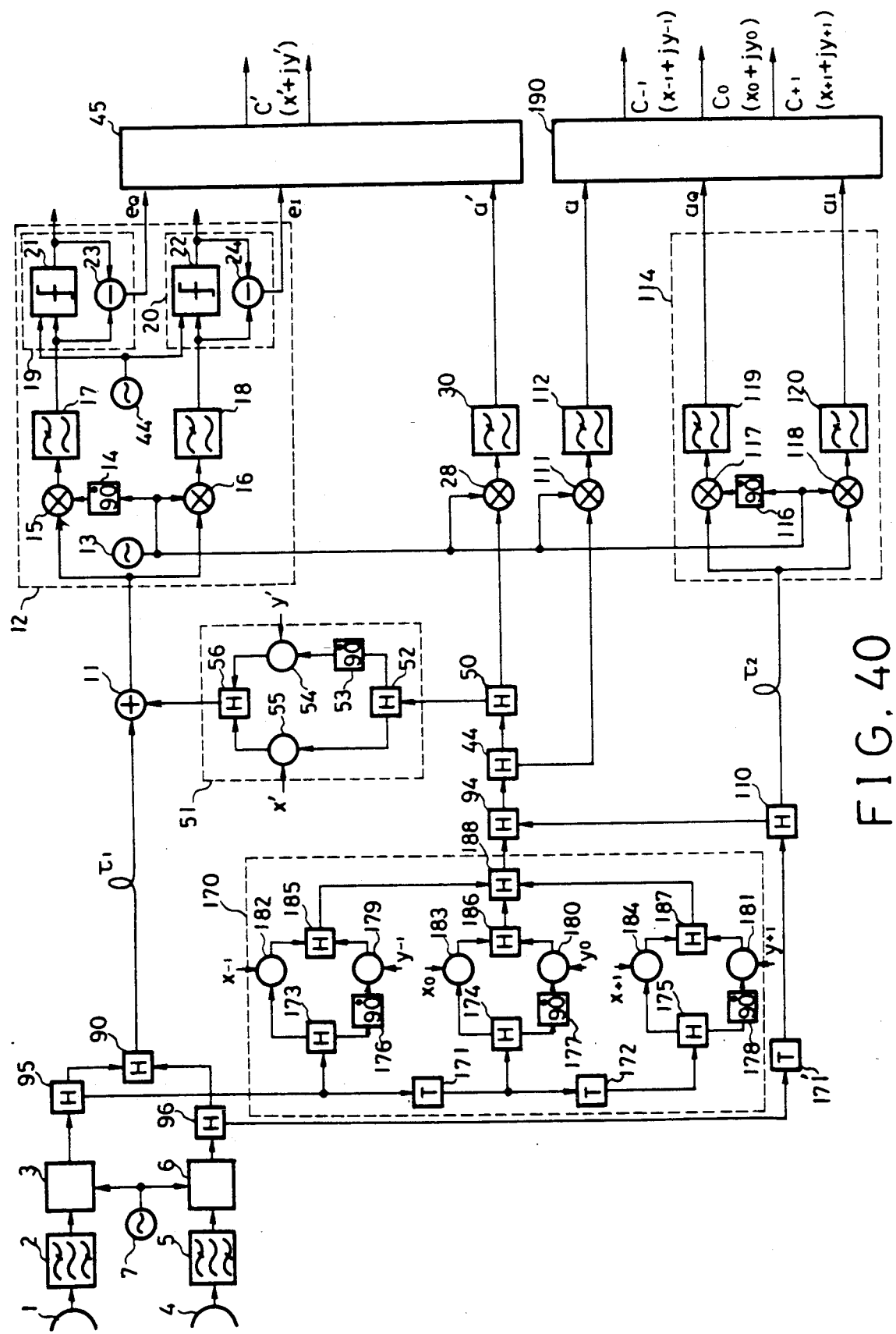
FIG. 40 is a block diagram to show a thirty-second embodiment of this invention.

Embodiment 32 shown in FIG. 40 realizes this circuit.

EMBODIMENT 33

Figure 41:
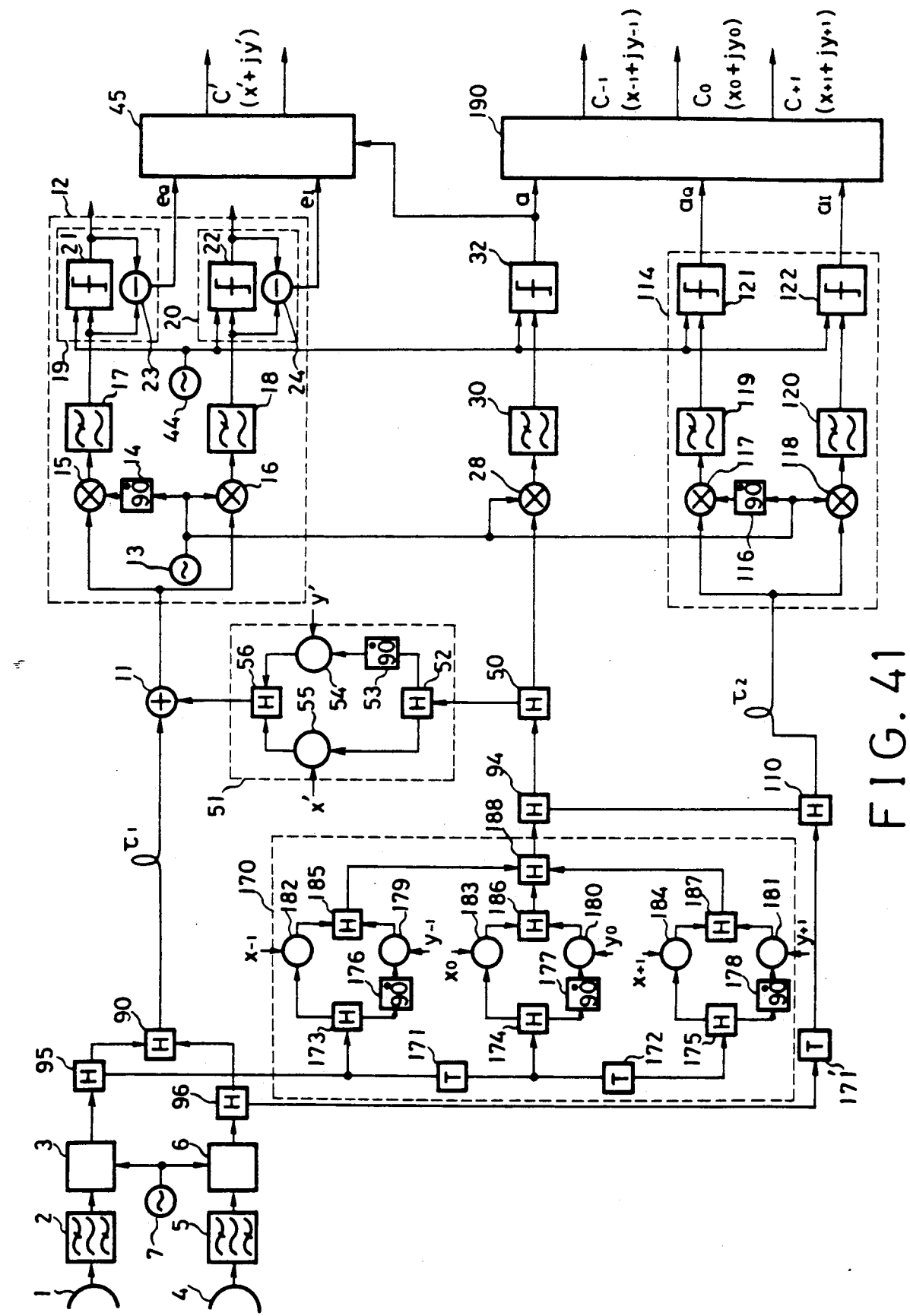
FIG. 41 is a block diagram to show a thirty-third embodiment of this invention.

FIG. 41 is a block diagram to show the 33rd embodiment of this invention.

This embodiment differs from the embodiment 29 shown in FIG. 35 in that the phase detector 28, low-pass filter 30, the decision circuit 32 and the phase detector 111, the low-pass filter 112 and the decision circuit 113 are combined and replaced with one line. The correlation detector 45 and the transversal filter controller 190 are identical to those used in the embodiment 29. This embodiment is advantageous as it can simplify the circuit structure.

EMBODIMENT 34

Figure 42:
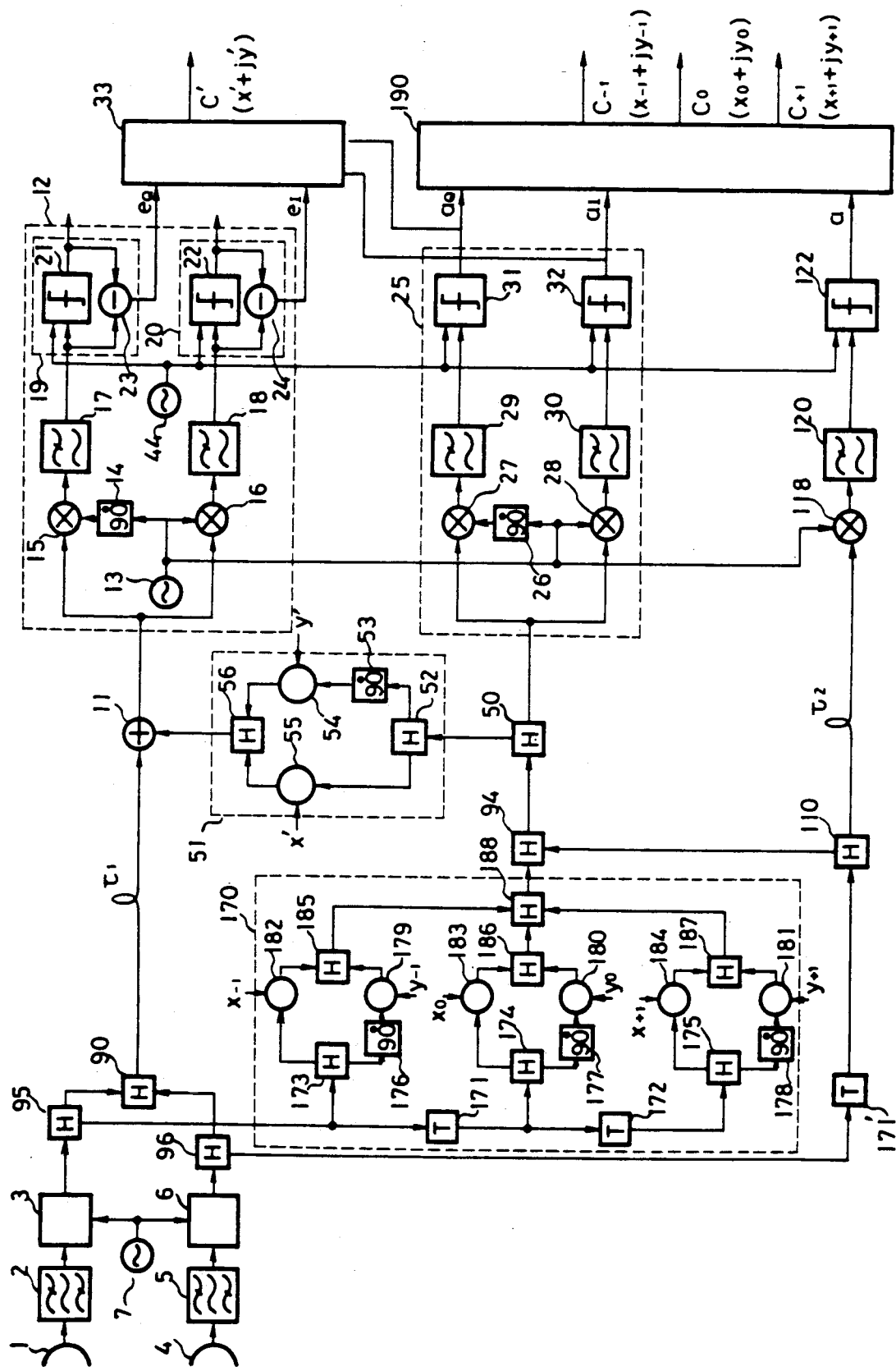
FIG. 42 is a block diagram to show a thirty-fourth embodiment of this invention.

FIG. 42 is a block diagram to show the 34th embodiment of this invention.

This embodiment has a circuit structure wherein the phase detector 27 and the coherent quadrature phase detector 114 of embodiment 33 in FIG. 41 are switched in position. More particularly, the phase detector 28, the low-pass filter 30 and the decision circuit 32 are replaced with the coherent quadrature phase detector 25 while the coherent quadrature phase detector 114 is replaced with the phase detector 118, the low-pass filter 120, and the decision circuit 122.

The method to detect correlation with the outputs from the demodulator 12 and the coherent quadrature phase detector 25 and to control the quadrature amplitude modulator 51 will be described below.

From the error signal detectors 19, 20 of the demodulator 12 are taken out the error signal of in-phase component eI and the error signal of quadrature component eQ which are mixed within the main signal.

The extracted interference signal is input at the coherent quadrature phase detector 25, detected and digitized with the clock signal 44 and the local frequency 13 reproduced by the demodulator 12, and then taken out as the binary in-phase component of interference signal aI and the binary quadrature component of interference signal aQ (as the main signal has been erased, the interference signal becomes dominant.)

Thus obtained error signals eI and eQ and interference signals aI' aQ are input at the correlation detector 33 for correlation detection.

Figure 43:
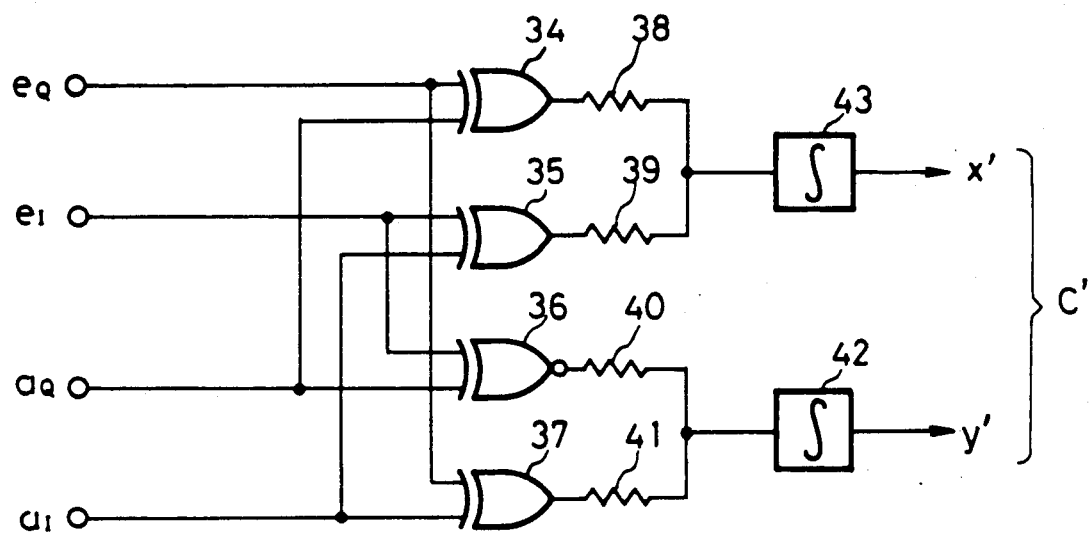
FIG. 43 is a block diagram to show an embodiment of a correlation detector.

FIG. 43 shows an embodiment of the correlation detector 33. In this circuit, the error signal of the in-phase component eI and the interference signal of the in-phase component aI are passed through an exclusive OR 35 while the error signal of the quadrature phase component eQ and the interference signal of the quadrature phase component aQ are passed through the exclusive OR 34 for multiplication. The outputs thereof are added in analog at resistances 38, 39 and integrated at the integrator 43. The bipolar attenuator 55 is controlled with the output x' from the integrator 43 as it is related to the in-phase component of the quadrature amplitude modulator 51.

Similarly, the error signal of the in-phase component eI and the interference signal of the quadrature phase component aQ are passed through the exclusive OR 36' while the error signal of the quadrature phase component eQ and the interference signal of the in-phase component aI are passed through the exclusive OR 37 for multiplication. The outputs are added in analog by resistances 40, 41, and integrated by the integrator 42. The bipolar attenuator 54 is controlled with the output y' from the integrator 42 as it is related to the quadrature phase component of the quadrature amplitude modulator 51.

EMBODIMENT 35

Figure 44:
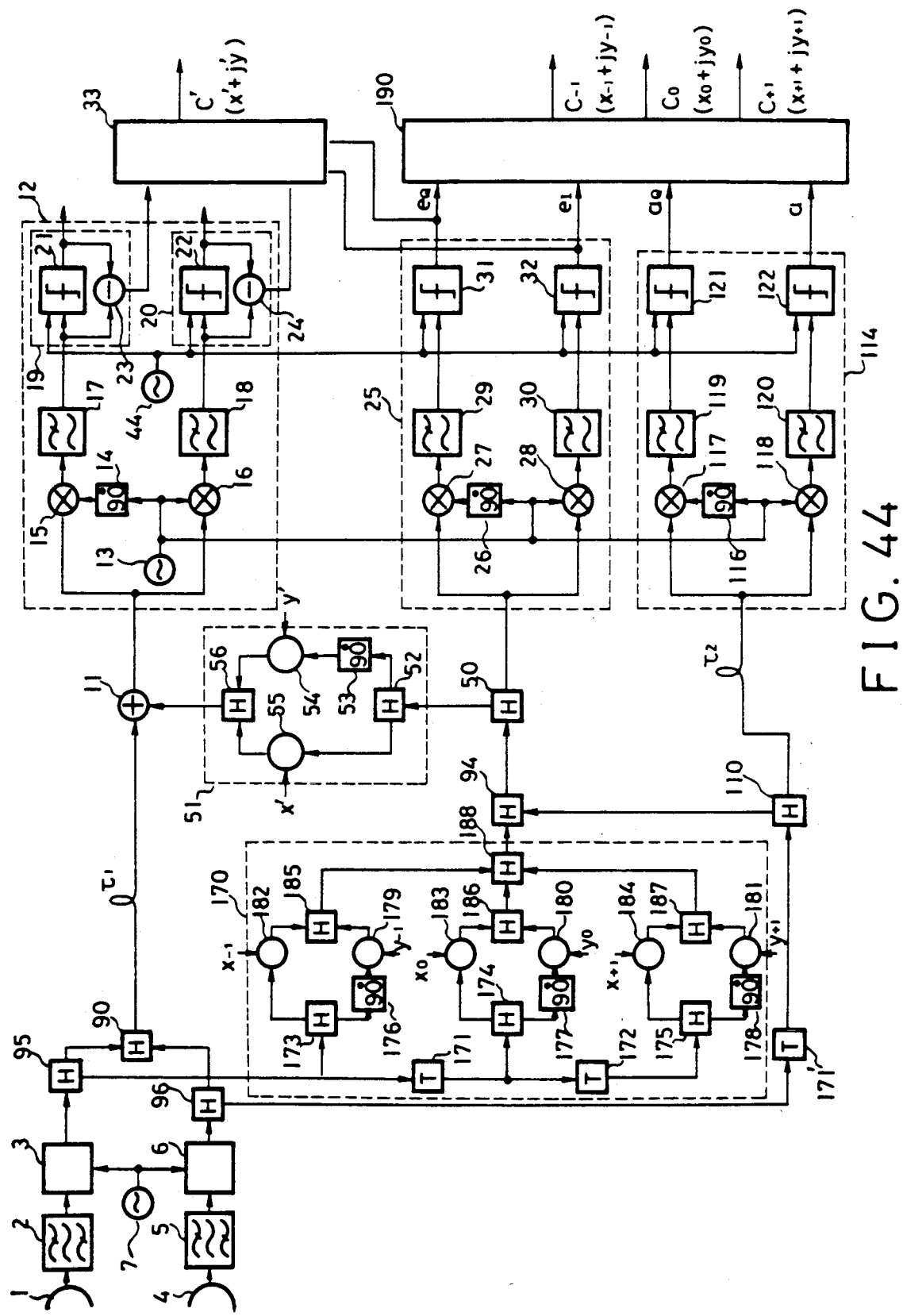
FIG. 44 is a block diagram to show a thirty-fifth embodiment of this invention.

FIG. 44 is a block diagram to show the 35th embodiment of this invention.

This embodiment differs from the embodiment 34 in that the phase detector 110 for interference signal extraction, the low-pass filter 120, and the decision circuit 122 are replaced with a coherent quadrature phase detector 114. This increases the circuit scale, but remarkably enhances control performance.

For instance, when this embodiment circuit is used for controlling a bipolar attenuator 182 of the two dimensional transversal filter 170 with control signal X-1 (see FIG. 15), the control is conducted by adding in analog by means of resistances the result of multiplication of the polarity signal aI of the in-phase component and the signal obtained by delaying the error signal eI by 1×T using an exclusive OR and the result of multiplication of a polarity signal aQ of the quadrature phase component and the signal obtained by delaying the error signal eQ by 1×T using an exclusive OR, integrating the result of the addition by an integrator and using the output X-1 from the integrator for the control.

EMBODIMENT 36

Figure 45:
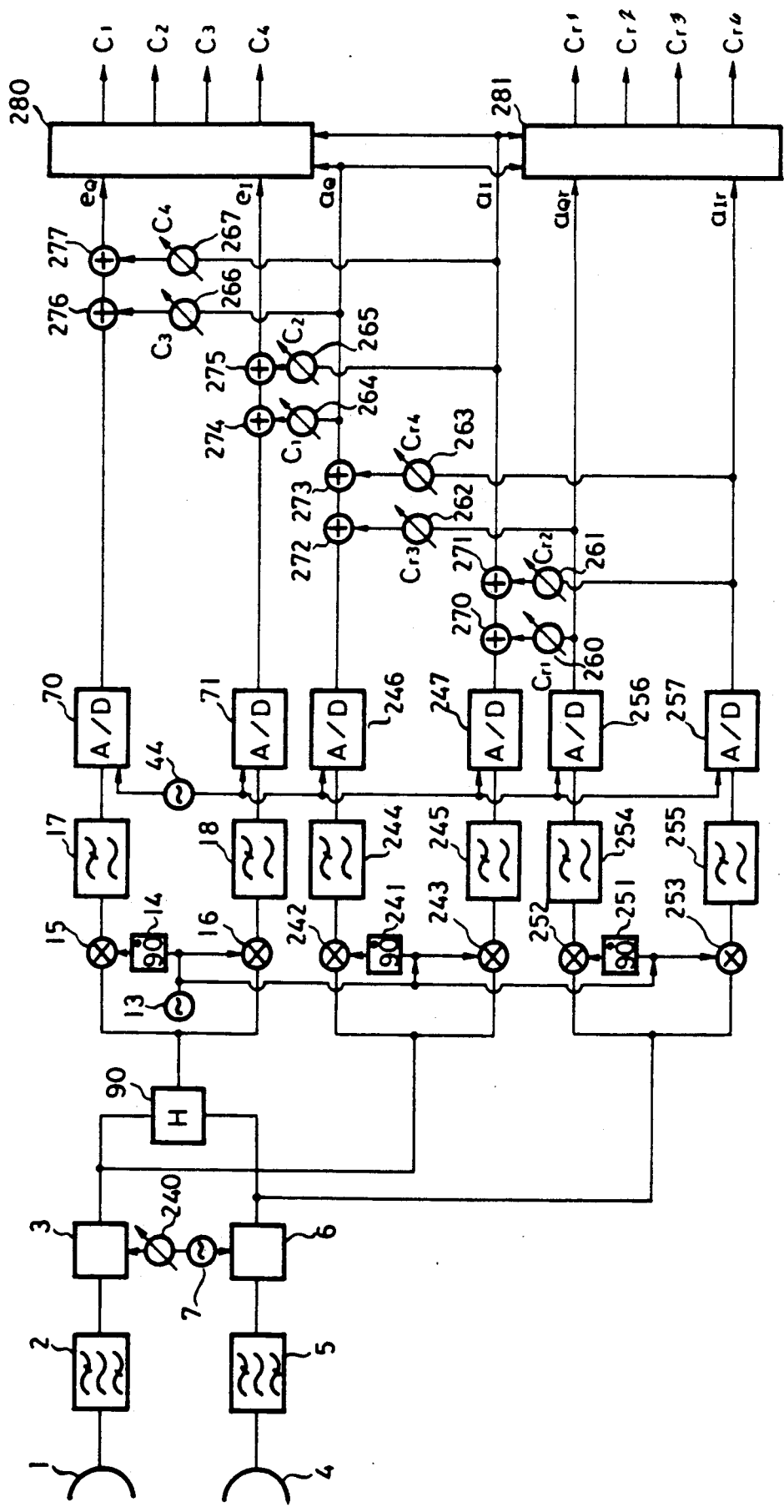
FIG. 45 is a block diagram to show a thirty-sixth embodiment of this invention.

FIG. 45 is a block diagram to show the 36th embodiment of this invention.

The main signals received by the main antenna 1 and an auxiliary antenna 4 are passed through a band pass filter 2, converted in frequency into the IF band by a frequency converter 3 using the local frequency oscillated from a local oscillator 5. A phase shifter 240 inserted between the oscillator 5 and the converter 3 is for varying the combined phase of the main signals received by the main and auxiliary antennas 1, 4 and generally is controlled to maximize the received power after combination.

The received signals by the main and auxiliary antennas 1, 4 are combined by a combiner 90. The combined signals are input at phase detectors 15, 16. The phase detector 16 is further input with the local frequency 13 reproduced from the main signal. The phase detector 15 is input with the signal with the phase shifted from the local frequency by 90 degrees by a phase shifter 14. Therefore, a coherent quadrature phase detector is formed by the phase shifter 14 and the phase detectors 15, 16. The coherent quadrature phase detector divides the combined signal output from the combiner 90 into in-phase and quadrature phase components by the local frequency 13.

The signal received by the main antenna 1 is input at the phase detectors 242, 243. The local frequency 13 is also input at the phase detector 243 while the signal obtained by shifting the phase of the local frequency 13 by 90 degrees by the phase shifter 242 is input at the phase detector 242. A coherent quadrature detector comprising the phase shifter 241 and the phase detectors 242, 243 divides the signal received by the main antenna 1 into in-phase and quadrature phase components by the local frequency 13. The signal received by the auxiliary antenna 4, on the other hand, is input at the phase detectors 252, 253. The phase detector 253 is input with the local frequency 13 while the phase detector 252 is input with the signal having the phase shifted by 90 degrees from the phase of the local frequency 13 by the phase shifter 251. A coherent quadrature phase detector comprising the phase shifter 251 and the phase detectors 252, 253 divides the signal received by the auxiliary antenna 4 into in-phase and quadrature phase components by the local frequency.

The in-phase and quadrature phase components thus obtained are respectively passed through the phase detectors 15, 16, 242, 243, 252, 253, and the low-pass filters 17, 18, 244, 245, 254, 255 in order to remove harmonic components, supplied at A/D converters 70, 71, 246, 247, 256, 257 and digitized. The A/D converters 70, 71, 246, 247, 256, 257 use the clock signal 44 reproduced from the main signal as sampling signal.

Description will now be given to the circuit structure wherein the in-phase and the quadrature phase components of the main signal output from the A/D converters 70, 71, 246, 247, 256, 257 are removed of the main signal component to obtain the interference signal.

The output signals from the A/D converter 256 are input at bipolar attenuators 260, 262 and the output therefrom is added to the outputs from the A/D converters 247, 246 by full-adders 270, 272.

Similarly, the output signals from the A/D converter 257 are input at bipolar attenuators 261, 263 and the output therefrom is added to the output from the full-adders 270, 272 by full-adders 271, 273. The main signal component of the in-phase and the quadrature phase components is cancelled from the outputs from the full adders 271, 273, to provide signals aI and aQ comprising only interference signal components. These interference signals aI, aQ' however, are dominated by the main signal component at the time the interference cancellation control starts, but the interference signal component increases when the control proceeds into the normal condition.

Based on these interference signals aI and aQ' the interference signal component mixed within the main signal is erased.

For this reason, the output signal from the full adder 273 or the interference signal aQ of the quadrature phase component is input at the variable combiners 264, 266, and the outputs from the variable combiners 264, 266 and the outputs from the A/D converters 71, 70 are added by the full-adders 274, 276.

The signal output from the full-adder 271 or the interference signal aI of the in-phase component is input at the variable combiners 265, 267 and the outputs from the full-adders 274, 276 are added by the full-adders 275, 277. This makes the cancellation signal which is in opposite phase to but in the same amplitude as the interference component mixed within the main signal line. If this cancellation signal is added to the interference component still remaining in the main signal line, the interference component can be removed.

A specific description will now be offered for the control method of variable combiners 260 through 267.

It is necessary to give the main signal received by the main antenna 1 an opposite phase to but the same amplitude as the main signal received by the auxiliary antenna 4 when they are added.

The baseband signals of the in-phase and the quadrature phase components received from respectively received signals are passed to the variable combiners 260 through 263 for addition. The outputs aI, aQ of the full-adders 271, 273 must be controlled in a manner to minimize the main signal component.

The main signal after addition is correlated with the output signal from either the auxiliary antenna 4 or the main antenna 1 before addition and the variable combiners 260 through 263 are controlled in feed-back to minimize the correlation therebetween by the combiner controller 281. In this embodiment, correlation is detected between the polarity signals aQ' aI of the interference signal and the polarity signals ar, aIr of the main signal received by the auxiliary antenna 4.

Based on the interference signal of the in-phase and the quadrature phase components, the interference component mixed within the main signal is removed by controlling the combiners 264 through 267.

The output from the full-adders 275, 277 or the error signals eI, eQ obtained from the main signal output after interference cancellation and the outputs from the full-adders 271, 273 or the in-phase and quadrature phase components of the interference signal are input at the combiner controller 280 for correlation detection. They are controlled to minimize the correlation by feedback.

As shown in the table, the error signals eI' eQ may be obtained from the third from the most significant bit when the signal is, for instance, 16QAM. In this embodiment, only the polarity signals aQ, aI of the interference signal are used for correlation detection.

Figure 46:
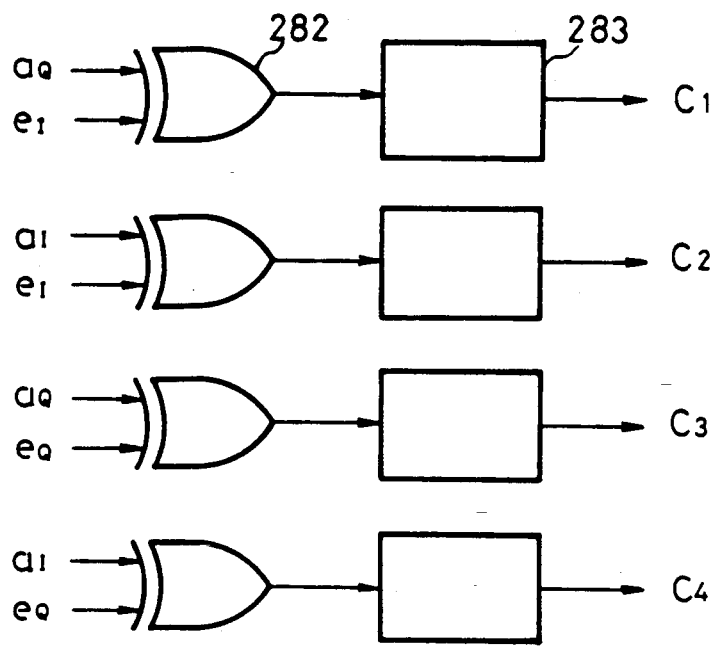
FIG. 46 is a block diagram to show an embodiment of a bipolor attenuator.
Figure 46:
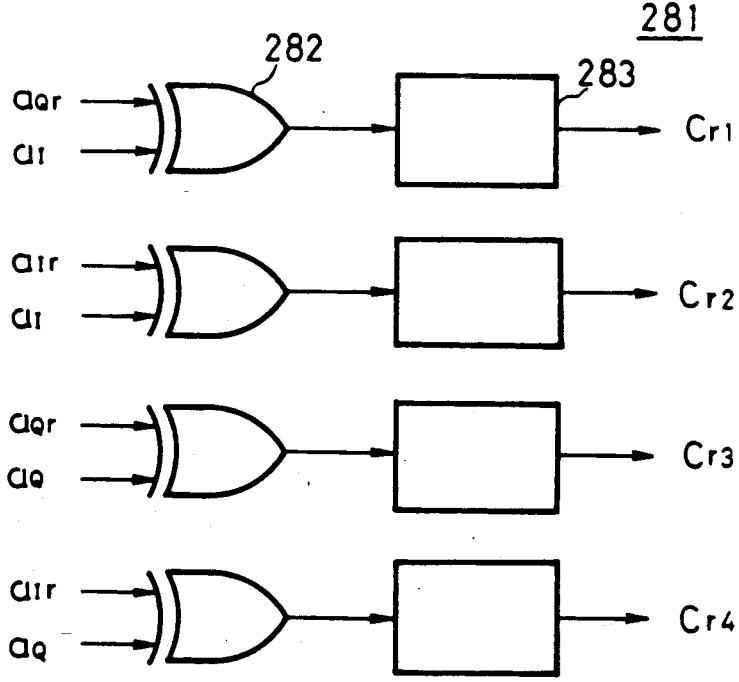

FIG. 46 is a block diagram to show an embodiment of variable combiner controllers 280, 281.

Error signals eQ' eI and polarity signals aQ' aI, aQ' aI are multiplied by four exclusive ORs 282, integrated by the integrator 283, and output as control signals C1 through C4, and Cr1 through Cr4. The variable combiners 264 through 267, and 260 through 263 are controlled respectively.

For instance, the combiner 260 is controlled by detecting correlation between the polarity signal aQr of the main signal quadrature component received by the auxiliary antenna 4, and the polarity signal aI of the interference signal in-phase component, and feeding back the resultant control signal CrI to the combiner 260. Other variable combiners 261 through 267 are controlled by control signals Cr2 through Cr4 and C1 through C4 obtained by the correlation detection corresponding thereto.

This embodiment is described by showing a case wherein the polarity signals aI' aQ of the interference signals output from the full-adders 271, 273 and the polarity signals aQr' aIr of the main signals output from the A/D converters 256, 257 are used as the input signals of the circuit 281. But they do not necessarily have to be polarity signals; they may be inputs of multiple bits. In such a case, the combiner controllers 280, 281 may have multiple bit multipliers instead of an exclusive OR 282.

EMBODIMENT 37

Figure 47:
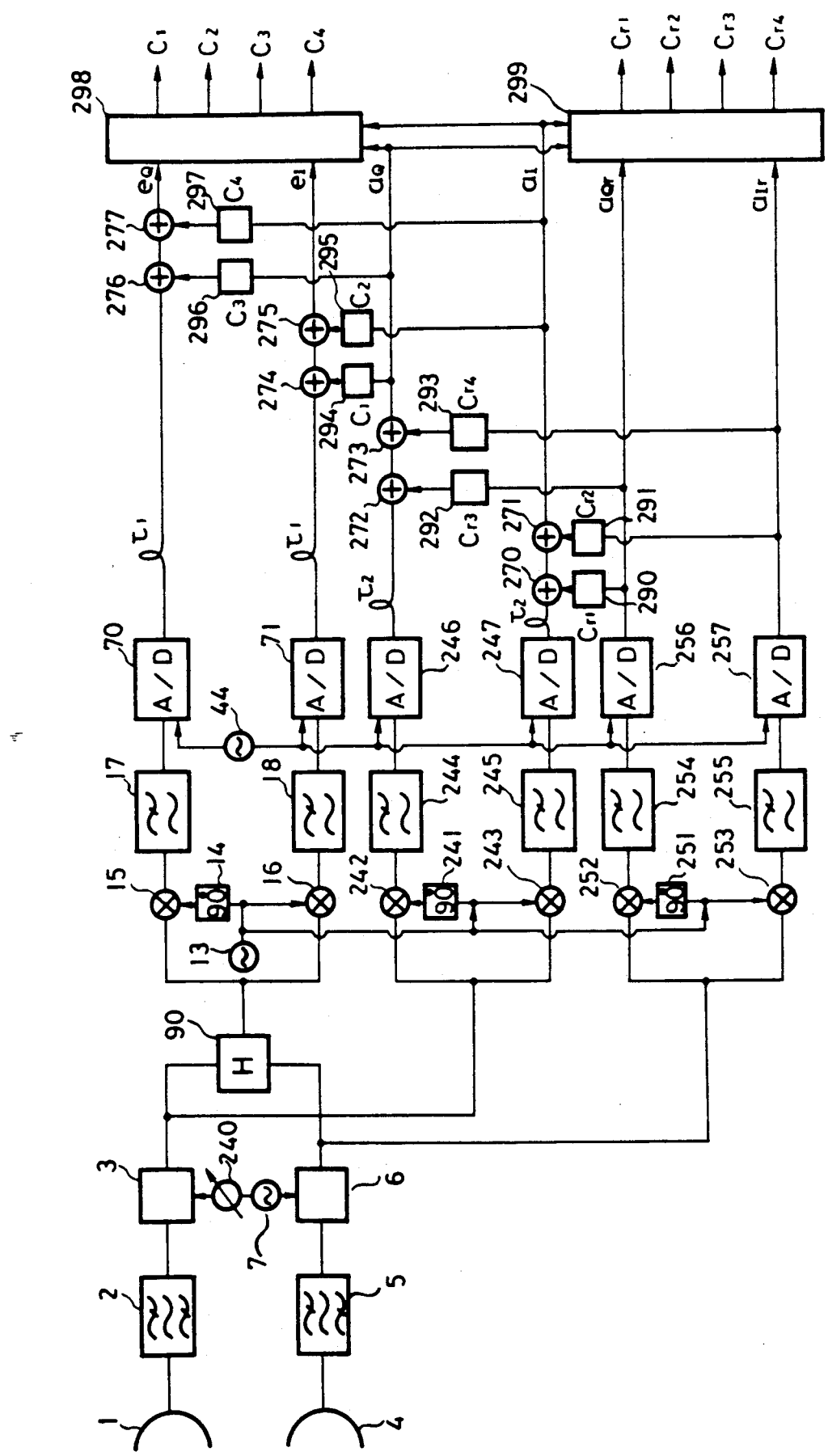
FIG. 47 is a block diagram to show a thirty-seventh embodiment of this invention.

FIG. 47 is a block diagram to show the 37th embodiment of this invention.

This embodiment is characterized in that the bipolar attenuators 260 through 267 of the embodiment 36 are replaced with bipolar attenuators 290 through 297 comprising transversal filters including delay lines with plural taps (three taps in this embodiment).

Figure 48:
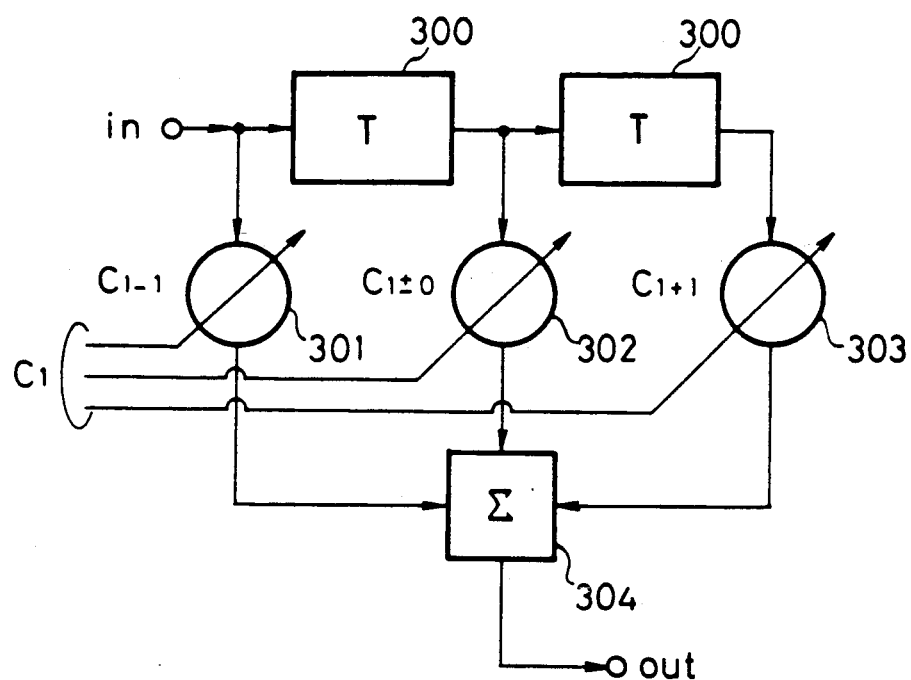
FIG. 48 is block diagram to show an embodiment of a bipolor attenuator.

An embodiment of the bipolar attenuators 290 through 297 is shown in FIG. 48.

The bipolar attenuator comprises a delay line with taps 300, bipolar variable attenuators 301 through 303 connected to these taps, and an adder which adds the outputs from the attenuators 301 through 303 and is structured so that the signal input at the delay line 300 is output from the adder 304 after being adjusted in amplitude.

Figure 49:
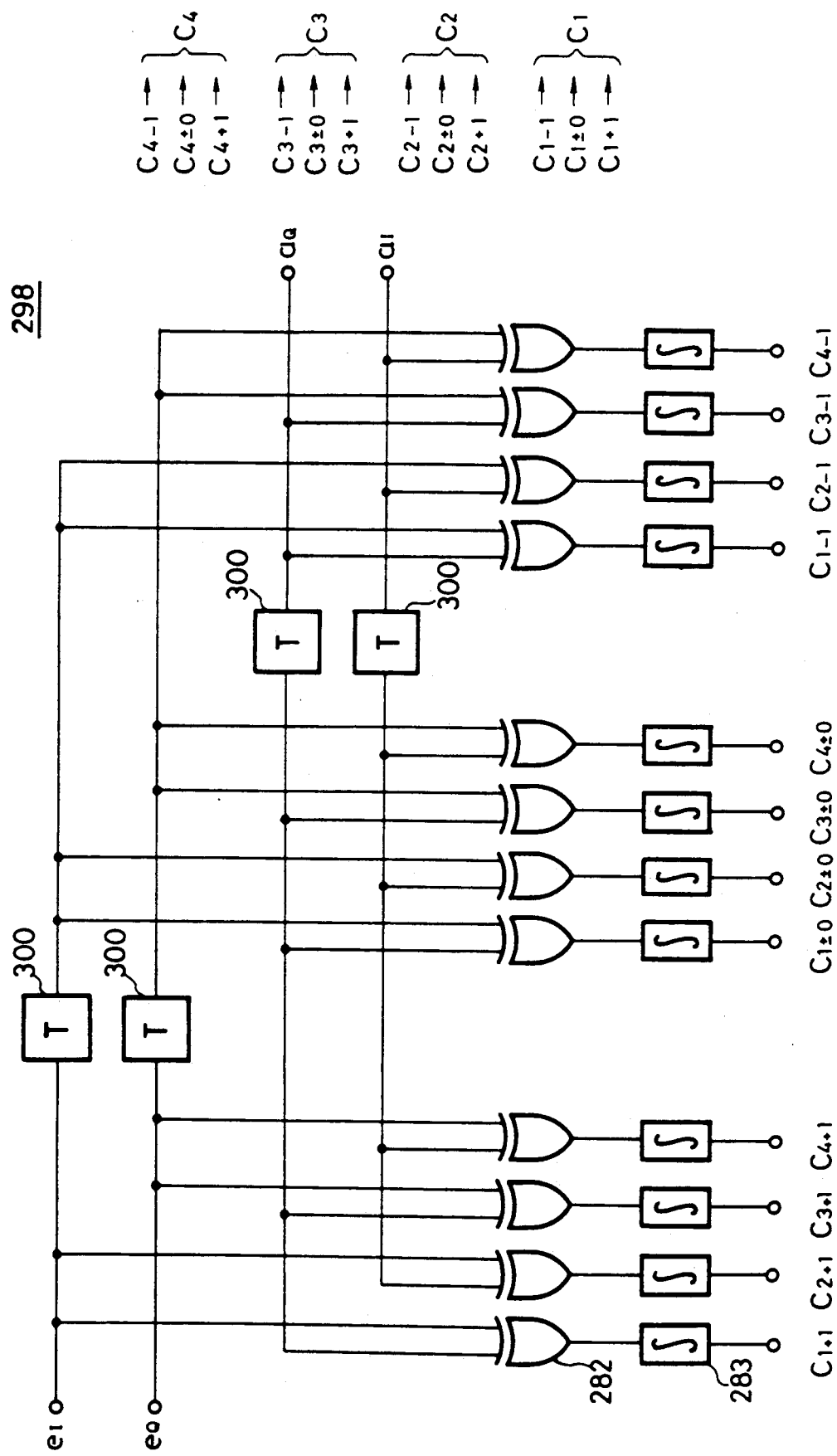
FIG. 49 is a block diagram to show an embodiment of a bipolor attenuator control circuit.
Figure 50:
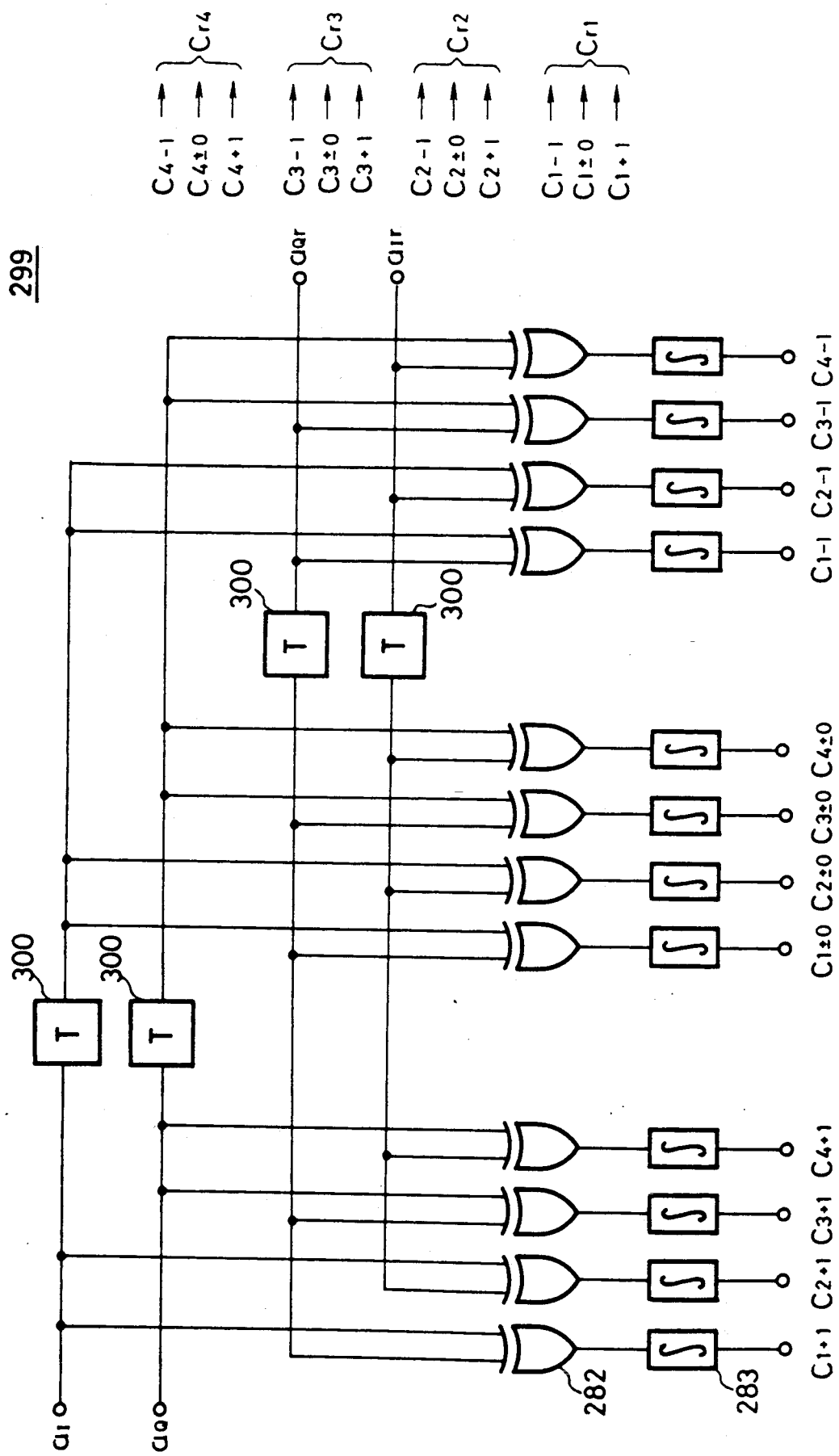
FIG. 50 is a block diagram to show an embodiment of a bipolar attenuator control circuit.

FIGS. 49 and 50 are block diagrams to show an embodiment of bipolar attenuator controllers 298, 299.

Time is synchronized by the delay line 300 between the error signals eQ' eI of the main signal and the polarity signals aQ' aI of the interference signal in the case of the circuit 298, and between the polarity signals aQr' aIr of the received signal by the auxiliary antenna 4 and the polarity signals aQ' aI of the interference signal in the case of the circuit 299; correlation is detected by the exclusive OR 282, and input for integration by the integrator 283. With the output therefrom, the bipolar attenuators 294 through 297 and 290 through 293 are controlled.

By using plural weighting circuits for the bipolar attenuators 290 through 297, a better cancellation can be obtained than in the embodiment 36 even when the main signal or the interference signal has complicated frequency characteristics.

The delay line T1 shown in FIG. 47 is for adjusting timings so that the signals passing through the phase detectors 15, 16 and the signals passing through the phase detectors 242, 243 are added in synchronization by the full adders 274 through 277. Similarly, the delay line T2 is for adjusting timings so that the signals passing through the phase detector 242, and the signals passing through the phase detectors 252, 253 are added in synchronization by the full-adders 270 through 273.

EMBODIMENT 38

The baseband signals are converted from analog to digital so that interference cancellation is conducted by digital circuits in the above two embodiments 36 and 37.

Figure 51:
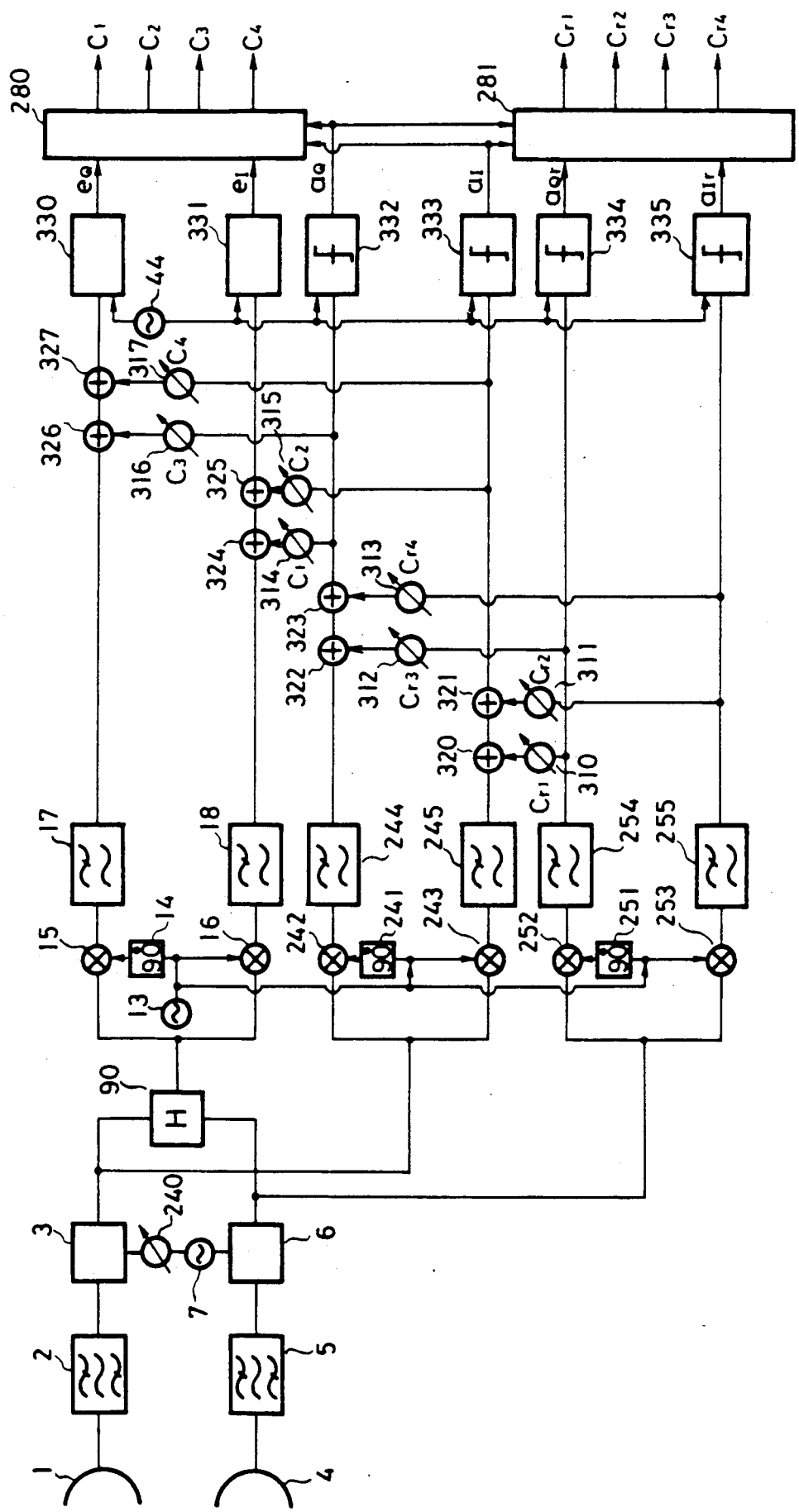
FIG. 51 is a block diagram to show a thirty-eighth embodiment of this invention.

The embodiment 38 shown in FIG. 51, however, conducts interference cancellation with analog circuits.

The main and interference signals received by the main and auxiliary antennas 1 and 4 are passed through a band pass filter 2, and frequency-converted into IF band by a converter 3 using the oscillator 7. The phase shifter 240 inserted between the local oscillator 7 and the converter 3 is for varying the combined phase of the main signals received by the main auxiliary antennas 1, 4.

The signals received by the main and auxiliary antennas 1, 4 are combined by the combiner 90. The combined signal is input at a coherent quadrature phase detector comprising a phase shifter 14, and phase detectors 15, 16. The detector divides the combined signal into the in-phase component and the quadrature phase component by the local frequency reproduced from the main signal.

The received signal from the main antenna is input also at a coherent quadrature phase detector comprising a phase shifter 241 and phase detectors 242, 243, and divided into the in-phase component and the quadrature phase component by local frequency 13. The signal received by the auxiliary antenna 4 is input at a coherent quadrature phase detector comprising a phase shifter 251, and phase detectors 252, 253, and divided into the in-phase component and the quadrature component by the local frequency 13.

The outputs from phase detectors 15, 16, 242, 243, 252, 253 are removed of the harmonic component low-pass filters 17, 18, 244, 245, 254, 255. The signal output from the low-pass filter 254 is input at the bipolar attenuator 310, 312, and the outputs from the bipolar attenuator 310, 312 and the outputs from the low-pass filters 245, 244 are added by the adders 320, 322. Further, the output signals from the low-pass filter 255 is input at bipolar attenuators 311, 313, and the outputs therefrom are added to the output from the adders 320, 322 by adders 321, 323. These operation extracts the interference signal mixed within the main signal.

The output signal from the adder 323 is input at the bipolar attenuators 314, 316, and the output from the bipolar attenuators 314, 316 are added to the outputs from the low-pass filters 18, 17 by the adders 324, 326. The output signal from the adder 321 is input at the bipolar attenuators 315, 317, and the outputs therefrom are added to the outputs from the adders 324, 326 by the adders 325, 327. This operation cancels the interference signal component mixed within the main signal.

The method to control the bipolar attenuators 310 through 317 will be described below.

The outputs from the adders 327, 325 are input at error signal detectors 330, 331 while the output from the adders 323, 321 and the outputs from the low-pass filters 254, 255 are respectively input at binary decision circuits 332 through 335 to generate error signals eQ' eI, the polarity signals of interference signals aQ' aI' and the polarity signals aQr' aIr of main signal. Out of these signals, the error signals eQ' eI and the polarity signals aQ' aI of interference signal are input at the bipolar attenuator controller 280, while the polarity signals aQ' aI of the interference signal and the polarity signals ar, aIr of the main signal are input at the bipolar attenuator controller 281. The bipolar attenuators 314 through 317 and 310 through 313 are controlled with the outputs from the controllers 280, 281. The error signal 330, 331 and the binary decision circuits 332 detectors through 335 are operated on the clock signal 44 reproduced from the main signal.

In this embodiment, the output signals from the adders 321, 323 and the low-pass filters 254, 255 are digitized by the binary decision circuits 332 through 335 as the signals to be input at the controllers 280, 281. The digitizing process is not always necessary. If not digitized, digital multipliers (exclusive ORs) within the circuits 280, 281 are replaced with analog multipliers.

EMBODIMENT 39

Figure 52:
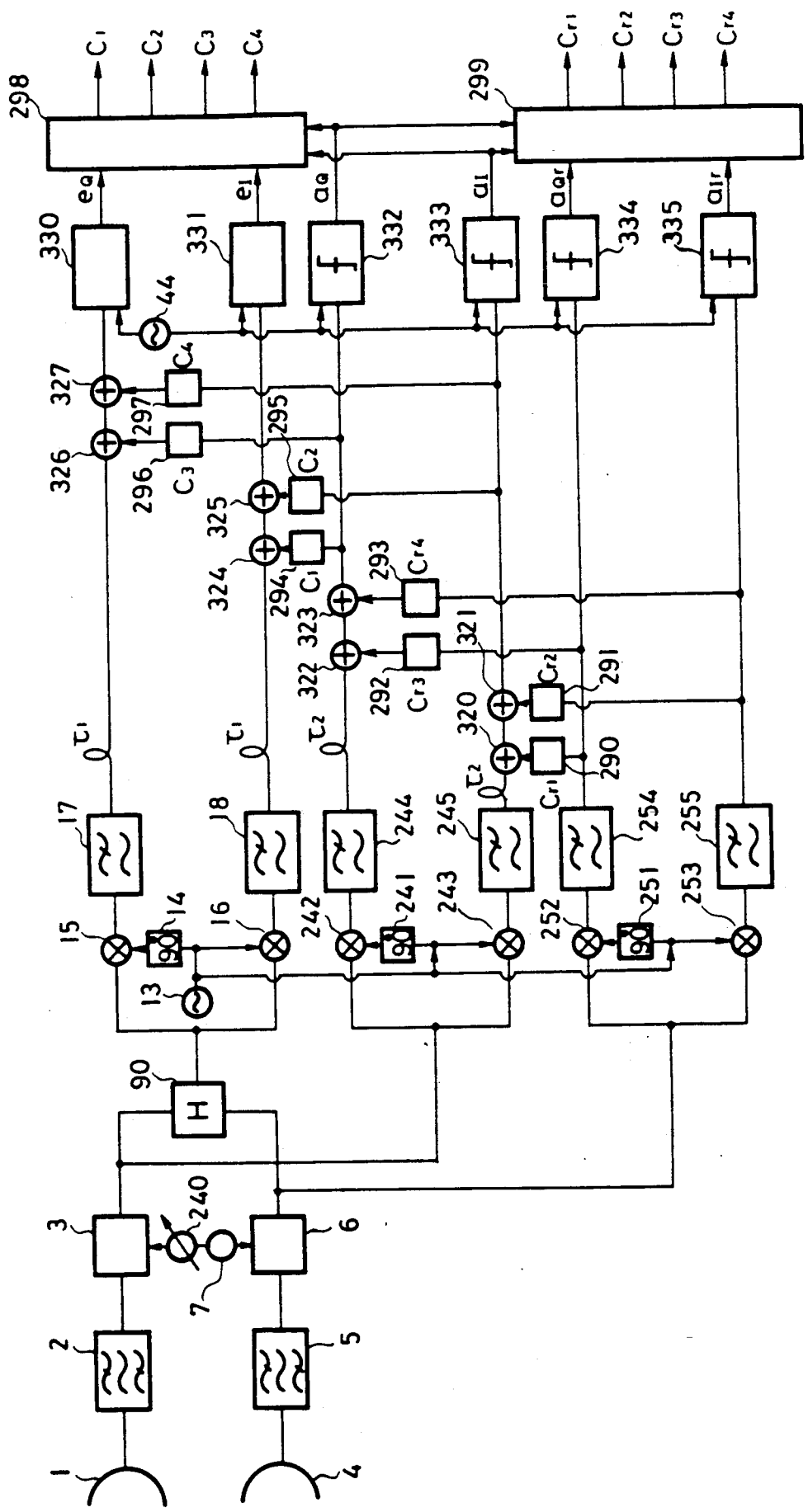
FIG. 52 is a block diagram to show a thirty-ninth embodiment of this invention.

FIG. 52 is a block diagram to show the 39th embodiment of this invention. This embodiment differs from the embodiment 38 shown in FIG. 51 in that the bipolar attenuators 310 through 317 are replaced by bipolar attenuators 290 through 297 comprising transversal filters including delay lines with plural taps (three taps in this embodiment). The bipolar attenuators 290 through 297 have the structures identical to those shown in FIG. 48.

EMBODIMENT 40

Figure 53:
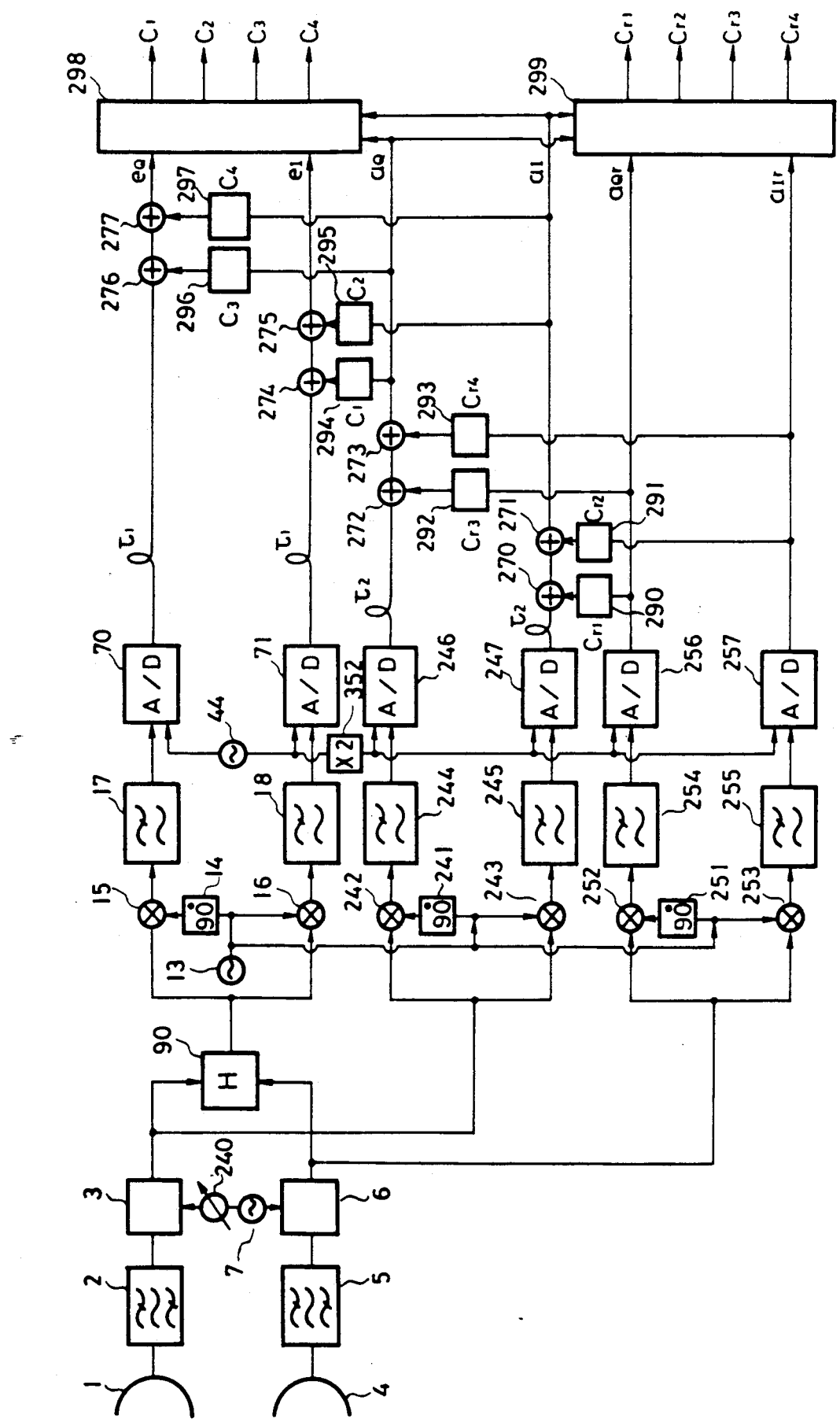
FIG. 53 is a block diagram to show a fortieth embodiment of an interference cancellation circuit according to this invention.

FIG. 53 is a block diagram to show the 40th embodiment of the interference cancellation circuit according to this invention.

This embodiment differs from the embodiment 37 in that the sampling signals for the A/D converters 246, 247, 256, 257 are the signals obtained by increasing by twofold the frequency of the clock signal 44 reproduced from the main signal by a multiplier 352.

Figure 54:
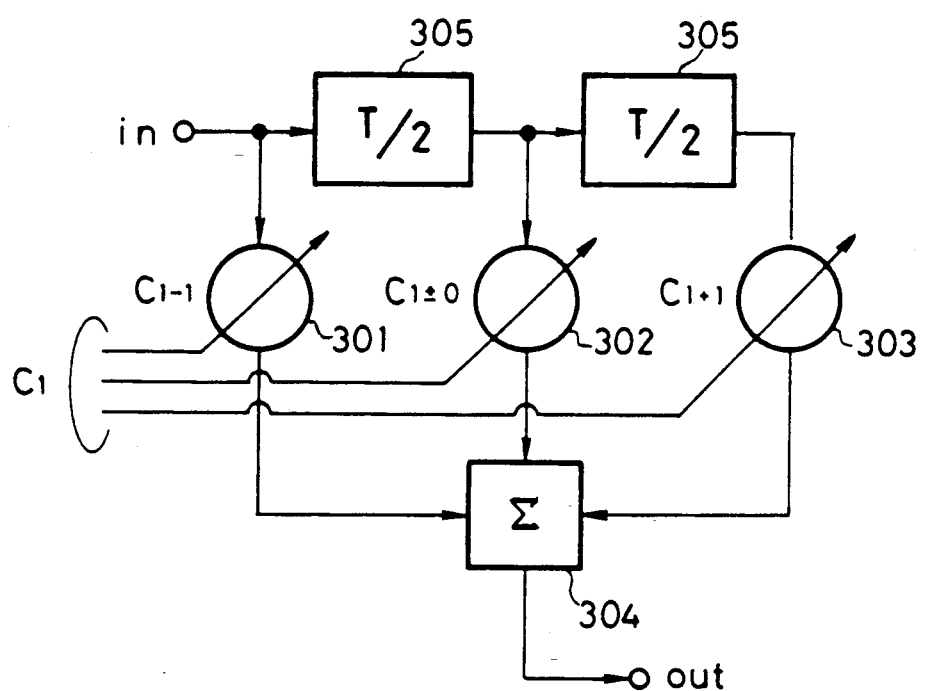
FIG. 54 is a view to show the circuit structure of a bipolar attenuator.

FIG. 54 is a circuit diagram to show an embodiment of the bipolar-attenuator wherein the circuit comprises delay lines with three taps.

The bipolar attenuator shown differs from that shown in FIG. 48 in that the circuit 300 in FIG. 48 is replaced with a delay circuit 305 with taps of delay time of T/2. More particularly, the circuit comprises a delay circuit 305 with taps bipolar attenuators 301 through 303 connected to each tap, and an adder 304 which adds the outputs from the attenuators 301 through 303, and adjusts in amplitude the input signal at the circuit 305, and outputs it from the adder 304.

Figure 55:
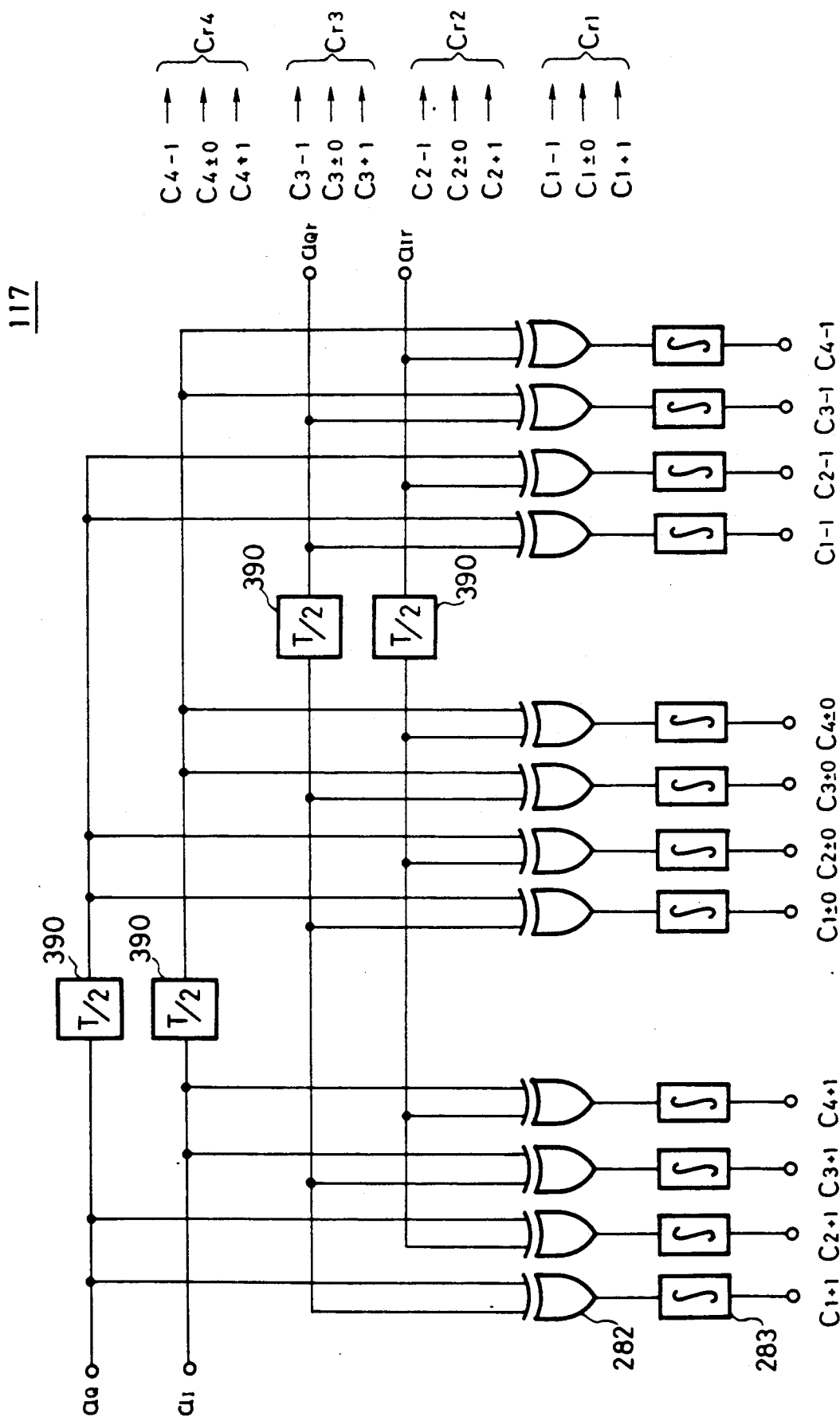
FIG. 55 is a view to show the circuit structure of a bipolar attenuator control circuit.
Figure 56:
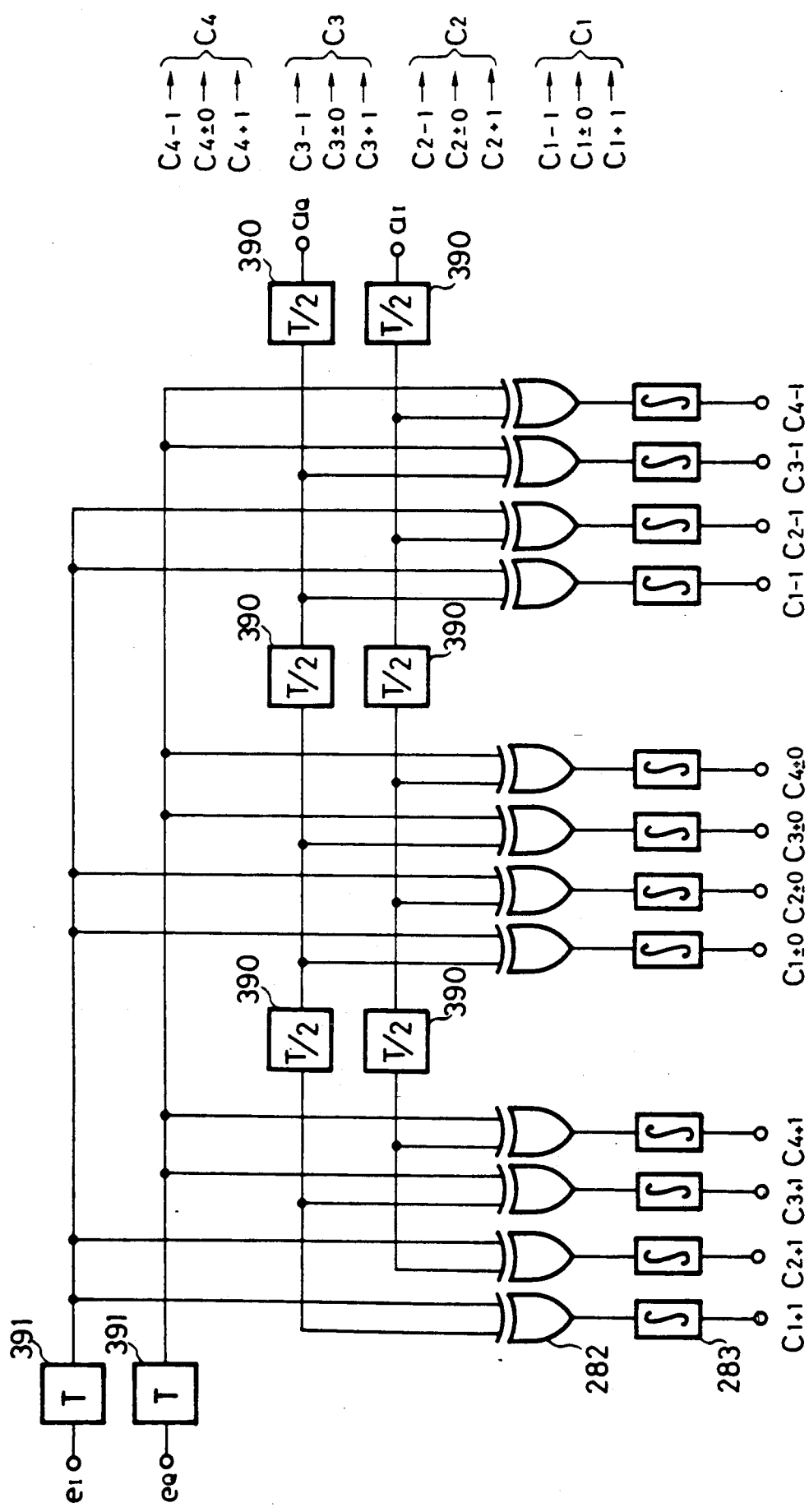
FIG. 56 is a view to show the circuit structure of another bipolar attenuator control circuit.

FIGS. 55 and 56 are circuit diagrams to show embodiments of bipolar attenuator controllers 280, 281 suitable for this embodiment circuit.

The error signals eQ' eI of the main signal, the polarity signals aQ' aI, of the interference signal, or the polarity signals aQr' aIr' aQ' aI of the main signal received by the auxiliary antenna 4 are synchronized by a delay circuit 390 of the delay time of T/2 or a delay circuit 391 of the delay time of T, correlated by an exclusive OR 282, and input at an integrator 283. The output therefrom is used to control the bipolar attenuators.

In a manner described above, even if the main signal and the interference signal have frequency characteristics, significant cancellation effect is achieved if using plural weighing circuits are used for the bipolar attenuators.

Figure 57:
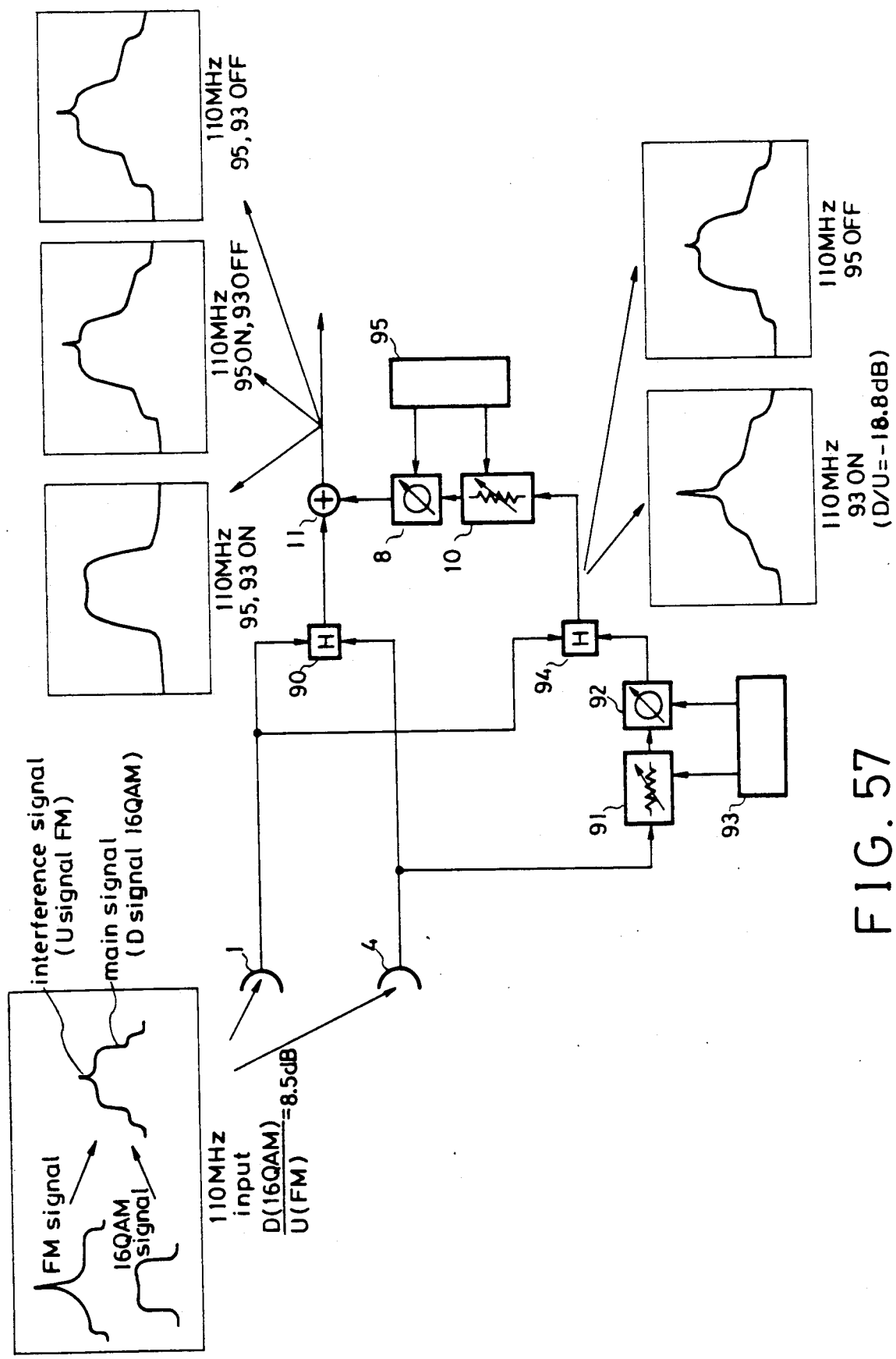
FIG. 57 is a view to show the effect of this invention.

FIG. 57 is a view to show the effect of this invention. The embodiment 20 is used as an example to explain the effect.

Assuming that the desired signal D is 16QAM, and undesired signal U is FM signal in reception, the ratio in signal intensity is D/U=8.5 dB in the signals received by the antennas 1 and 4.

These signals were controlled in amplitude and phase by a controller 93 and combined to each other in phase opposite to but the same in amplitude by a combiner 94. The signal of DO/U0 −18.8 dB was output from the combiner 94.

Therefore, the operation of the controller 93 obtained an improvement in Di/Ui (Di/Ui −DO/U0) in the level of about 27 dB.

The output from the combiner 94 is input at the combiner 11 in the amplitude identical to that of FM signal mixed within the output from the combiner 90 and out-of-phase thereto. As a result, the signal from which FM signal has been cancelled is output from the combiner 11. In the figures, the waveforms of the output signals are shown for the case where the controllers 93 and 95 are actuated, and for the case where they are suspended.

Figure 58A:
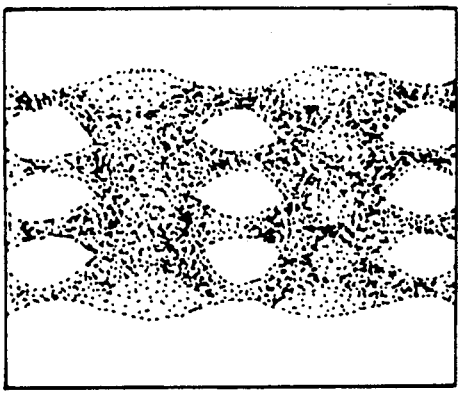
FIG. 58 is a view to show eye patterns by the operation of a control circuit.
Figure 58B:
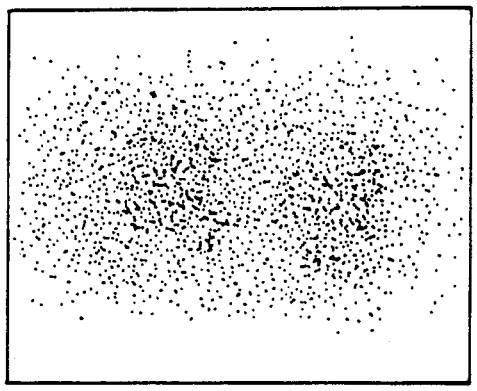
Figure 58C:

FIG. 58 shows the eye patterns when the controllers 93 and 95 are actuated and when they are suspended. As is obvious from the figure, the effect of interference cancellation is most significant when the controllers 93, 95 are in operation.

Figure 59:
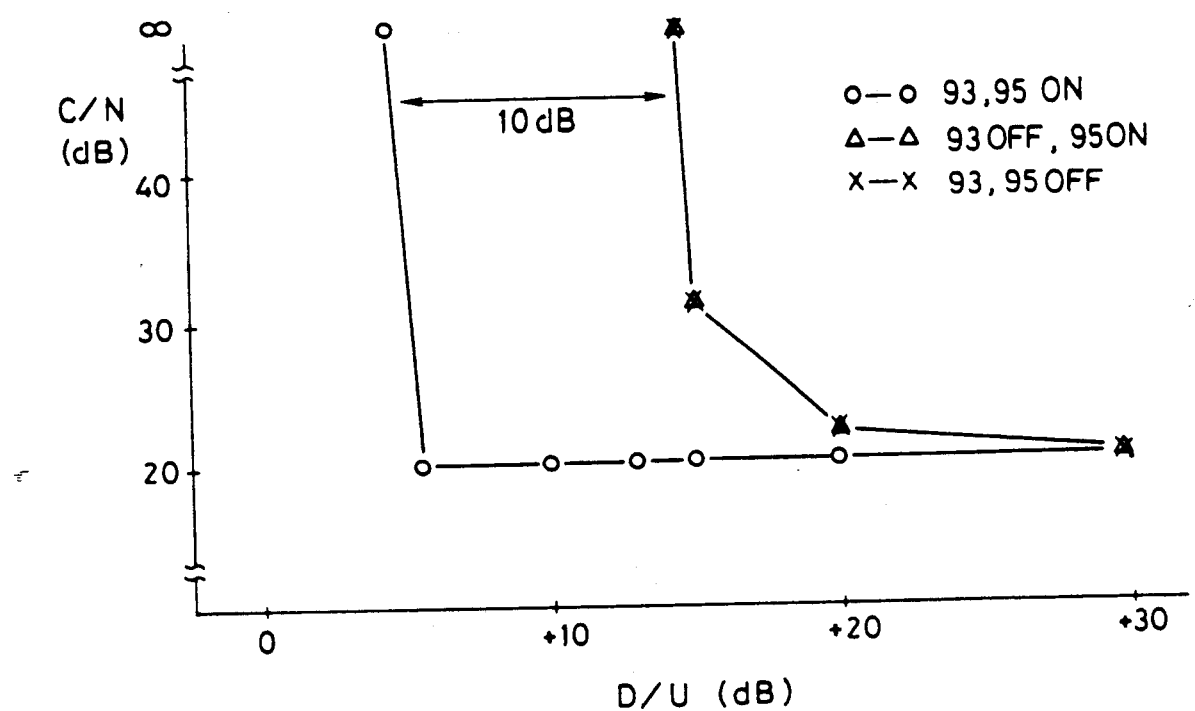
FIG. 59 is a graph to show the improvement achieved by this invention.

FIG. 59 is a view to show the improvement made by this invention. The characteristics are substantially the same when the controllers 93, 95 are turned OFF or when the controller 93 alone is turned OFF.

When the both controllers 93, 95 are turned ON, an improvement equivalent to about 10 dB was achieved to demonstrate the effectiveness of this invention.

What is claimed is:

1. An interference cancellation circuit comprising:
   two receiver circuits which each respectively receive a signal, each received signal including a main signal component and an interference signal component;
   a first adjustment means for adjusting a relative amplitude and phase of the received signals from respective outputs of the two receiver circuits;
   a first combining means which combines adjusted received signals which have been adjusted in amplitude and phase by the first adjusting means;
   first control means for controlling said first adjusting means in a manner to make the interference signal component contained in the output from the first combining means larger than the main signal component;
   a second adjusting means for adjusting amplitude and phase of outputs of said first combining means;
   a second combining means for combining outputs from the second adjusting means with at least one of said received signals; and
   a second control means for controlling said second adjusting means in a manner to minimize the interference signal component in the output from said second combining means.

2. An interference cancellation circuit as claimed in claim 1 wherein the first adjusting means includes two automatic gain controllers, one provided at each output of the two receiver circuits;
   a first variable phase shifter connected to one of the outputs of the two automatic gain controllers, and a first variable attenuator provided at the other output of the two automatic gain controllers or at the output of the first phase shifter, wherein the first controller includes phase difference detector means which detects a difference in-phase of the outputs from said two automatic gain controllers, a phase controller means which controls said first variable phase shifters with the output from the phase difference detector means, and an amplitude controller which controls said first variable attenuator with a control voltage of said two automatic gain controllers.

3. The interference cancellation circuit as claimed in either of claims 1 or 2 further comprising means for obtaining a local frequency reproduced from the output of the second combining means wherein the second adjusting means includes a second variable phase shifter and a second variable attenuator, and the second controller means includes a coherent quadrature phase detector which divides the output from the second combining means into an in-phase component and a quadrature phase component using said local frequency, two error signal detectors which receive the in-phase and quadrature phrase components from the coherent quadrature phase detector as inputs thereto, a phase detector which detects phases of the output signals from said second variable phase shifters based on said local frequency, correlation detectors which separately detect correlation between an output of the phase detector and said two error signal detectors separately, amplitude controllers which control said second variable attenuators using the correlation between same phase ones of said components from the correlation detector, and a phase controller means for controlling said second phase shifter based on the correlation of ones of the components which have phases which are perpendicular to one another.

4. The interference cancellation circuit as claimed in claim 3 wherein the correlation detector includes a plurality of interconnected exclusive OR gates and integrators.

5. The interference cancellation circuit as claimed in claim 1 further comprising means for obtaining a local frequency from the output of said second combining means and wherein the first control means includes divider means for dividing one of the received signals obtained at the outputs of the two receiver circuits, a first phase detector which phase-detects the divided signal using said local frequency, a second phase detector which phase-detects the output signal from said first combining means with said local frequency, a third phase detector which phase-detects at least one of the divided signals and the output signal from said first combining means with said local frequency and a carrier of quadrature phase, a first amplitude control means which controls the adjustment of amplitude at the first adjusting means with a correlation between the components of the same phase of the phase detection output of said branched signals and of the phase detection output of the signal from said first combining means, and a first phase control means which controls the adjustment of phase at the first adjusting means with correlation of the components of the same perpendicular to each other of the phase detection output of said branched signals and the detection output of the signal from said first combining phase means.

6. The interference cancellation circuit as claimed in claim 5 wherein the first adjusting means includes a first variable attenuator and a first phase shifter provided at either one of the inputs of the first combining means, the first amplitude control means includes a means for controlling said first variable attenuator, and the first phase control means includes means for controlling said first variable phase shifter.

7. The interference cancellation circuit as claimed in claim 5 wherein the first adjusting means includes a first transversal filter which is provided at either one of the inputs of the first combining means and has independently variable attenuations for in-phase components and quadrature phase components of an input signal, the first amplitude control means includes means for controlling attenuation of the in-phase components at said first transversal filter, and the first phase control means includes means for controlling attenuation of the quadrature phase component of said first transversal filter.

8. The interference cancellation circuit as claimed in any one of claims 1, 5, 6 and 7 wherein the second control means includes a quadrature phase detector which divides the output from the second combining means based on the local frequency reproduced from the output from the second combining means into an in-phase component and a quadrature phase component, two error signal detectors which receive as inputs the in-phase and quadrature phase components from the quadrature phase detector, a phase detector which phase-detects the output signal from said second variable phase shifter with said local frequency, a second amplitude control means which controls the adjustment of amplitude at the second adjusting means using the correlation of the components of the same phase of the output from the phase detector and of the output from said two error signal detectors, and second phase control means which controls adjustment in-phase at said second adjusting means with the correlation of the components of phases perpendicular to each other of the output from the phase detector and the outputs from said two error signal detectors.

9. The interference cancellation circuit as claimed in claim 8 wherein the second adjusting means includes a second variable attenuator and a second variable phase shifter, and the second amplitude control means includes means for controlling said second variable phase shifter.

10. The interference cancellation circuit as claimed in claim 8 wherein the second adjusting means includes a quadrature amplitude modulator provided with two variable attenuators which can separately vary weights provided to the in-phase component and the quadrature phase component of an input signal, and the second amplitude control means includes a means to control the variable attenuator on the in-phase side of said quadrature amplitude modulator.

11. The interference cancellation circuit as claimed in claim 8 wherein the second adjusting means includes a second transversal filter which can independently vary attenuation of an in-phase component and a quadrature phase component of an input signal, the second amplitude control means includes means for control of attenuation of the in-phase component at said second transversal filter, and the second phase control means includes means for controlling the attenuation of the quadrature phase at said second transversal filter.

12. The interference cancellation circuit as claimed in claim 1 which further comprises:
means for extracting a local frequency from the main signal component;
a first quadrature phase detector which divides at least one of the received signals at the two receiver circuits into an in-phase component and a quadrature phase component based on the local frequency;
a second and a third quadrature phase detectors which divide the received signals at said two receiver circuits based on said local frequency:
wherein the first adjusting means includes first and third bipolar attenuators which receive as inputs quadrature component outputs from said third quadrature phase detector, and second and fourth bipolar attenuators which receive as inputs the in-phase component output from said third quadrature phase detector;
combining means includes first and second adders which add the outputs from said first and second bipolar attenuators respectively to the in-phase component outputs from said second quadrature phase detector, and third and fourth adders which add outputs of said third and fourth bipolar attenuators respectively to the quadrature component output from said second quadrature phase detector, the second adjusting means includes fifth and seventh bipolar attenuators which receive as inputs the quadrature component output from said second quadrature phase detector, and sixth and eighth bipolar attenuators which receive as inputs the in-phase component output from said second quadrature phase detector, the second combining means and fifth and sixth adders which add the outputs from said fifth and sixth bipolar attenuators respectively to the in-phase component output from said first quadrature phase detector, and seventh and eighth adders which add the outputs from said seventh and eighth bipolar attenuators respectively to the quadrature component output from said quadrature phase detector,
wherein the first control means includes a first bipolar attenuator controller which controls the first through fourth bipolar attenuators with the signals obtained from said first and second adders, the signals obtained from said third and fourth adders and the output signal from said third quadrature phase detector, and
the second control means includes a second bipolar attenuator controller which controls said fifth through eighth bipolar attenuators with the signals obtained from said fifth and sixth adders, the signal obtained from said seventh and eighth adders and the output signal from said second quadrature phase detector.

13. The interference cancellation circuit as claimed in claim 12 wherein the first through third quadrature phase detectors include analog to digital converters at each of the outputs thereof, and the first through eighth bipolar attenuators, the first through eighth adders, the first bipolar attenuator controller and the second bipolar attenuator controller comprise digital circuits.

14. The interference cancellation circuit as claimed in claim 13 wherein the first through eighth bipolar attenuators include transversal filters.

15. The interference cancellation circuit as claimed in claim 13 wherein the first through eighth adders are full-adders.

16. An interference cancellation circuit comprising:
two receiver circuits which each respectively receive a signal including a main signal component and an interference signal component;
a first adjusting means which adjusts relative amplitude and phase of the received signals at outputs of the two receiver circuits;
a first combining means for combining the two received signals which have been amplitude and phase adjusted by the first adjusting means;
a first control means for controlling said adjustment by said first adjusting means to make the interference signal component included within the output from the first combining means higher in level than the main signal component;

third adjusting means for adjusting the relative amplitude and phase of the received signals obtained in the outputs of said two receiver circuits and which is provided separately from said first adjusting means;

third combining means for combining the two received signals after they have been adjusted in amplitude and phase by the third adjusting means; and third control means which controls said third adjusting means to minimize the interference signal component included within the output from the third combining means.

* * * * *